(12) United States Patent
Holt et al.

(10) Patent No.: US 8,584,034 B2
(45) Date of Patent: Nov. 12, 2013

(54) USER INTERFACES FOR NAVIGATING STRUCTURED CONTENT

(75) Inventors: Thomas D. Holt, Atherton, CA (US); Larry S. Burke, Brentwood Bay (CA)

(73) Assignee: Surfwax, Inc., Menlo Park, CA (US)

( * ) Notice: Subject to any disclaimer, the term of this patent is extended or adjusted under 35 U.S.C. 154(b) by 282 days.

(21) Appl. No.: 13/030,052

(22) Filed: Feb. 17, 2011

(65) Prior Publication Data

US 2012/0036455 A1 Feb. 9, 2012

Related U.S. Application Data

(60) Provisional application No. 61/328,572, filed on Apr. 27, 2010.

(51) Int. Cl.
*G06F 3/048* (2013.01)

(52) U.S. Cl.
USPC ............ 715/784; 715/786; 715/214; 715/218

(58) Field of Classification Search
USPC .................................. 715/784, 786, 214, 218
See application file for complete search history.

(56) References Cited

U.S. PATENT DOCUMENTS

| | | | | |
|---|---|---|---|---|
| 5,479,268 | A * | 12/1995 | Young et al. | 386/291 |
| 6,857,128 | B1 * | 2/2005 | Borden et al. | 725/39 |
| 7,114,126 | B2 | 9/2006 | Berger et al. | |
| 7,320,031 | B2 | 1/2008 | Konig et al. | |
| 7,500,197 | B2 | 3/2009 | Whitmarsh et al. | |
| 7,568,160 | B2 | 7/2009 | Berger et al. | |
| 2002/0065849 | A1 * | 5/2002 | Ferguson et al. | 707/513 |
| 2004/0268299 | A1 | 12/2004 | Lei et al. | |
| 2005/0076361 | A1 * | 4/2005 | Choi et al. | 725/45 |
| 2005/0210403 | A1 * | 9/2005 | Satanek | 715/786 |
| 2006/0123183 | A1 * | 6/2006 | Koivisto et al. | 711/1 |
| 2006/0168134 | A1 | 7/2006 | Berger et al. | |
| 2006/0204947 | A1 | 9/2006 | Berger et al. | |
| 2006/0263756 | A1 | 11/2006 | Berger et al. | |
| 2007/0218449 | A1 | 9/2007 | Reck et al. | |
| 2007/0245247 | A1 | 10/2007 | Neely et al. | |
| 2008/0082938 | A1 * | 4/2008 | Buczek | 715/784 |
| 2008/0162430 | A1 * | 7/2008 | Gossweiler et al. | 707/3 |
| 2008/0168404 | A1 * | 7/2008 | Ording | 715/863 |
| 2009/0031208 | A1 | 1/2009 | Robinson | |
| 2009/0164939 | A1 | 6/2009 | Ishimitsu et al. | |
| 2010/0083082 | A1 * | 4/2010 | Lehrian et al. | 715/212 |
| 2010/0146434 | A1 * | 6/2010 | Blinnikka et al. | 715/785 |

(Continued)

FOREIGN PATENT DOCUMENTS

WO 03009474 1/2003

OTHER PUBLICATIONS

Perry, Microsoft Excel 2007 Quick Reference Guide: Beta Preview, Oct. 27, 2006, Sams, pp. 16-18 and 54-56.*

(Continued)

*Primary Examiner* — Kieu Vu
*Assistant Examiner* — Aaron Lowenberger
(74) *Attorney, Agent, or Firm* — Maschoff Brennan

(57) ABSTRACT

User interfaces for navigating structured content. In one example embodiment, a user interface for navigating structured content includes a grid and a plurality of multi-dimensional cells each having a unique position in the grid. Each cell is configured to display only a first dimension of structured content before selection and display one or more additional dimensions of structured content upon selection.

38 Claims, 74 Drawing Sheets

(56) References Cited

U.S. PATENT DOCUMENTS

| | | |
|---|---|---|
| 2010/0174571 A1 | 7/2010 | Jerome et al. |
| 2010/0205520 A1* | 8/2010 | Parish et al. .................. 715/212 |
| 2011/0076664 A1 | 3/2011 | Holt et al. |
| 2011/0117534 A1 | 5/2011 | Berger et al. |

OTHER PUBLICATIONS

International Search Report and Written Opinion dated Sep. 27, 2012 as received in application No. PCT/US2012/024253.

* cited by examiner

Intel® Atom™ Processor Family

Number of Products: 14  
Max TDP: 0.65W - 8W  
Has Embedded Products: Yes  
Bulk 1k Price Range: $29.00 - $44.00  
Launch Range: Q2'08 - Q2'09

[Compare Now (0)] [Select All] [Clear All]

| | Product Name | Embedded | Max TDP | Intel® VT-x | Intel® Hyper-Threading Technology | Intel® Dynamic Speed Technology | Estimated 1K Unit Price | Status |
|---|---|---|---|---|---|---|---|---|
| ☐ | Intel® Atom™ Processor 230 (512K Cache, 1.60 GHz, 533 MHz FSB) | ✗ | 4 Watts | ✗ | ✓ | ✗ | $29.00 | Launched |
| ☐ | Intel® Atom™ Processor 330 (1M Cache, 1.60 GHz, 533 MHZ FSB) | ✗ | 8 Watts | ✗ | ✓ | ✗ | $43.00 | Launched |
| ☐ | Intel® Atom™ Processor N270 (512K Cache, 1.60 GHz, 533 MHz FSB) | ✓ | 2.5 Watts | ✗ | ✓ | ✗ | $44.00 | Launched |
| ☐ | Intel® Atom™ Processor Z500 (512K Cache, 800 MHz, 400 MHz FSB) | ✗ | 0.65 Watts | ✗ | ✓ | ✗ | N/A | Launched |
| ☐ | Intel® Atom™ Processor Z510 (512K Cache, 1.10 GHz, 400 MHz FSB) | ✓ | 2 Watts | ✗ | ✗ | ✗ | N/A | Launched |
| ☐ | Intel® Atom™ Processor Z510P (512K Cache, 1.10 GHz, 400 MHz FSB) | ✓ | 2.2 Watts | ✗ | ✓ | ✗ | N/A | Launched |
| ☐ | Intel® Atom™ Processor Z510PT (512K Cache, 1.10 GHz, 400 MHz FSB) | ✓ | 2.2 Watts | ✓ | ✓ | ✗ | N/A | Launched |
| ☐ | Intel® Atom™ Processor Z515 (512K Cache, 1.20 GHz, 400 MHz FSB) | ✗ | 1.4 Watts | ✗ | ✓ | ✗ | N/A | Launched |
| ☐ | Intel® Atom™ Processor Z520 (512K Cache, 1.33 GHz, 533 MHz FSB) | ✓ | 2 Watts | ✓ | ✓ | ✗ | N/A | Launched |
| ☐ | Intel® Atom™ Processor Z520PT (512K Cache, 1.33 GHz, 533 MHz FSB) | ✓ | 2.2 Watts | ✓ | ✓ | ✗ | N/A | Launched |
| ☐ | Intel® Atom™ Processor Z530 (512K Cache, 1.60 GHz, 533 MHz FSB) | ✓ | 2 Watts | ✓ | ✓ | ✗ | N/A | Launched |
| ☐ | Intel® Atom™ Processor Z530P (512K Cache, 1.60 GHz, 533 MHz FSB) | ✓ | 2.2 Watts | ✓ | ✓ | ✗ | N/A | Launched |
| ☐ | Intel® Atom™ Processor Z540 (512K Cache, 1.86 GHz, 533 MHz FSB) | ✗ | 2.4 Watts | ✓ | ✓ | ✗ | N/A | Launched |
| ☐ | Intel® Atom™ Processor Z550 (512K Cache, 2.00 GHz, 533 MHz FSB) | ✗ | 2.4 Watts | ✓ | ✓ | ✗ | N/A | Launched |

FIG. 1

Reading Standards for Literature K–5

Range of Reading and Level of Text Complexity

| Kindergartners | Grade 1 Students | Grade 2 Students |
|---|---|---|
| 10. Actively engage in group reading activities with purpose and understanding.<br>a. Activate prior knowledge related to the information and events in texts.<br>b. Use illustrations and context to make predictions about text. | 10. With prompting and support, read prose and poetry of appropriate complexity for grade 1.<br>a. Activate prior knowledge related to the information and events in a text.<br>b. Confirm predictions about what will happen next in a text. | 10. By the end of the year, read and comprehend literature, including stories and poetry, in the grades 2–3 text complexity band proficiently, with scaffolding as needed at the high end of the range |

Key Ideas and Details

| Grade 3 Students | Grade 4 Students | Grade 5 Students |
|---|---|---|
| 1. Ask and answer questions to demonstrate understanding of a text, referring explicitly to the text as the basis for the answers.<br>2. Recount stories, including fables, folktales, and myths from diverse cultures; determine the central message, lesson, or moral and explain how it is conveyed through key details in the text. | 1. Refer to details and examples in a text when explaining what the text says explicitly and when drawing inferences from the text.<br>2. Determine a theme of a story, drama, or poem from details in the text; summarize the text. | 1. Quote accurately from a text when explaining what the text says explicitly and when drawing inferences from the text.<br>2. Determine a theme of a story, drama, or poem from details in the text, including how characters in a story or drama respond to challenges or how the speaker in a poem reflects upon a topic; summarize the text. |

FIG. 2-1

3. Describe characters in a story (e.g., their traits, motivations, or feelings) and explain how their actions contribute to the sequence of events.

Craft and Structure

4. Determine the meaning of words and phrases as they are used in a text, distinguishing literal from nonliteral language. (See grade 3 Language standards 4-6 on page 22 for additional expectations.)

5. Refer to parts of stories, dramas, and poems when writing or speaking about a text, using terms such as chapter, scene, and stanza; describe how each successive part builds on earlier sections.

6. Distinguish their own point of view from that of the narrator or those of the characters.

3. Describe in depth a character, setting, or event in a story or drama, drawing on specific details in the text (e.g., a character's thoughts, words, or actions).

4. Determine the meaning of words and phrases as they are used in a text, including those that allude to significant characters found in mythology (e.g., Herculean). (See grade 4 Language standards 4-6 on page 22 for additional expectations.)

5. Explain major differences between poems, drama, and prose, and refer to the structural elements of poems (e.g., verse, rhythm, meter) and drama (e.g., casts of characters, settings, descriptions, dialogue, stage directions) when writing or speaking about a text.

6. Compare and contrast the point of view from which different stories are narrated, including the difference between first- and third-person narrations.

3. Compare and contrast two or more characters, settings, or events in a story or drama, drawing on specific details in the text (e.g., how characters interact).

4. Determine the meaning of words and phrases as they are used in a text, including figurative language such as metaphors and similes. (See grade 5 Language standards 4-6 on page 22 for additional expectations.)

5. Explain how a series of chapters, scenes, or stanzas fits together to provide the overall structure of a particular story, drama, or poem.

6. Describe how a narrator's or speaker's point of view influences how events are described.

*FIG. 2-2*

| Medscape www.medscape.com | | | | |
|---|---|---|---|---|
| Class of drug | Compelling indications | Possible indications | Caution | Compelling contraindications |
| Alpha blockers | Benign prostatic hypertrophy | — | Postural hypotension, heart failure* | Urinary incontinence |
| Angiotensin-converting enzyme (ACE) inhibitors | Heart failure<br>Left ventricular dysfunction post-myocardial infarction or established coronary heart disease<br>Type 1 diabetic nephropathy<br>Secondary stroke prevention ¶ | Chronic renal disease f<br>Type 2 diabetic nephropathy<br>Proteinuric renal disease | Renal impairment ‡<br>Peripheral vascular disease ‡ | Pregnancy<br>Renovascular disease § |
| Angiotensin-II receptor blockers | ACE inhibitor intolerance<br>Type 2 diabetic nephropathy<br>Hypertension with left ventricular hypertrophy<br>Heart failure in ACE intolerant patients, after myocardial infarction | Chronic renal disease f<br>Type 2 diabetic nephropathy<br>Proteinuric renal disease<br>antihypertensive drugs<br>Proteinuric renal disease, chronic renal disease †<br>Heart failure | Renal impairment ‡<br>Peripheral vascular disease ‡ | Pregnancy<br>Renovascular disease § |

*FIG. 3-1*

| Beta blockers | Myocardial infarction, angina | Heart failure | Heart failure**, Peripheral vascular disease, Diabetes (except with coronary heart disease) | Asthma or chronic obstructive pulmonary disease, heart block |
|---|---|---|---|---|
| Calcium channel blockers (dihydropyridine) | Elderly patient, isolated systolic hypertension | Angina | — | — |
| Calcium channel blockers (rate limiting) | Angina | Elderly patient | Combination with beta blockade | Heart block, heart failure |
| Thiazides or thiazide-like diuretics | Elderly patient, isolated systolic hypertension, heart failure, secondary stroke prevention | — | — | Gout †† |

Key: *In heart failure when used as monotherapy.
†ACE inhibitors or angiotensin II receptor blockers may be beneficial in chronic renal failure but should only be used with caution, close supervision, and specialist advice when there is established and significant renal impairment.
‡Caution with ACE inhibitors and angiotensin II receptor blockers in peripheral vascular disease because of association with renovascular disease.
§ACE inhibitors and angiotensin II receptor blockers are sometimes used in patients with renovascular disease under specialist supervision.
¶In combination with a thiazide or thiazide-like diuretic.
** Beta blockers are used increasingly to treat stable heart failure but may worsen heart failure.
†† Thiazides or thiazide like diuretics may sometimes be necessary to control blood pressure in people with a history of gout. Ideally used in combination with allopurinol.
Adapted with kind permission from Williams B et al.

FIG. 3-2

Figure 5-1:
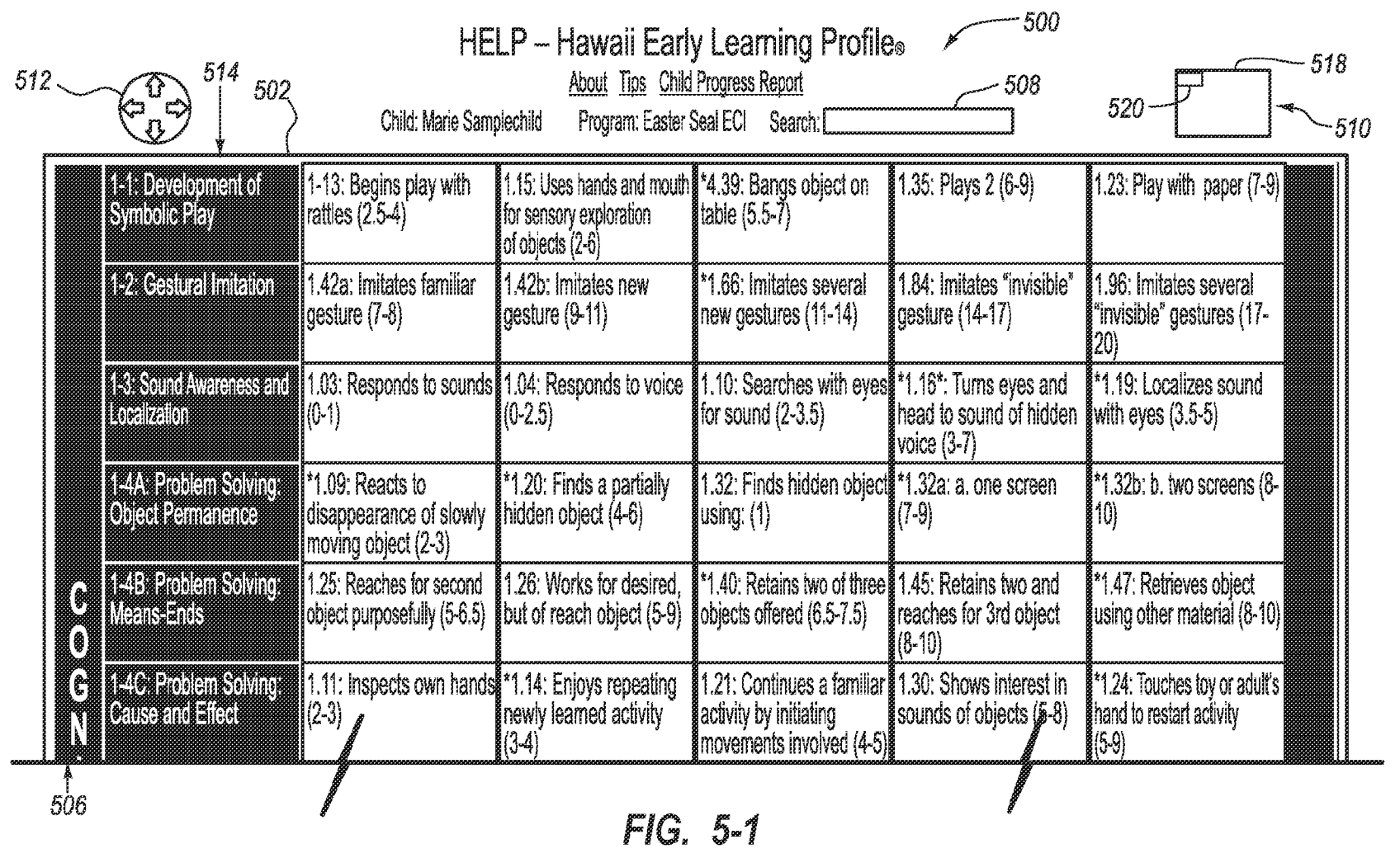

HELP – Hawaii Early Learning Profile®

About  Tips  Child Progress Report

Child: Marie Samplechild    Program: Easter Seal ECI    Search: [___]

| | | | | | |
|---|---|---|---|---|---|
| 1-1: Development of Symbolic Play | 1-13: Begins play with rattles (2.5-4) | 1.15: Uses hands and mouth for sensory exploration of objects (2-6) | *4.39: Bangs object on table (5.5-7) | 1.35: Plays 2 (6-9) | 1.23: Play with paper (7-9) |
| 1-2: Gestural Imitation | 1.42a: Imitates familiar gesture (7-8) | 1.42b: Imitates new gesture (9-11) | *1.66: Imitates several new gestures (11-14) | 1.84: Imitates "invisible" gesture (14-17) | 1.96: Imitates several "invisible" gestures (17-20) |
| 1-3: Sound Awareness and Localization | 1.03: Responds to sounds (0-1) | 1.04: Responds to voice (0-2.5) | 1.10: Searches with eyes for sound (2-3.5) | *1.16*: Turns eyes and head to sound of hidden voice (3-7) | *1.19: Localizes sound with eyes (3.5-5) |
| 1-4A: Problem Solving Object Permanence | *1.09: Reacts to disappearance of slowly moving object (2-3) | *1.20: Finds a partially hidden object (4-6) | 1.32: Finds hidden object using (1) | *1.32a. a. one screen (7-9) | *1.32b. two screens (8-10) |
| 1-4B: Problem Solving Means Ends | 1.25: Reaches for second object purposefully (5-6.5) | 1.26: Works for desired, but of reach object (5-9) | 1.40: Retains two of three objects offered (6.5-7.5) | 1.45: Retains two and reaches for 3rd object (8-10) | *1.47: Retrieves object using other material (8-10) |
| 1-4C: Problem Solving Cause and Effect | 1.11: Inspects own hands (2-3) | *1.14: Enjoys repeating newly learned activity (3-4) | 1.21: Continues a familiar activity by initiating movements involved (4-5) | 1.30: Shows interest in sounds of objects (5-8) | *1.24: Touches toy or adult's hand to restart activity (5-9) |

| | | | | | 504 |
|---|---|---|---|---|---|
| I-5 Spatial Relationships | 1.1: Looks from one object to another (2.5-3.5) | *4.29: Reaches and grasps object (4.5-5.5) | 1.31: Anticipates visually the trajectory of a slowly moving object (5.5-7.5) | 1.37: Follows trajectory of fast moving object (6-8) | *4.48: Takes objects out of container (9-11) |
| I-6A Concepts: Picture | *1.44: Looks at named pictures on minute when named (8-9) | *1.60: Enjoys looking at pictures in books (10-14) | *1.82: Pats picture (14-15) | *1.107: Matches objects to picture (19-27) | 1.117: Points to five (21-30) |
| I-6B Concepts: Numbers | 1.123: Understands concept of one (24-30) | *1.135: Gives one out of many (25-30) | 1.150: Understands concept of two (30-36) | | |
| I-7A Discrimination/Classification: Matching and Sorting | 1.70: Shows understanding of color (12-18) | *1.85: Matches objects (15-19) | *1.108: Sorts objects (19-24) | 1.136: Matches shapes (26-30) | |
| I-7B Discrimination/Classification: Size | 1.70: Shows understanding of size (12-18) | 1.72: Nests two then three cans (12-19) | *1.103: Assembles four nesting blocks (19-24) | 2.76: Uses size words (25-30) | |

506

| | | | |
|---|---|---|---|
| 1.6A Concepts: Picture | *1.60: Enjoys looking at pictures in books (10-14) | *1.82: Pats picture (14-15) | *1.107: Matches objects to picture (19-27) | 1.117: Points to five (21-30) |
| 1.6B Concepts: Numbers | | *1.135: Gives one out of many (25-30) | 1.150: Understands concept of two (30-36) | |
| 1.7A Discrimination/Classification Matching and Sorting | | *1.85: Matches objects (15-19) | *1.108: Sorts objects (19-24) | 1.136: Matches shapes (26-30) |
| 1.7B Discrimination/Classification Size | | 1.72: Nests two then three cans (12-19) | *1.109: Assembles four nesting blocks (19-24) | 2.76: Uses size words (25-30) |
| 2.1A Understanding the meaning of words: Objects, Events, and Relationships | *2.16: Looks and vocalizes to own name (5-7) | *1.38: Looks for family members or pets when named (6-8) | 1.48: Listens selectively to familiar words (8-12) | 1.55: Knows what "no no" means and reacts (9-12) | 2.26: Shows understanding of words by appropriate behavior or gesture (9-14) |
| 2.1B Understanding the meaning of words: Body parts | 1.111: (19-22) Identifies three body parts | 1.119: (22-24) Identifies six body parts | 1.131: (24-28) Knows more body parts | 1.154: Points to six body parts on picture of a doll | |

FIG. 6A-2

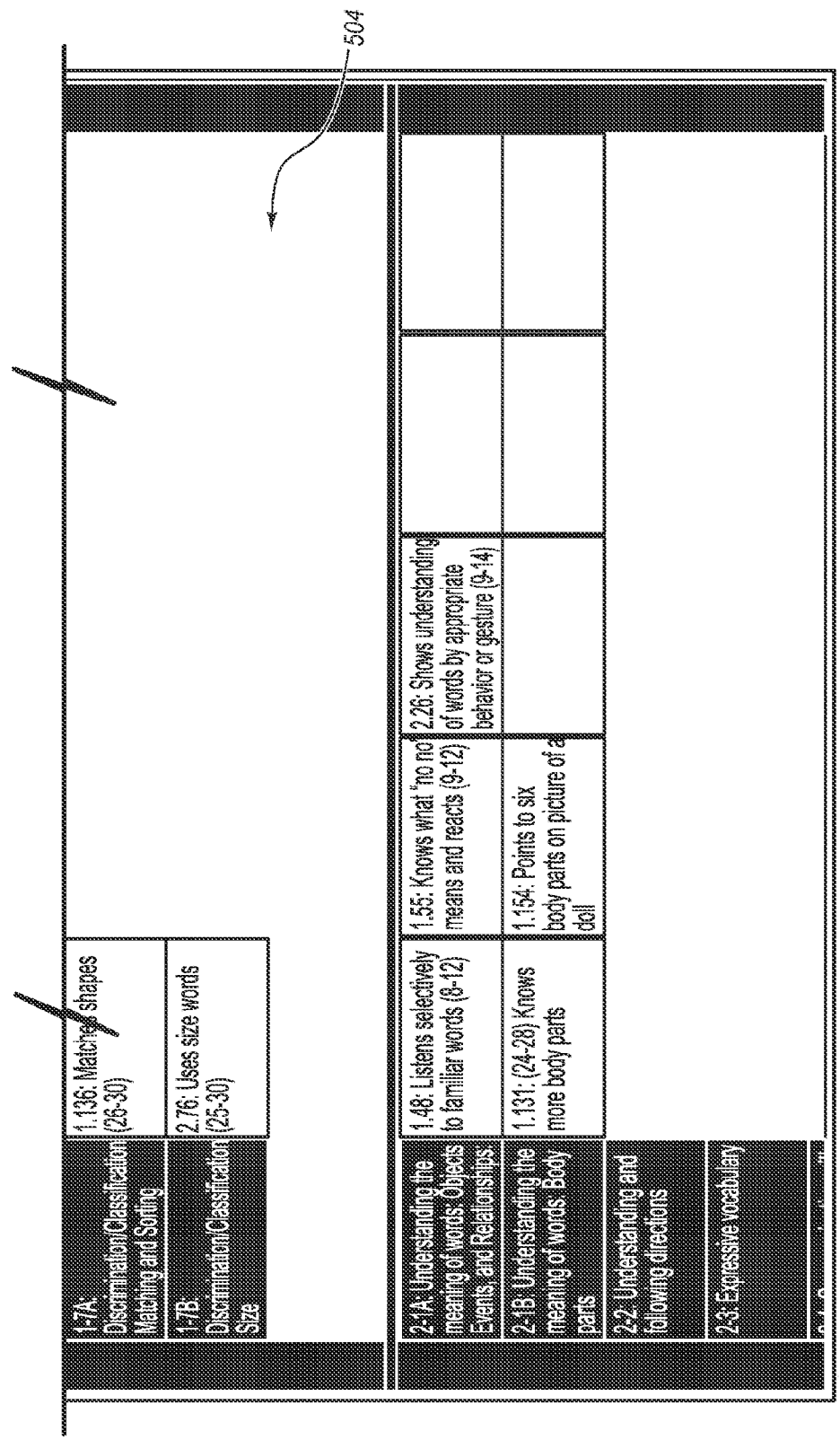

FIG. 7-2

| | | | | | |
|---|---|---|---|---|---|
| I-5: Spatial Relationships | 1.14: Looks from one object to another (2.5-3.5) | *4.29: Reaches and grasps object (4.5-5.5) | 1.31: Anticipates visually the trajectory of a slowly moving object (5.5-7.5) | 1.37: Follows trajectory of fast moving object (6-6) | *4.46: Takes objects out of container (9-11) |
| I-6A Concepts: Picture | *1.44: Looks at named pictures on minute when named (8-9) | *1.60: Enjoys looking at pictures in books (10-14) | *1.82: Pats picture (14-15) | *1.107: Matches objects to picture (19-27) | 1.117: Points to five (21-30) |
| I-6B Concepts: Numbers | looks intently at one or two photos not necessarily a full minute | looks with interest at pictures adult encourages | pats or touches pictures while looking at them | identifies which picture from three or four is the picture of a similar object before him | Seven pictures of familiar objects/people recognizes outline pictures e.g., dog, spoon, doll, leaf, bottle, car |
| I-7A Discrimination/Classification Matching and Sorting | 1.123: Understands concept of one (24-30) | *1.135: Gives one out of many (25-30) | 1.150: Understands concept of two (30-36) | | |
| | 1.70: Shows understanding of color (12-18) | *1.85: Matches objects (15-19) | *1.108: Sorts objects (19-24) | 1.136: Matches shapes (26-30) | |
| I-7B Discrimination/Classification Size | 1.70: Shows understanding of size (12-18) | 1.72: Nests two then three cans (12-19) | *1.109: Assembles four nesting blocks (19-24) | 2.76: Uses size words (25-30) | |

FIG. 8-2

| | | | |
|---|---|---|---|
| I-5: Spatial Relationships | 1.14: Looks from one object to another (2.5-3.5) | *4.29: Reaches and grasps object (4.5-5.5) | 1.31: Anticipates visually the trajectory of a slowly moving object (5.5-7.5) | 1.37: Follows trajectory of fast moving object (6-8) | *4.48: Takes objects out of container (9-11) |
| I-6A: Concepts/Picture | *1.44: Looks at named pictures on minute when named (8-9) | reaches for nearby objects more often than distant objects also in 4 | *1.82: Pats picture (14-15) 528 | *1.107: Matches objects to picture (19-27) | 1.117: Points to five (21-30) |
| I-6B: Concepts/Numbers | 1.123: Understands concept of one (24-30) | *1.60: Enjoys looking at pictures in books (10-14) | 1.150: Understands concept of two (30-36) | | |
| I-7A: Discrimination/Classification/Matching and Sorting | 1.70: Shows understanding of color (12-18) | *1.135: Gives one out of many (25-30) | | *1.108: Sorts objects (19-24) | 1.136: Matches shapes (26-30) |
| I-7B: Discrimination/Classification/Size | 1.70: Shows understanding of size (12-18) | *1.85: Matches objects (15-19) | | *1.109: Assembles four nesting blocks (19-24) | 2.76: Uses size words (25-30) |
| | | 1.72: Nests two then three cans (12-19) 526 | | | |

FIG. 9A-2

HELP – Hawaii Early Learning Profile® — 500

Child: Marie Samplechild    Program: Easter Seal ECI    Search — 508
About  Tips  Child Progress Report

| | | | | | |
|---|---|---|---|---|---|
| COGN | 1-2: Gestural Imitation | 1.42a: Imitates familiar gesture (7-8) | 1.42b: Imitates new gesture (9-11) | *1.66: Imitates several new gestures (11-14) | 1.84: Imitates "invisible" gesture (14-17) | 1.96: Imitates several "invisible" gestures (17-20) |
| | 1-3: Sound Awareness and Localization | 1.03: Responds to sounds (0-1) | 1.04: Responds to voice (0-2.5) | 1.10: Searches with eyes for sound (2-3.5) | *1.16*: Turns eyes and head to sound of hidden voice (3-7) | *1.19: Localizes sound with eyes (3.5-5) |
| | 1-4A: Problem Solving: Object Permanence | *1.09: Reacts to disappearance of slowly moving object (2-3) | 1.20: Finds a partially hidden object (4-6) | 1.32: Finds hidden object using: (1) | *1.32a. a one screen (7-9) | *1.32b. b. two screens (8-10) |
| | 1-4B: Problem Solving: Means-Ends | 1.25: Reaches for second object purposefully (5-6.5) | 1.26: Works for desired, but of reach object (5-9) | *1.40: Retains two of three objects offered (6.5-7.5) | 1.45: Retains two and reaches for 3rd object (8-10) | *1.47: Retrieves object using other material (8-10) |
| | 1-4C: Problem Solving: Cause and Effect | 1.11: Inspects own hands (2-3) | *1.14: Enjoys repeating newly learned activity (3-4) | 1.21: Continues a familiar activity by initiating movements involved (4-5) | 1.30: Shows interest in sounds of objects (5-8) | *1.24: Touches toy or adult's hand to restart activity (5-9) |

FIG. 9B-1

| | | | | | |
|---|---|---|---|---|---|
| I-5: Spatial Relationships | 1.14: Looks from one object to another (2.5-3.5) | | 1.31: Anticipates visually the toy of a slowly moving fast moving object (5.5-7.5) | 1.37: Follows trajectory of 542 toy of a slowly moving fast moving object (6-8) | *4.46: Takes objects out of container (9-11) |
| I-6A: Concepts Picture | *1.44: Looks at named pictures on minute when named (8-9) | *4.29: Reaches and grasps object (4.5-5.5) | *1.82: Pats picture (14-15) | | 1.117: Points to five (21-30) |
| I-6B: Concepts Numbers | 1.123: Understands concept of one (24-30) | *1.60: Enjoys looking at pictures in books (10-14) | 1.150: Understands concept of two (30-36) | *1.107: Matches objects to picture (19-27) | |
| I-7A: Discrimination/Classification Matching and Sorting | 1.70: Shows understanding of color (12-18) | *1.135: Gives one out of many (25-30) | *1.108: Sorts objects (19-24) | 1.136: Matches shapes (26-30) | |
| I-7B: Discrimination/Classification Size | 1.70: Shows understanding of size (12-18) | *1.85: Matches objects (15-19) | *1.109: Assembles four nesting blocks (19-24) | 2.76: Uses size words (25-30) | |
| | | 1.72: Nests two then three cans (12-19) | | | |

HELP – Hawaii Early Learning Profile®

Child: Marie Samplechild    Program: Easter Seal ECI    Search: body p

About   Tips   Child Progress Report

Tooltip (508): 2-18: Understanding the meaning of words: Body parts
- 1.91: Identifies one body part
- 1.111: Identifies three body parts
- 1.119: Identifies six body parts
- 1.131: Knows more body parts

| | | | | |
|---|---|---|---|---|
| 1-3: Sound Awareness and Localization | 1.03: Responds to sounds (0-1) | 1.04: Responds to voice (0-2.5) | 1.10: Searches for sound (2-3.5) | 1.19: Localizes sound with eyes (3.5-5) |
| 1-4A: Problem Solving Object Permanence | *1.09: Reacts to disappearance of slowly moving object (2-3) | *1.20: Finds a partially hidden object (4-6) | 1.32: Finds hidden object using: (1) | *1.32b: b. two screens (8-10) |
| 1-4B: Problem Solving Means/Ends | 1.25: Reaches for second object purposefully (5-6.5) | 1.26: Works for desired, but out of reach object (5-9) | *1.40: Retains two of three objects offered (6.5-7.5) | *1.47: Retrieves object using other material (8-10) |
| 1-4C: Problem Solving Cause and Effect | 1.11: Inspects own hands (2-3) | *1.14: Enjoys repeating newly learned activity (3-4) | 1.21: Continues a familiar activity by initiating movements involved (4-5) | *1.24: Touches toy or adult's hand to restart activity (5-9) |
| 1-5 Spatial Relationships | 1.14: Looks from one object to another (2.5-3.5) | 1.29: Reaches and grasps object (4.5-5.5) | 1.31: Anticipates visually the trajectory of a slowly moving fast moving object (5.5-7.5) | *4.46: Takes objects out of container (9-11) |
| 1-6A Concepts: Picture | *1.44: Looks at named pictures on minute when named (8-9) | *1.60: Enjoys looking at pictures in books (10-14) | *1.82: Pats picture (14-15) | *1.107: Matches objects to picture (19-27) |
| | | | | 1.117: Points to five (21-30) |

COGNITIVE

FIG. 12-1

| | | | | | |
|---|---|---|---|---|---|
| 1-6B: Concepts: Numbers | 1.123: Understands concept of one (24-30) | *1.135: Gives one out of many (25-30) | 1.150: Understands concept of two (30-36) | | |
| 1-7A: Discrimination/Classification: Matching and Sorting | 1.70: Shows understanding of color (12-18) | *1.85: Matches objects (15-19) | *1.108: Sorts objects (19-24) | 1.136: Matches shapes (26-30) | |
| 1-7B: Discrimination/Classification: Size | 1.70: Shows understanding of size (12-18) | 1.72: Nests two then three cans (12-19) | *1.109: Assembles four nesting blocks (19-24) | 2.76: Uses size words (25-30) | |
| 2-1A: Understanding the meaning of words: Objects, Events, and Relationships | 1.12: Watches speaker's hands and mouth (2-3) | *2.16: Looks and vocalizes to own name (5-7) | *1.38: Looks for family members or pets when named (6-8) | 1.48: Listens selectively to familiar words (8-12) | 1.55: Knows what "no no" means and reacts (9-12) |
| 2-1B: Understanding the meaning of words: Body parts | | 1.111: (19-22) Identifies three body parts | 1.119: (22-24) Identifies six body parts | 1.131: (24-28) Knows more body parts | 1.154: Points to six body parts on picture of a doll |

*FIG. 12-2*

|  | 1 | 2 | 3 | 4 | 5 |
|---|---|---|---|---|---|
| 09:OBEDIENCE | 1: Lack any sense of discipline or direction | 2: There are no gods although people do have a spiritual sense | | | 5: Fail to follow the leadership of the Holy Spirit (1 Thessalonians 5:19) |
|  | | 2: Obedient only to myself | | | |
| 10:KNOWLEDGE/SELF-CONCEPT | 1: Realize need information concerning life in general | 2: Know difference of relative and absolute Truth | 3: *Know nature, source, and endurance of Truth | | |
| 11:HUMAN NATURE/STRESS | 1: Undermine others | 2: Believe ill of others | 3: Engage in gossip | 4: Engage in loose sexual behavior | 5: *Have a quick temper |
| 12:TRUTH | 1: Not something I think about due to everyday life issues | 2: Not something I want to think about – I know whats what and true | 3: *Believe all things | 4: *Believe truth is what one person does | 5: Believe truth is relative to own perception |
| 13:JESUS | 1: *The spiritual side of humankind is a fantasy | 2: My life is out of control – no hope | 3: I am the one who best controls my own life | 4: I do need help with controlling issues in my life | 5: Feel non-religious counseling offers best support/control for my life |
| 14:BEATITUDES | 1: Accept the slave morality of Christianity | 2: Advocate a life without striving (James Joyce, | | 4: Consider self poor in spirit | |

FIG. 17A-2

Continuum to Christ

My Progress  Bible Links  About  Help  Personal Reports
Name: Bob Sample  Church Memo Open Doors  Search:

| | 1 | 2 | 3 | 4 | 5 |
|---|---|---|---|---|---|
| 01-LIFE | 1. Doubt life has purpose beyond living then dying | 2. Believe existence and life is random | 3. Believe each life has a purpose, but not sure why or what | 4. Believe solely in Darwin's theory of evolution | 5. Accept Darwin (scientific evolution) and reject creationism |
| 02-SELF-CONCEPT/ CONTROL | 1. Feel empty and worthless | 2. *Believe in total control of self | 3. *Preoccupied with self | 4. *Scheme with cunning | 5. *Pursue sensuality |
| 03-MORALITY/ETHICS | 1. Feel right or wrong is totally a personal choice | 2. Believe there is no such thing as sin since there is no God | 3. Rejoice in sin | 4. Believe sin is relative to culture | 5. Discern good and evil based on prevailing social mores |
| 04-RELATIONSHIPS | 1. *Been alone most of life | 2. *Not able to feel love, care and concern for others | 3. *Put others down | 4. *Fail at relationships | 5. *Feel outside all groups |
| 05-LEARNING/ SPIRITUAL GROWTH | 1. Never liked learning | 2. *Failed in school | 3. Find learning is difficult | 4. Talk, think and reason like a child | 5. Believe self-education is sufficient |
| 06-TIME VALUE | 1. Avoid work | Dislike formal education. Become stubborn when rebuked and will not repent | 3. Rationalize need to plan | 4. Don't like to plan | 5. Deny purpose or need for goals |
| 07-FAITH | 1. Faith is a fools venture | 2. Avo... | ere is no spiritual life | 4. *There is no God | 5. *Create own spiritual nature |
| 08-GOD | 1. The spiritual side of humankind is a void / fantasy | 2. Life withou... | re are many gods, and demons | | 5. There is one God but not the God of Abraham |

Popup menu (624):
- Personalize Detail
- Check My Status
- See Related Details
- Add Private Note
- Add Comment

ACCEPT — ONE GOD

FIG. 17B-1

Continuum to Christ®

My Progress  Bible Links  About  Help  Personal Reports

Name: Bob Sample   Church: Menlo Open Doors   Search: [      ]

| | 1 | 2 | 3 | 4 | 5 |
|---|---|---|---|---|---|
| 01-LIFE | 1: Doubt life has purpose beyond living then dying | 2: Believe existence and life is random | 3: Believe each life has a purpose, but not sure why or what | 4: Believe solely in Darwin's theory of evolution | 5: Accept Darwin (scientific evolution) and reject creationism |
| 02-SELF CONCEPT/CONTROL | 1: Feel empty and worthless | 2: *Believe in total control of self | 3: *Preoccupied with self | 4: *Scheme with cunning | 5: *Pursue sensuality |
| 03-MORALITY/ETHICS | 1: Feel right or wrong is totally a personal choice | 2: Believe there is no such thing as sin since there is no God | 3: Rejoice in sin | 4: Believe sin is relative to culture | 5: Discern good and evil based on prevailing social mores |
| 04-RELATIONSHIPS | 1: *Been alone most of life | 2: *Not able to feel love, care and concern for others | 3: *Put others down | 4: *Fail at relationships | 5: *Feel outside all groups |
| 05-LEARNING/SPIRITUAL GROWTH | 1: Never liked learning | 2: *Failed in school | 3: Find learning is difficult | 4: *Talk, think and reason like a child | 5: Believe self-education is sufficient |
| 06-TIME VALUE | 1: Avoid work | | | Don't like to plan | 5: Deny purpose or need for goals |
| 07-FAITH | 1: Faith is a fools venture | | | *There is no God | 5: *Create own spiritual nature |
| 08-GOD | 1: The spiritual side of humanism is a void / fantasy | | | | 5: There is one God but not the God of Abraham |

ACCEPT — ONE GOD

Add Private Note
Enter your private note. This note will NOT be viewable by other users.
Private Note [      ]

FIG. 17C-1

P-POD™ using Kontinuums™

My Progress  Reports  About  Help

Child: Marie SampleChild   Pediatrician: Dr. Brenda   Search:

| | Newborn | 1 Month | 2 Mo |
|---|---|---|---|
| Sleeping | Sleeps in own crib | Alert 1 hour during day | Sleep night |
| Eating & Drinking | Nipple feeds 8 - 12 times in 24 hours | Continues to nipple feed | Cont feed |
| Dressing | Starts at 15 months | Starts at 15 months | Start |
| Toilet Training | Starts at 15 months | Starts at 15 months | Start |
| Social-Emotional | Soothes when picked up | Quiets to face/voice | Soci |
| Fine Motor | Grasps | Brings hand to mouth | Hand |

Cell 01-01-02

1.03 – Responds to sounds now (0-3)

| Status | Criteria | Parent Q | Observe | At Home |
|---|---|---|---|---|
| ✎ | + usually displays typical responses | | 04/07/2011 | Responds well. |
| ✎ | A+ displays predominantly over-reactive responses | | 01/13/2011 | Improvement |
| ✎ | A- predominantly displays under-reactive responses | | 10/07/2010 | Parents concerned |

Status: 
- ✓ + usually displays typical responses
- A+ displays predominantly over-reactive responses
- A+ displays combination of responses
- A- predominantly displays under-reactive responses
- N/A inappropriate to observe due to disability or delay
- O environment and/or interactions do not support Comment:

4/07/2011

(Save)  Close

Cell 01-01

0-0 Regulatory / Sensory Organization

| Comments | Fam | Prof | ParQ | OutC | Trans | Needs | Adapt | Gen | Mat |

Family Friendly Interpretations of Strand Concepts, Assessment, & Purpose:

We will be observing how your child is learning to play with toys and other objects. Play is very important in a child's learning and development. Play helps children learn how to solve problems and helps them enjoy, understand, and get along in their world. When a child plays, he can learn about the various qualities of objects and what he can do with them. For example, that rubber things can bounce and that hard objects make noises when they drop. Children can also learn to imitate and practice different roles, activities and feelings during play. For example, when a child pretends to play house or diapers and hugs a doll, he is practicing a new role and learning to express feelings that he can't quite yet put into words.

Learning to play with toys seems to develop in a fairly predictable sequence, from simple to more complex.

1. At first, infants don't really care what they are playing with; they are more interested in their own actions. Their favorite interactions with toys are looking, mouthing, shaking, and banging. They will do one or more of these things with a toy or object no matter what it is! For example, if we give a child a block, he plays with it by mouthing it or banging it, rather

924

Comment: [            ]

(Save)

[Close]

*FIG. 28*

HELP® using Kontinuums™
My Progress   Reports   About   Help
Child: Bobby SampleChild   Pediatrician: Dr. Early   Search: ☐

| LANGUAGE | 0 Months | 1 Months | 2 Months | 3 Months | 4 Months |
|---|---|---|---|---|---|
| 2-3 Expressive Vocabulary | | | | | |
| 2-4A Communicating with Others: Gesturally | | 1.06--Shows active interest in person/object... (1-6) | | | 1.21--Continues a familiar activity by... (4-5) |
| 2-4B Communicating with Others: Verbally | | 2.05--Cry varies in pitch, length and volume... (1-5) | | 2.11--Responds to sound stimulation or speech... (3-6) | |
| 2-5 Learning Grammar and Sentence Structure | | | | | |
| 2-6 Development of Sounds and Intelligibility | 2.01(0-1.5) 2.03(0-2.5) 2.04(0.5-3) | | 2.07(2-7) 2.08(2-7) 2.09(2.5-4.5) | | 2.13--Babbles consonant chains "baba (4-6.5) |
| 2-7 Communicating through Rhythm | | | | | |

FIG. 30-1

| | | | 3.09--Extends both legs (1.5-2.5) | | 3.07--Holds head up 90 degrees in prone (3-5) | 3.26--Bears weight on hands in prone (4-6) | |
|---|---|---|---|---|---|---|---|
| 3-1 Prone | | 3.03(0-2) 3.04(0-2.5) 3.05(0-2) | | 3.15(2-4) 3.16(2-3) | | | |
| 3-2 Supine | 3.02--Turns head to both sides in supine (0-2) | | 3.09(1.5-2.5) 3.11(1.5-2.5) 4.07(1-3.5) | 3.14--Assumes withdrawal position (2-3.5) | | 4.23--Looks with head in midline (4-5) | 1.29 3.35 |
| 3-3 Sitting | | | | | 3.21(3-5) 3.22(3-5) | 3.32--Moves head actively in supported sit (4-5) | 3.29 3.33 3.34 |
| 3-4 Weight - bearing in Standing | | | | | 3.23--Bears some weight on legs (3-5) | | 3.36 all w 6) |
| 3-5 Mobility and Transitional Movements | | | 3.09--Rolls side to supine (1.5-2) | 3.17--Rolls prone to supine (2-5) | | 3.28--Rolls supine to side (4-5.5) | 3.31 3.38 |
| 3-6 Reflexes / Reactions / Responses | | 3.01(0-2) 3.06(0-1) | 3.08(1.5-2.5) 3.13(1-2) | 3.12(2-4) 3.18(2.5-3.5) | 3.20--Holds head in line with body (3-6.5) | 3.19(4-6) 3.27(4-6) | 3.24 3.25(4-7) 3.37 3.39(4-6) |
| 3-7A Advancing Postural Control: Standing | | | | | | | |
| 3-7B Advancing Postural | | | | | | | |

GROSS

FIG. 30-2

HELP® using Kontinuums™

My Progress  Reports  About  Help
Child: Bobby SampleChild  Pediatrician: Dr. Early  Search: _____

| | 0 Months | 1 Months | 2 Months | 3 Months | 4 Months |
|---|---|---|---|---|---|
| 0-0 Sensory integration | | | | | |
| 1-3 Sound Awareness and Localization | 1.01(0-1) 1.02(0-6) 1.03(0-1) 5.01(0-3) 5.05(0-3) | 1.05(1-2) 1.06(1-6) 1.07(1-3) 6.04(1-3) | 1.10-Searches with eyes for sound (2-3.5) | 1.15(3-6) 5.08*(3-6) 5.15(3-6) | 1.22(4-6) 5.18(4-8) |
| 2-6 Development of Sounds and Intelligibility | 1.03(0-1) 1.04(0-2.5) | | 1.16*(3-7) 1.19(3.5-5) | | 2.13-Babbles consonant chains "baba" (4-6.5) |
| | 2.01(0-1.5) 2.03(0-2.5) 2.04(0.5-3) | | 2.07(2-7) 2.08(2-7) 2.09(3.5-4.5) | | |
| 1-3 Sound Awareness and Localization | 1.03(0-1) 1.04(0-1.5) | | 1.16*(3-7) 1.19(3.5-5) | | |
| 3-6 Reflexes / Reactions / Responses | 3.01(0-1) 3.06(0-1) | 3.08(1.5-2.5) 1.13(1-2) | 3.12(2-4) 3.18(2.5-3.5) | 3.20-Holds head in line with body (3-6.5) | 3.19(4-6) 3.25(4-7) 3.27(4-6) 3.39(4-6) |
| 4-1 Visual responses and tracking | 4.01(0-1) 4.03(1.5-2.5) 4.04(0.5-1.5) | 4.05(1-2) 4.06(1-3) | 4.09(2-3) 4.10(2-3) 4.11(2-3) 4.17(2-3) 4.19(2-3) | 4.18-Follows with eyes moving object in... (3-4.5) | 4.24(4-6) 4.31(4.5-5.5) |
| 5-3 Expression of Emotions and Feelings | 2.02(0-1) 5.03(0-1.5) | 2.06*(1.5-4) 5.07*(1.5-4) | 2.10-Squeals (2-5.5) | 5.13-Vocalizes attitudes (3-6) | |
| 5-5 Social Interactions and Play | 5.02(0-1) 5.04*(0-2) 5.05(0-3) | 5.07-Responds with smile when socially... (1.5-4) | | 2.12(3-5) 5.09(3-5) 5.12(3-8) 5.15(3-6) | 5.19-Repeats enjoyable activities (4-8) |
| 6-1 Oral - Motor development | 6.01-Opens and closes mouth in response to... (0-1) | 6.02-Coordinates sucking, swallowing, and... (1-5) | 6.06-Suck and swallow reflex inhibited (2-5) | 6.08-Swallows strained or pureed foods (3-6) | 6.11(4-8.5) 6.12(4-6) |

FIG. 31

K Control

Applications | Accounts | Targets | Cell Data | Notices | Event Log | Pages | Reports << Back To App    << Back To Mastery Code List

Edit Mastery Code

RSN          3
Application  HELP
Name         HELP

Legend (Save Page)  (Cancel)

Entries

Create New Mastery Code Entry
There are currently 6 Mastery Code Entries.

| | Value | Color |
|---|---|---|
| Edit Delete | + usually displays typical responses | Green |
| Edit Delete | A+ displays predominantly over-reactive responses | Orange |
| Edit Delete | A- predominantly displays under-reactive responses | Yellow |
| Edit Delete | A+- displays combination of responses | Purple |
| Edit Delete | O environment and/or interactions do not support | Brown |
| Edit Delete | N/A inappropriate to observe due to disability or delay | Blue |

Kontinuums © Copyright 2010-2011 SurfMax, Inc. Confidential / Company Private.

*FIG. 32*

K Control

| Applications | Accounts | Targets | Cell Data | Notices | Event Log | Pages | Reports |

Applications

Create New Application
There are currently 6 Applications.

| | RSN | Name | Uses Grid Cell Values | Uses Targets | Grid Width | Grid Height |
|---|---|---|---|---|---|---|
| Edit Delete | 10 | Canadian Wine | | | 0 | 0 |
| Edit Delete | 11 | Examples | ✓ | ✓ | 6 | 14 |
| Edit Delete | 13 | HELP | ✓ | ✓ | 12 | 16 |
| Edit Delete | 12 | Ppod | ✓ | ✓ | 12 | 11 |
| Edit Delete | 14 | Service Testing | ✓ | ✓ | 0 | 0 |
| Edit Delete | 15 | Test_Import | ✓ | ✓ | 37 | 60 |

Kontinuums. © Copyright 2010-2011 SurfMax, Inc. Confidential / Company Private.

*FIG. 33*

K Control

[Applications] [Accounts] [Targets] [Cell Data] [Notices] [Event Log] [Pages] [Reports]

Edit Application

| | |
|---|---|
| RSN | 13 |
| Name | |
| Uses Grid Cell Values | ☑ |
| Uses Learners | ☑ |
| Grid Dimensions | 12 x 16 (W x H) |

| | | | |
|---|---|---|---|
| Uses Cell Field 1 | ☑ | Field 1 Name | Criteria |
| Uses Cell Field 2 | ☑ | Field 2 Name | Definition |
| Uses Cell Field 3 | ☑ | Field 3 Name | Parent Q |
| Uses Cell Field 4 | ☑ | Field 4 Name | Observe |
| Uses Cell Field 5 | ☑ | Field 5 Name | Safety |
| Uses Cell Field 6 | ☑ | Field 6 Name | At Home |
| Uses Cell Field 7 | ☑ | Field 7 Name | Training |
| Uses Cell Field 8 | ☐ | Field 8 Name | |
| Uses Cell Field 9 | ☐ | Field 9 Name | |
| Uses Cell Field 10 | ☐ | Field 10 Name | |

| | | | |
|---|---|---|---|
| Uses Strand Field 1 | ☑ | Strand 1 Name | Fam |
| Uses Strand Field 2 | ☑ | Strand 2 Name | Prof |
| Uses Strand Field 3 | ☑ | Strand 3 Name | ParQ |
| Uses Strand Field 4 | ☑ | Strand 4 Name | OutC |
| Uses Strand Field 5 | ☑ | Strand 5 Name | Trans |
| Uses Strand Field 6 | ☑ | Strand 6 Name | Needs |
| Uses Strand Field 7 | ☑ | Strand 7 Name | Adapt |
| Uses Strand Field 8 | ☑ | Strand 8 Name | Gen |
| Uses Strand Field 9 | ☑ | Strand 9 Name | Mat |
| Uses Strand Field 10 | ☐ | Strand 10 Name | |

| | |
|---|---|
| Web Header | `<div style = "header1">HELP®</div>`<br>`<div style = "header2" >Hawaii Early Learning Program®</div>` |
| Web Footer | `<div style = "footer" > 2010 - 2011 ©VORT Corporation, Company Private.</div>` |

[Save Application]

*FIG. 34*

K Control

[Applications] [Accounts] [Targets] [Cell Data] [Notices] [Event Log] [Pages] [Reports]

<< Back To App::

Grid Cells

ID: [_____] (Select Grid Cells)

Create New: Grid Cell  Strand Header  Column Header  Domain
There are currently 156 Grid Cells.

| | | RSN | Type | ID | Mystery Code | Text |
|---|---|---|---|---|---|---|
| Edit | Delete | 4 | Column Header | 00-00-01 | | Newborn |
| Edit | Delete | 5 | Column Header | 00-00-02 | | 1 Month |
| Edit | Delete | 6 | Column Header | 00-00-03 | | 2 Months |
| Edit | Delete | 7 | Column Header | 00-00-04 | | 4 Months |
| Edit | Delete | 8 | Column Header | 00-00-05 | | 6 Months |
| Edit | Delete | 9 | Column Header | 00-00-06 | | 9 Months |
| Edit | Delete | 10 | Column Header | 00-00-07 | | 12 Months |
| Edit | Delete | 11 | Column Header | 00-00-08 | | 15 Months |
| Edit | Delete | 12 | Column Header | 00-00-09 | | 18 Months |
| Edit | Delete | 13 | Column Header | 00-00-10 | | 24 Months |
| Edit | Delete | 14 | Column Header | 00-00-11 | | 30 Months |
| Edit | Delete | 15 | Column Header | 00-00-12 | | 36 Months |
| Edit | Delete | 355 | Domain | 01 | | PPOD |
| Edit | Delete | 16 | Column Header | 01-01 | | Sleeping |
| Edit | Delete | 26 | Grid Cell | 01-01-01 | 03.01 | Sleeps in own crib |
| Edit | Delete | 27 | Grid Cell | 01-01-02 | | Alert 1 hour during day |
| Edit | Delete | 28 | Grid Cell | 01-01-03 | 03.01 | Sleep 3-4 hours at night |
| Edit | Delete | 29 | Grid Cell | 01-01-04 | 03.01 | Has baby bedtime routine |
| Edit | Delete | 30 | Grid Cell | 01-01-05 | 03.01 | Sleeps 8 hours at night |
| Edit | Delete | 31 | Grid Cell | 01-01-06 | 03.01 | Sleeps 8-10 hours at night |
| Edit | Delete | 32 | Grid Cell | 01-01-07 | 03.01 | Falls asleep in crib |
| Edit | Delete | 33 | Grid Cell | 01-01-08 | 03.01 | Has toddler bedtime routine |
| Edit | Delete | 34 | Grid Cell | 01-01-09 | 03.01 | Sleeps 10 hours at night & 3-4 during day |
| Edit | Delete | 35 | Grid Cell | 01-01-10 | 03.01 | Sleeps 10 hours at night & 1-3 during day |
| Edit | Delete | 36 | Grid Cell | 01-01-11 | 03.01 | Sleeps in own bed |
| Edit | Delete | 37 | Grid Cell | 01-01-12 | 03.01 | Sleeps 10-11 hours at night & 1-2 during day |
| Edit | Delete | 17 | Column Header | 01-02 | | Eating & Drinking |
| Edit | Delete | 38 | Grid Cell | 01-02-01 | 03.01 | Nipple feeds 8-12 times in 24 hours |
| Edit | Delete | 39 | Grid Cell | 01-02-02 | 03.01 | Continues to nipple feed |
| Edit | Delete | 40 | Grid Cell | 01-02-03 | 03.01 | Continues to nipple feed |
| Edit | Delete | 41 | Grid Cell | 01-02-04 | 03.01 | Brings hands to midline |

*FIG. 35*  —1006

USER INTERFACES FOR NAVIGATING STRUCTURED CONTENT

CROSS REFERENCE TO A RELATED APPLICATION

This application claims priority to and the benefit of U.S. Provisional Patent Application Ser. No. 61/328,572, entitled SYSTEM AND METHOD FOR GRAPHICAL DISPLAY, NAVIGATION, AND INTERACTION WITH MULTI-DIMENSIONAL STRUCTURED CONTENT, which was filed on Apr. 27, 2010.

BACKGROUND

Grid-based or table-based arrays of information, along with instructional systems in learning environments that harness the internet, intranets, databases, courses, teaching units, and lexicons are growing at an explosive rate. Most such content can be "structured" into scope and sequence arrays that connote either a sense of developmental "progress" (a progression of steps leading from more elementary to more advanced or complex steps) or can be structured to represent a range or spectrum of information, not unlike a color spectrum or a bell curve. These "progression" or "spectral" informational arrays can be quite large and can be considered multi-dimensional in that information or steps at any one level may have sub-component steps or elements, which themselves have sub-steps.

Current use or display of such arrays is accomplished through either: 1) a print format, such as a book or chart, or 2) a computer screen displaying charts or graphs such as a spreadsheet or an interactive digital row-column display. However, often such content has multiple layers or relationships that are difficult to represent. For example, a book or chart does not provide an easy access to the content of a large array. Also, while information can be displayed on computer screens as spreadsheets in a row-column manner, and can algorithmically relate one cell or item of information to another cell(s) or spreadsheet or website, such actual relational aspects are usually the custom result of the spreadsheet's user and not intrinsic to the design of the spreadsheet as a spreadsheet typically comes as an empty software solution without content. Spreadsheets provide access to and management of fixed-size arrays, but not to variable-sized, N-dimensional arrays.

One approach for displaying and managing such arrays is to easily expand and contract the display of and access to layers of related content, allowing the user to view and interact with additional content within a limited-size display screen on a device. However, expansion and contraction of screen objects is typically associated with overlapping, and thus obscuring, surrounding screen objects.

With conventional data display, navigation and interaction, the user can be presented with an array that vastly exceeds the displayable area of their device. Further, none of the existing conventional methods intrinsically provide a method for the user to link or navigate to sub-Steps related to the cell (e.g., an instructional step or skill), link to resources of other related cells within the array (e.g., related skills), capture the user's rating of the cell content or credit/score on achievement/mastery relative to the cell's content, or create "social" links to other users based on the pertinence or applicability of the cell's content, comments by other users on the cell's content, or the user's score relative to the cell's content.

Social networks, such as Facebook®, MySpace® and LinkedIn®, have proliferated and are now part of the global culture. However, such networks typically rely on "freely-associated" or "open" content wherein a user creates his/her personal content on any subject, without a "structure" or "progression" of content implied or provided by the underlying social-networking system (to which other users could attach their content). One of the major appeals of such social networks is the creation of "open" content and messages. But one aspect of the "open" approach that is missing is a system for using "default" structured content to spawn social interest and interaction, with such content providing an underlying structured knowledge to which users can edit or attach their own content, comments, share interests and create a network based on the theme of specific steps or topics or domains of knowledge.

BRIEF SUMMARY OF SOME EXAMPLE EMBODIMENTS

In general, example embodiments of the invention relate to user interfaces for navigating structured content. At least some of the example user interfaces disclosed herein enable large amounts of structured content to be efficiently shared across social networks or displayed, modified, cross-referenced, and/or tracked.

In one example embodiment, a user interface for navigating structured content includes a grid and a plurality of multi-dimensional cells each having a unique position in the grid. Each cell is configured to display only a first dimension of structured content before selection and display one or more additional dimensions of structured content upon selection.

In another example embodiment, a social-networking system of user interfaces for navigating structured content and for content-driven and context-specific social networking includes multiple user interfaces. Each user interface includes a grid and a plurality of multi-dimensional cells each having a unique position in the grid. Each cell is configured to display only a first dimension of prepopulated structured content before selection and to display one or more additional dimensions of prepopulated and/or user-modified structured content upon selection. Each user interface is associated with a user. The social-networking system automatically monitors the interaction of each user with the associated user interface and recommends users to each other based on the monitoring of user interaction with the user interfaces.

In yet another example embodiment, a user interface for navigating structured content includes a grid comprising rows and columns, a header row of cells each positioned in a separate column of the grid, a header column of cells each positioned in a separate row of the grid, a plurality of multi-dimensional cells each having a unique position in the grid, and a viewport that displays only a portion of the grid. Upon of reception an indication that the portion of the grid displayed within the viewport should simultaneously scroll both horizontally and vertically, the multi-dimensional cells of the grid are configured to scroll simultaneously within the viewport both horizontally and vertically, and the header row cells and header column cells of the grid are configured to scroll in a synchronous manner so as to remain visible in the viewport and remain aligned with the rows and columns of multi-dimensional cells.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to example embodiments thereof which are disclosed in the appended drawings. It is to be understood that the drawings are diagrammatic and schematic representations of such example embodiments, and are not limiting of the present invention, nor are they necessarily drawn to scale. Aspects of the invention will be described and explained with additional specificity and detail through the use of the accompanying drawings in which:

FIGS. 1 to 3-2 disclose example matrices of structured content;

FIGS. 5-1 and 5-2 disclose a first example user interface for navigating structured content;

FIGS. 6A-1 to 6B-2 disclose diagonal scrolling within the user interface of FIGS. 5-1 and 5-2;

FIGS. 7-1 and 7-2 disclose accordion expansion of a row within the user interface of FIGS. 5-1 and 5-2;

FIGS. 8-1 and 8-2 disclose accordion expansion and a pop-up dialog of a cell within the user interface of FIGS. 5-1 and 5-2;

FIGS. 9A-1 to 9B-2 disclose accordion expansion of a cell and a pop-up menu of the cell within the user interface of FIGS. 5-1 and 5-2;

FIGS. 10-1 and 10-2 disclose accordion expansion of a cell within the user interface of FIGS. 5-1 and 5-2;

FIGS. 11-1 and 11-2 disclose accordion expansion of a cell and a modal window of a cell within the user interface of FIGS. 5-1 and 5-2;

FIGS. 12-1 and 12-2 disclose search capabilities within the user interface of FIGS. 5-1 and 5-2;

FIGS. 13-1 and 13-2 disclose a second example user interface for navigating structured content;

FIGS. 14-1 and 14-2 disclose accordion expansion of a row within the user interface of FIGS. 13-1 and 13-2;

FIGS. 15A-1 to 15B-2 disclose various stages of accordion expansion of a cell within the user interface of FIGS. 13-1 and 13-2;

FIGS. 16A-1 to 16B-2 disclose simultaneous accordion expansion of multiple cells within the user interface of FIGS. 13-1 and 13-2;

FIGS. 17A-1 to 17F-2 disclose accordion expansion of a cell, a drop-down menu of the cell, various pop-up windows of the cell within the user interface of FIGS. 13-1 and 13-2;

FIGS. 18-1 and 18-2 disclose a pop-up social-networking window of a cell within the user interface of FIGS. 13-1 and 13-2;

FIG. 21 discloses a fourth example user interface for navigating structured content;

FIGS. 25-1 and 25-2 disclose the user interface of FIG. 21 employed in the context of a network-based social network;

FIGS. 27A to 27C disclose various interface objects of a first cell within the user interface of FIG. 26;

FIG. 28 discloses an interface object of a second cell within the user interface of FIG. 26;

FIGS. 29-1 and 29-2 disclose a first portion of the grid of the example user interface of FIG. 26 with empty cells;

FIGS. 30-1 and 30-2 disclose another portion of the grid of the example user interface of FIG. 26 with empty cells;

FIG. 31 discloses the grid of FIGS. 29-1 to 30-2 with the empty cells hidden in the first column; and FIGS. 32-35 are example administrative displays of the user interface of FIG. 26.

DETAILED DESCRIPTION OF SOME EXAMPLE EMBODIMENTS

Example embodiments of the present invention relate to user interfaces for navigating structured content. At least some of the example user interfaces disclosed herein enable large amounts of structured content to be efficiently shared across social networks or displayed, modified, cross-referenced, and/or tracked.

1. Structured Content, Grids, Headers, and Dimensions

As used herein, the term "structured content" refers to digital data that is structured as a progression, continuum, matrix, hierarchy, or spectrum, or some combination thereof. The digital data can include any type of data including, but not limited to, text, symbols, charted data, audio, images, or video, or some combination thereof. Some examples of digital data that can be compiled as "structured content" and displayed in the example user interfaces disclosed herein include outlines; product feature comparison charts; real estate listings; organization responsibilities; job descriptions; training/skillset information; financial data; service listings; education standards; drug listings and tables displaying dosage and contraindications; tweets or messages; college comparison information; photo albums or arrays of images; video or audio clips; car listings; educational materials; religious development information; curriculum; reference data; movie/title/actor listings; personal assessment checklists; reading; math; child development; growing one's religious faith; parenting skills; how to sell real estate; career path steps within an organization; virtual learning environments (VLEs); managed learning environments (MLE); decision matrices; linear or non-linear expansion of or spectral representation of knowledge, data, states, prices, options, conditions, concepts, images, practices, products, service, terminology, language constructs, organizational parameters, and unitary or functional or multidivisional or conglomerate structures; specific sequences of numbers or symbols (for example, 1, 2, 3, 4); words or symbols that denote sequence (for example, creep, crawl, walk, run); words or symbols including photo/audio/video representations thereof (for example, photos showing states or stages of progress or assembly, such as tires, engine, frame, doors, complete car); or various other domains of learning.

Figures 1, 6A:
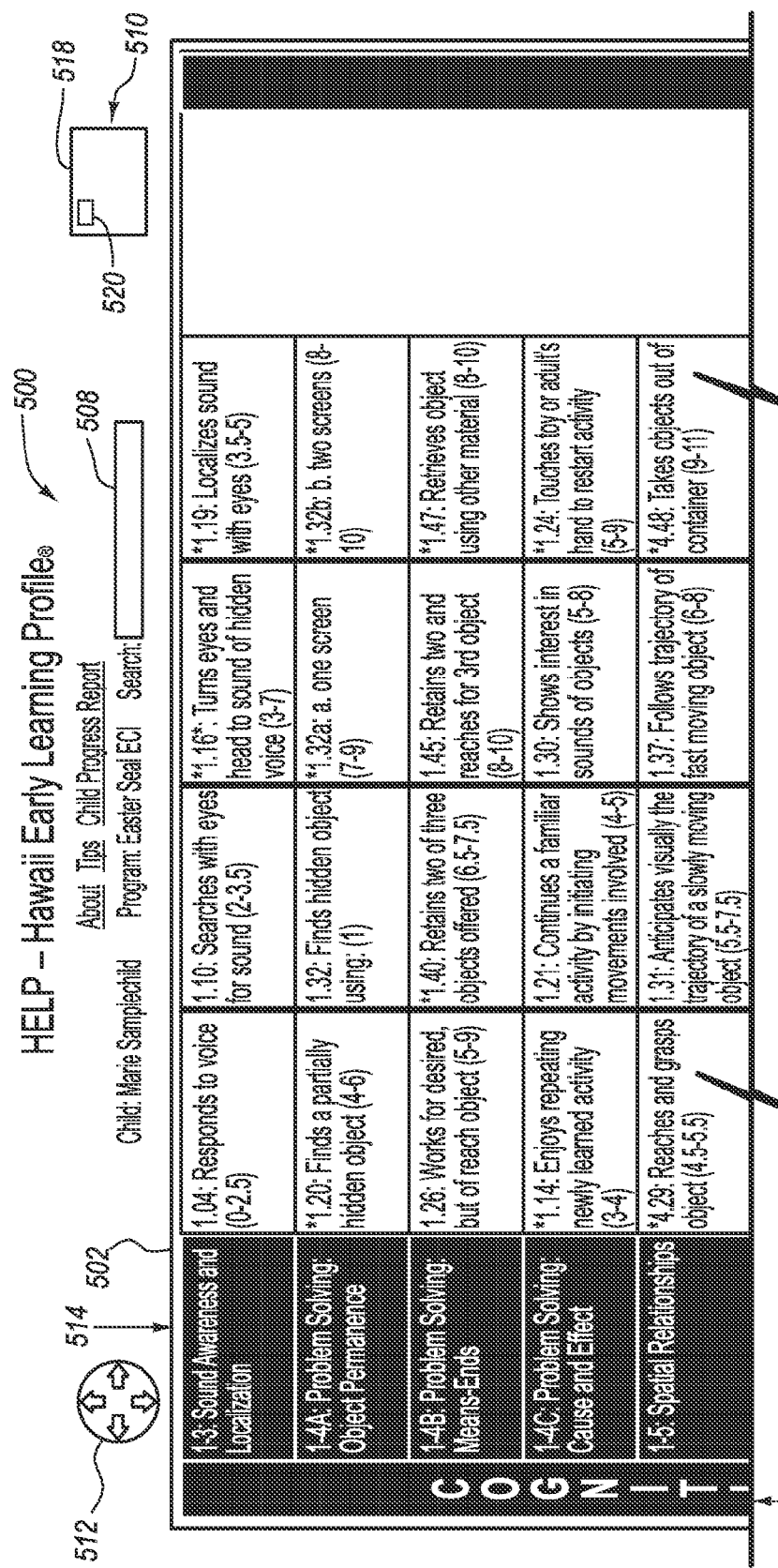
Figures 1, 6B:
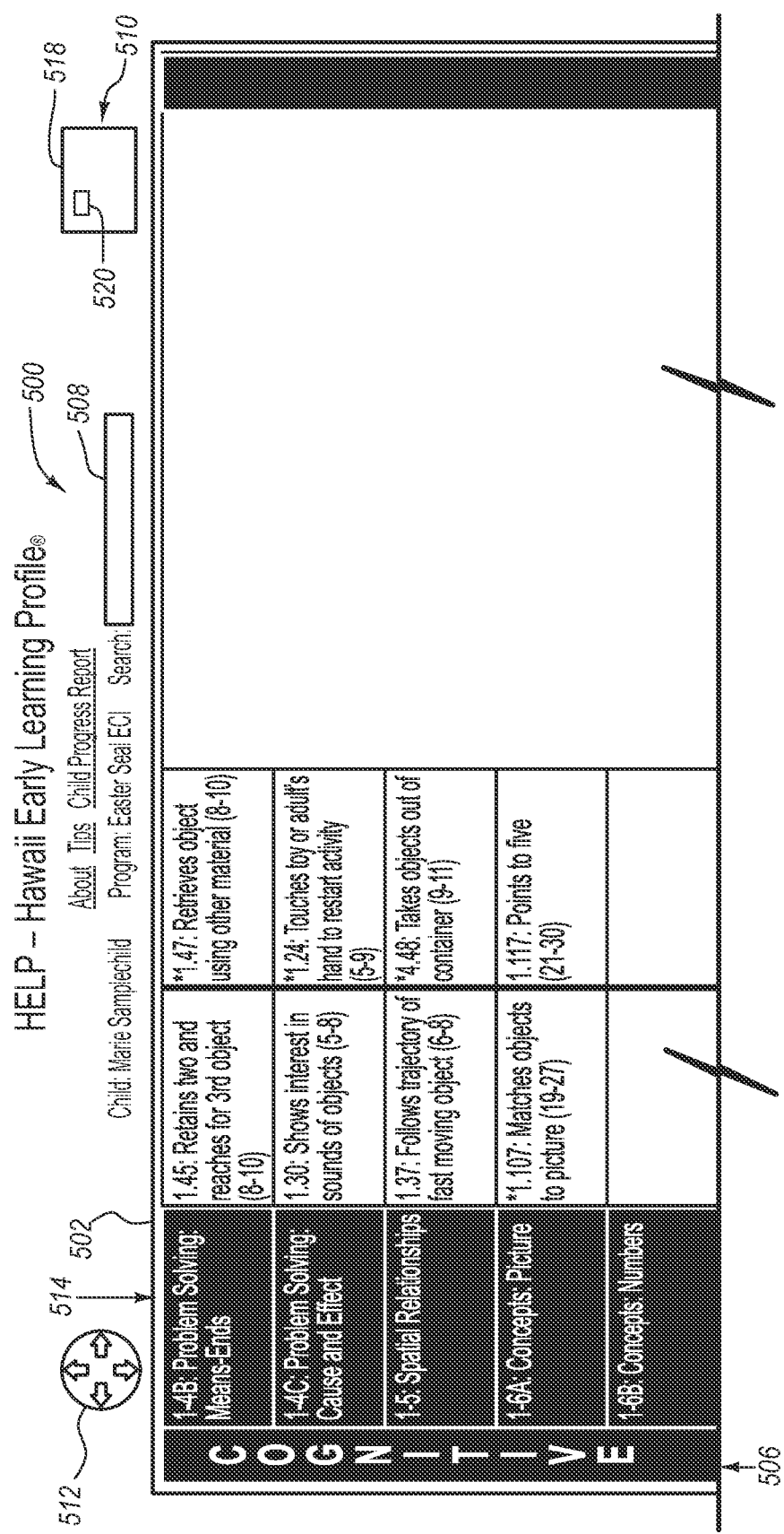
Figures 1, 9A:
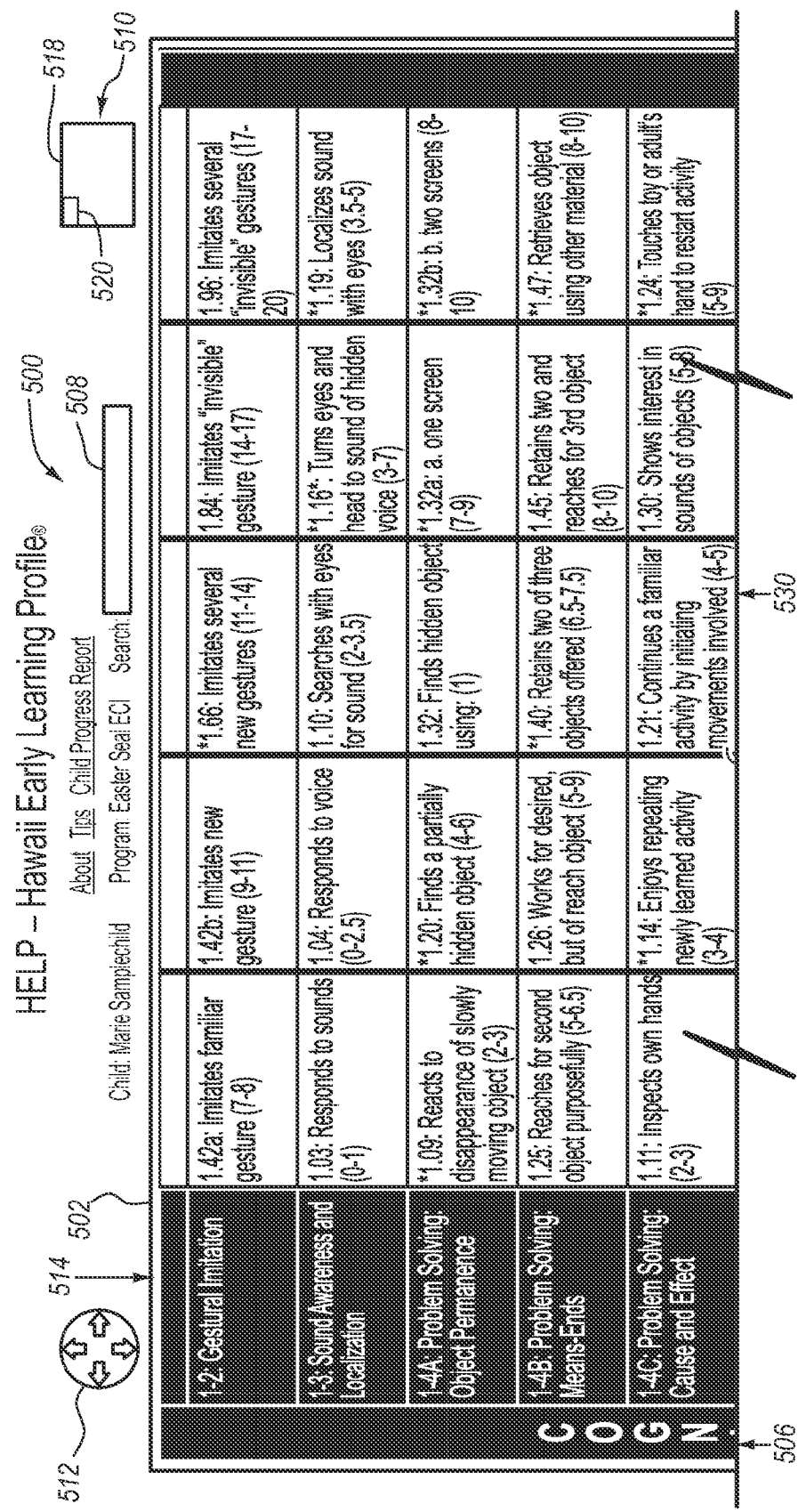
Figures 2, 9B:
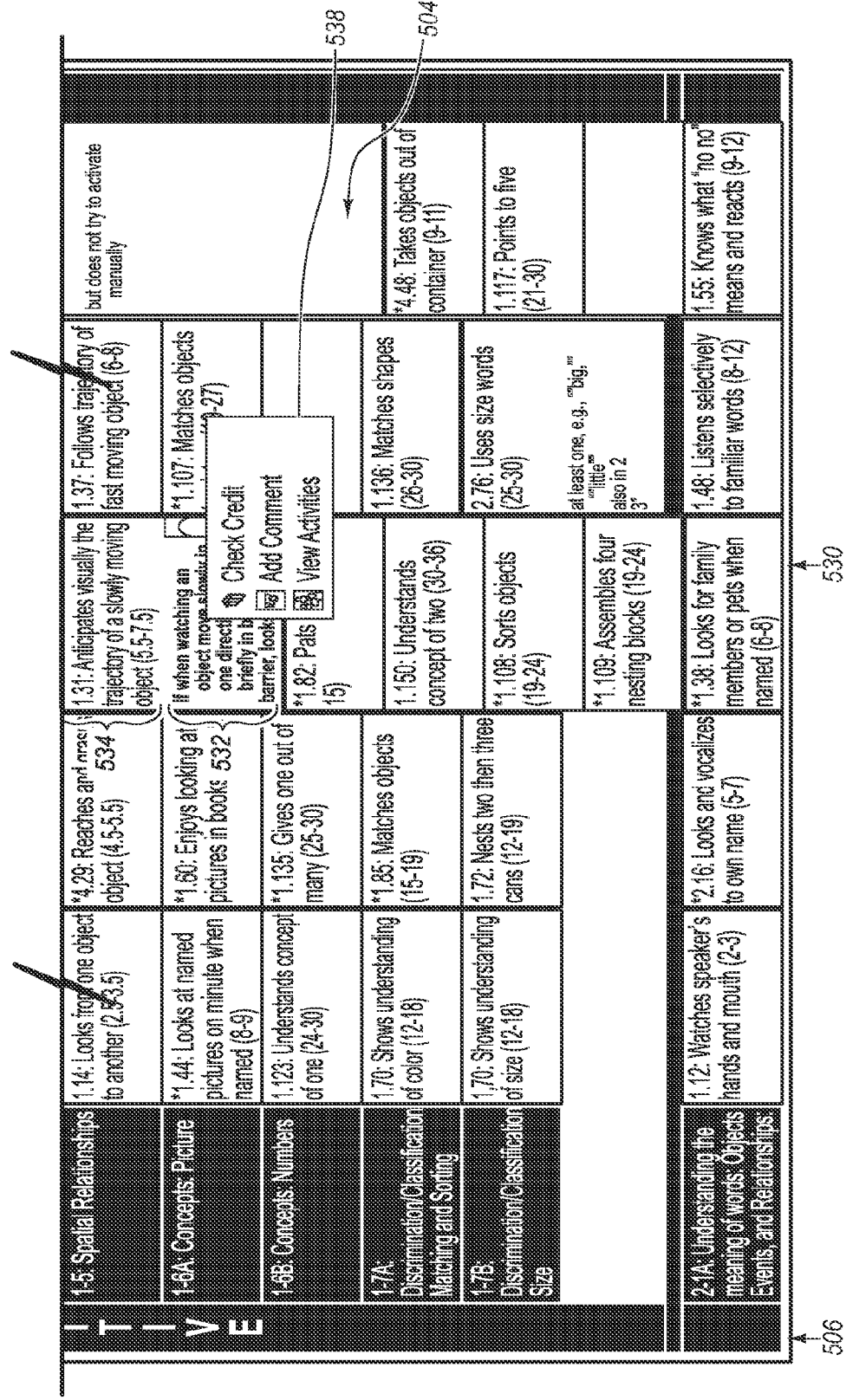

For example, FIGS. 1 to 3-2 disclose three examples matrices of structured content. FIG. 1 discloses a matrix 100 comparing product features, FIGS. 2-1 and 2-2 disclose a matrix 200 of curriculum goals, objectives, and standards, and FIGS. 3-1 and 3-2 disclose a matrix 300 of drug listings, dosages, and contraindications. Each of these three examples of structured content can be displayed in the example user interfaces disclosed herein. It is understood, however, that many other types of structured content can also be displayed in the example user interfaces disclosed herein.

For example, another example of structured content that can also be displayed in the example user interfaces disclosed herein is course curriculum. Regardless of the subject of instructional area, the basic framework for a course curriculum may generally has a framework as follows:

1->Category/Domain (Topic, e.g., "Real Estate" or "Auto Repair" or "Math")
   2->Strand (Subject or "goal" area, e.g., "Changing Oil" or "Patching Tire")
      3->Steps (Sequential Objectives/skills leading to end of, or mastery of goal)
         4->sub-Steps (tasks/skills sequenced within a Step for learning Step mastery)
            5->Mastery Code/score (self-assessment or formal evaluation)
               6->List/personalization of content
               6->List of resources/teaching methods
            5->Social sharing of status/interests Thus, course curricula compiled as structured content lends itself to being displayed in the example user interfaces disclosed herein.

One is curriculum for an education Domain (e.g., "Math") containing nested or sequentially-dependent goal areas or topic Strands (e.g., "Fractions"), with each Strand containing sequenced Objectives (Steps) leading to mastery within the topic, with each Objective related to respective component sub-Steps/tasks/skills, Instructional Methods and Materials and Resources for teaching the Objective or sub-Step, with a method for capturing, tracking, and reporting user mastery (assessment score/credit, self-assessment, or assessment/testing by another party) on that Objective or sub-Step, a method for aggregating and reporting mastery data for a specific user or across users, and a method for establishing a social network across individual users and users for harnessing the aggregate data.

In addition, as used herein, the term "grid" is not limited to grids made up of rectangular cells organized into rows and columns. Therefore, although the grids of the example user interfaces disclosed herein are generally grids made up of rectangular cells organized into rows and columns, it is understood that the term "grid" can also encompass grids with non-rectangular cells, such as spherical grids.

Further, as used herein, the term "header row" is not limited to a row of header cells positioned at or near the top of a grid. Instead, the term "header row" can encompass any group of header cells in the same row of a grid. Similarly, the term "header column" is not limited to a column of header cells positioned at or near the extreme left side of a grid. Instead, the term "header column" can encompass any group of header cells in the same column of a grid. Therefore, although the grids of the example user interfaces disclosed herein include only header rows and header columns positioned at or near the top and extreme left sides of the grids, respectively, it is understood that header rows and header columns can be otherwise positioned within a grid. Further, although the grids of the example user interfaces disclosed herein each includes only a single header row and/or a single header column, it is understood that a grid may include multiple header rows and/or multiple header columns.

As used herein, the term "dimension of structured content" refers a specific layer or level of structured content within a cell in a grid. Therefore, the term "dimension" as used herein does not refer to a position in space within the grid.

2. Example System

Figure 4:
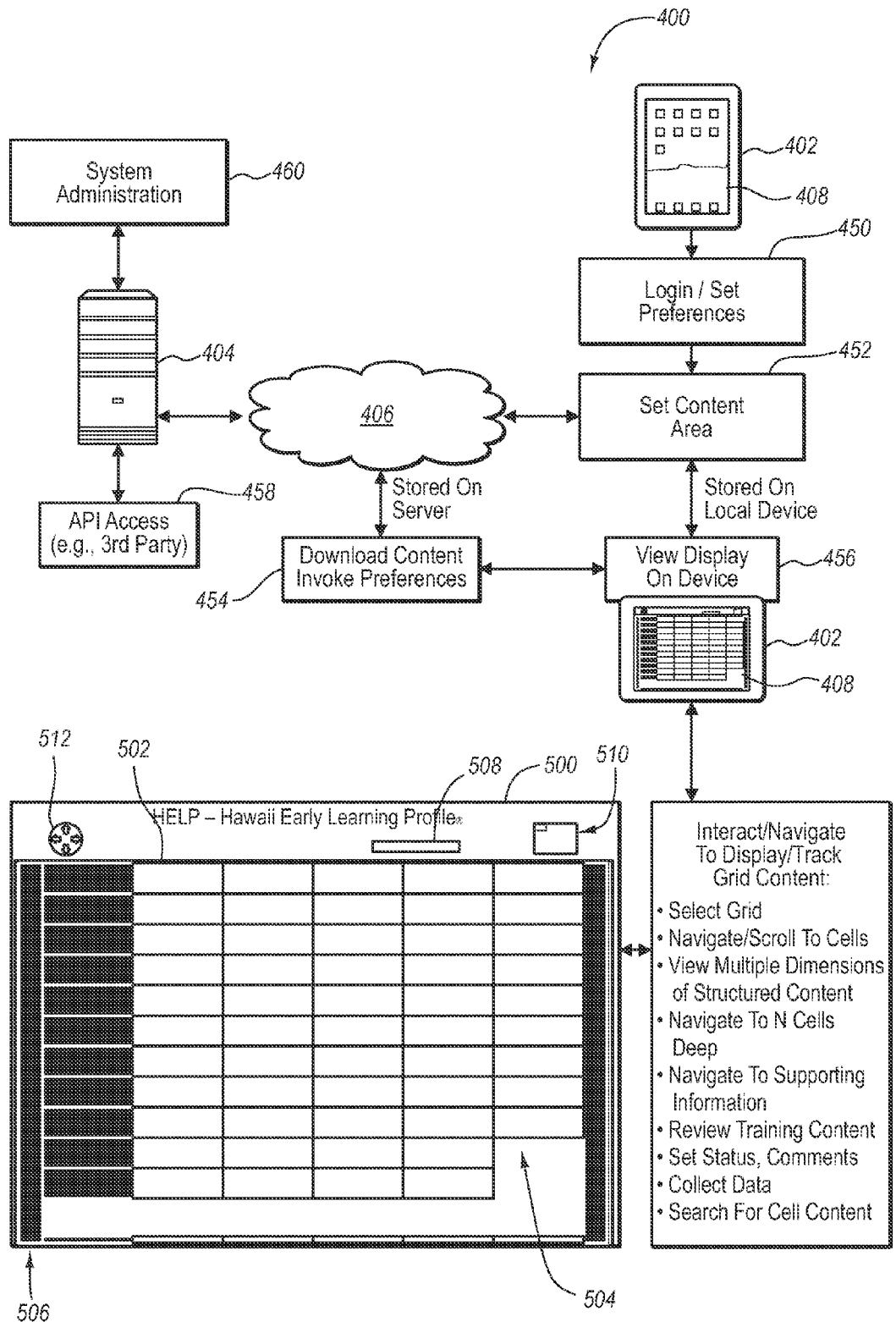
FIG. 4 discloses one example environment in which the user interfaces of the present invention may be employed.

With reference to FIG. 4, one example system 400 is disclosed in which the example user interfaces disclosed herein can be employed. The example system 400 includes a user device and a server 404 that communicate with each other over a network 406. The user device 402 includes a display 408, which may either be integrated into the user device 402 or connected to the user device 402, upon which the user interfaces disclosed herein, such as the user interface 500, can be displayed. The user device 402 can be any networked computing device such as a desktop computer; a notebook, netbook or laptop computer; slate-type computer such as an iPad®; a cell or smart phone such as an iPod®; web-connected/networked or stand-alone devices; electronic clipboards, production/manufacturing recording devices, test recording, and data collection/recording devices/tools/instruments or checklists The network 406 may be any type of wired or wireless network such as the internet, a WAN, a LAN, a G3 or G4 network, a Wi-Fi network, or a cellular network.

The user interface 500 generally includes a viewport 502 that displays at least a portion of a grid 504 made up of a plurality of multi-dimensional cells each having a unique position in the grid 504. The grid 504 also includes a domain column 506 of cells each spanning multiple rows. The user interface 500 may also include a search box 508, a viewtracker 510, and/or navigation arrows 512. Additional details regarding the various components of the user interface 500 will be given below in connection with FIGS. 5-1 to 12-2.

During operation, a user can employ the user device 402 to connect to the server 404 over the network 406 in order to access, browse, use, execute, or download software that includes the example user interface 500. The user can obtain the software as an independent user or as part of a group of users, such as students in a class or members of a church, in which case the user would use the software via an account that the user accesses via the network 406. The software that includes the user interface 500 can run as a stand-alone application on the user device 402, or can run on the server 404 and be accessed by the user device 402 over the network 406.

Once the user interface 500 is running, the user may be prompted at an act 450 to login and/or set preferences. For example, the user can set various preferences which may include, for example, border gradation and cell background colors, fonts, and symbols used to display the content within the user interface 500. The user interface 500 can automatically detect the type of the user device 402 and the size of the user device display 408 in order to automatically optimally configure the viewport 502 for display on the user device display 408. For example, the user interface 500 can automatically set: the size of the viewport 502, the scrolling speed, the screen orientation, or the display navigation options, or some combination thereof. Alternatively, the user can select the user device 402 and the user device display 408 and set preferences such as "accordion" speed (accordion expansion will be discussed below), how rows and columns expand and contract, the height or width of expanded cells, or how various cells are highlighted by color or other means, or some combination thereof. The user can also select from a variety of "resource" preferences, such as other tools, links, authorities, or reference materials, for display within the viewport 502.

Next, at act 452, the user may select a content area. Content are can include, for example, any of the examples of structured content disclosed herein. The content might be stored on the user device 402, or remain on the server 404 and be accessed to provide the user with remote networked use of the content. Once the content area is selected, at act 454 the user's preferences are applied to the user device 402, either from the server 404 or from settings saved locally to the user device 402. Then, at act 456, the content is displayed within the viewport 502 configured on the user device 402.

It is further noted that at act 458, the server 404 may access APIs, such as third party APIs. The APIs may allow for customizing, branding, or wrapping the user interface 500 or viewport 502 and subsequent content and behavior into a client's website or application. APIs can also allow for importing, arranging, editing, confirming, simulating, and testing the placement of client or user content within the user interface 500. Also, at the act 460, the server 404 may access system administrative settings and displays, such as the administrative displays disclosed in FIGS. 32-35.

The structured content that is ultimately displayed in the user interface 500 may either be loaded into the system 400 by a system administrator or one or more users. Alternatively, the structured content may be is dynamically received, based on the user's preferences or the system preferences. Further, the cells of the grid 504 may be configured to be automatically populated with multi-dimensional structured content based on one or more content preferences specified by a user or automatically derived from a pattern of usage of the cells of the grid 504 by a user. In another example, the metrics or indices of the columns and rows and the sources may be derived from a list of possible sources (the basis of the "structure"), such as web sites, news feeds, knowledge bases, Google Groups or Facebook® or other sources, some, for example, with API options. For example, the user might subscribe to several news and RSS feeds, and track friends' "Facebook Wall" or comments or photos or other content as posted on Facebook or other social media sites, and the content of these feeds might, for example, be used (either by the system 400 or by the user) to populate separate columns or rows within the grid 504. For example, the column header cell may be a chronology of time or other metric, thus allowing the user to capture, skim, browse, and get more detail on a variety of content from within their own personalized grid 504 which becomes a form of "home base" for the user to monitor, share, cross-reference, and access their social interaction and information from a wide range of sources.

When the user first accesses the structured content using user interface 500, the user can use one of a variety of methods to determine where to begin in the viewport 502. For example, the viewport 502 may initially automatically scroll to a starting portion of the grid 504 based on one or more metrics entered by a user of the user interface 500. These metrics may include, for example, keywords, photos, concepts, or the user's gender, age, geographical location, job type, education level, and/or background. Thus the user interface 500 can automatically facilitate where, within a large grid 504, a user might begin. In the case where the user is a professional, such as a teacher or therapist, or a parent, the user can enter preliminary information on the student/child to find which skills/steps match the child's/student's current level. In one example embodiment, a "screening" method (filter) might be available to be displayed within the continuum/array to determine which cells (objectives/needs) to begin working on. For example, a screening test or assessment may be used by educators, doctors, or human resource personnel in evaluating staff or job applicants. This screening method can employ identifying behaviors or other criteria be used to gauge where the person or item being assessed is on the progression of the structured content of the grid to find an appropriate starting point the starting point.

Further, answering the question "Where do I start?" can be accomplished by the user entering into the search box 508 keywords describing their goal, status in life, or problems/needs, or response to questions or images or adjective checklists The user interface 500 will match such information against rules or an internal thesaurus of terms related to the actual content of the grid 504, and then highlight for the user those cells initially applicable to the user. The user interface 500 may further have an option to automatically or upon request show the user the most frequently visited cells or changed cells.

Although the example user interfaces disclosed herein are all graphical user interfaces, it is understood that aspects of the user interfaces disclosed herein could instead be employed in other types of user interfaces including, but not limited to, auditory user interfaces that present data audibly to a user or a tactile user interfaces such as braille output interfaces.

3. First Example User Interface for Navigating Structured Content

With reference now to FIGS. 5-1 to 12-2, additional aspects of the first example user interface 500 will be disclosed. As noted above, the user interface 500 is configured to navigate structured content. As disclosed in FIGS. 5-1 to 12-2, the structured content of the user interface 5-1 to 12-2 is the Hawaii Early Learning Profile, with each cell containing one or more steps relating to child development. It is understood, however, that the user interface 500 could instead be used to navigate other structured content.

As noted above, and as disclosed in FIGS. 5-1 and 5-2, the user interface 500 generally includes the viewport 502, a grid 504 of multi-dimensional cells and the domain column 506 of cells that span multiple rows, the search box 508, the viewtracker 510, and the navigation arrows 512. The cells of the grid 504 are generally organized into horizontal rows and vertical columns. The grid 504 also includes a header column 514 made up of header column cells each positioned in a separate row of the grid 504.

Each cell in the grid 504 can be considered a container for structured content and a navigable object capable of displaying N-dimensional and nested structured content. Any dimension, cell, or portion of the grid 504 can have identifying numbers, symbols, colors or similar visual aids to help the user track which dimension they are on. For example, a header column cell number might also be shown in the cells in the same row as the header column cell. Further, an ID number or symbol may be used in each cell to denote what domain or content area it belongs to, or what phase or association or level of complexity the item/element might hold within the grid 504. Some ways to accomplish cell identification are: to show a gradation of color across the grid 504, showing related or associative properties of the content of the cells (e.g., functional or lexical), or showing a sense of task or development progression from simple to complex. The gradation might denote functional differences or assemblies, for example, as with an array of parts or elements comprising a whole such as a bill of materials listing, an organizational chart, or a sales or CRM list.

Each cell in the domain column 506 may be configured to display, upon selection, one or more additional dimensions of structured content applicable to all cells positioned in the rows spanned by the domain column cell. For example, the domain labeled "COGNITIVE" disclosed in FIGS. 5-1 and 5-2 may be selected, using a mouse pointer on a standard display or a finger on a touch display for example, to cause a second dimension of structured content applicable to all cells positioned in the rows spanned by the "COGNITIVE" domain column cell. This second dimension, or additional dimensions, may display in a separate interface object, such as a pop-up menu, a DIV, a modal or non-modal window, or other code-screen object, for example, that may or may not overlap at least a portion of the grid 504. It is understood that various other interface objects can be employed in the user interfaces disclosed herein other than those specifically illustrated in the drawings.

The viewtracker 510 includes a grid representation 518 of the grid 504 and a viewport representation 520 of the viewport 502. The viewport representation 520 is positioned within the grid representation 518 and overlays the grid representation 518. The viewport representation 520 visually conveys both the proportion of the grid 504 currently displayed in the viewport 502 as well as the position within the grid 504 of the portion of the grid 504 displayed in the viewport 502, thereby helping the user visualize where the user is in terms of either additional or total content to be viewed or progress along the progression of the grid 504. During scrolling within the viewport 502, the viewport representation 520 may also convey the rate of travel through the grid 504.

The viewport representation 520 is configured to automatically reposition within the grid representation 518 when the user repositions the portion of the grid 504 displayed in the viewport 502. Similarly, the portion of the grid 504 displayed in the viewport 502 is configured to automatically reposition when the user repositions the viewport representation 520 within the grid representation 518. Thus, the user can drag the viewport representation 520 within the viewtracker 510 to reposition the display within the actual viewport 502.

Although not disclosed in FIGS. 5-1 and 5-2, it is understood that the viewtracker 510 may also provide additional information regarding additional dimensions of structured content within the grid 504. For example, the viewtracker can be configured, using shades of color or some other visual indicator, to show those portions of the grid 504 that are most complete, most visited, or most popular, for example. Further, the viewport representation 520, the grid representation 518, or some combination thereof may visually convey a content density of the cells of the grid 504, with the content density of each cell being the amount of content in each cell, the number of dimensions of content in each cell, or some combination thereof. In one example embodiment, the viewtracker 510 may be further configured to display a summative representation of the status of the cells in the grid 504, similar to the summative representation 820 of the grid 804 as discussed below in connection with FIG. 24. The viewtracker 510 may also be configured as a rectangular cube instead of a flat rectangle.

As disclosed in FIGS. 6A-1 to 6B-2, the portion of the grid 504 displayed within the viewport 502 is can be repositioned automatically or by the user while the position of the viewport 502 itself remain constant and stationary within the user interface 500. For example, the portion of the grid 504 displayed within the viewport 502 can be repositioned by scrolling up, down, left, right, or diagonally. The diagonally scrolling can be accomplished by simultaneously scrolling both horizontally and vertically. In particular, upon reception of an indication that the portion of the grid 504 displayed within the viewport 502 should simultaneously scroll both horizontally and vertically, the multi-dimensional cells of the grid 504 are configured to scroll simultaneously within the viewport 502 both horizontally and vertically. For example, the portion of the grid 504 displayed within the viewport 502 in FIGS. 6A-1 and 6A-2 can be scrolled diagonally (two cells up and two cells to the left) as disclosed in FIGS. 6B-1 and 6B-2. At the same time, the cells of the header column 514, as well as the cells of the domain column 506, are configured to scroll in a synchronous manner so as to remain visible in the viewport 502 and remain aligned with the rows of multi-dimensional cells. Further, FIGS. 6B-1 and 6B-2 discloses that the portion of the grid 504 displayed within the viewport 502 is configured to automatically "snap" to align one or more cell boundaries with one or more edges of the viewport 502 after simultaneous horizontal and vertical scrolling.

The portion of the grid 504 displayed within the viewport 502 can be scrolled diagonally in various ways. For example, the indication that the portion of grid 504 displayed within the viewport 502 should scroll diagonally may be received upon a user dragging the grid 504 diagonally, using a mouse pointer on a standard display or a finger on a touch display, for example. Alternatively, the indication may be received upon a user selecting a spot on the navigation arrows 512 in between two arrows or by simultaneously pressing two arrow keys on a keyboard. Further, the indication may be received by a user dragging the viewport representation 520 within the viewport 510. Also, the indication may be received by the user searching for a particular keyword using the search box 508 and the user interface 500 automatically generating the indication in order to reposition the viewport 502 over a particular search result cell(s). Finally, it is noted that in additional to diagonal scrolling, the portion of the grid 504 displayed within the viewport 502 can also simply be scrolled up, down, left, or right using the arrow keys on a keyboard for example.

Each of the multi-dimensional cells is configured to display only a first dimension of structured content before selection, as disclosed in FIGS. 5-1 and 5-2, and display one or more additional dimensions of structured content upon selection, thus providing the user with the ability to navigate through multiple dimensions of structured content.

For example, the additional dimensions of structured content may include supportive or related information specific to the cell selected. Such supportive information can include for example, definitions, examples, hints, procedures, glossaries, details, guidelines, cross-references, links to other cells or outside webpages, or video clips or movies or audio segments or images or photos used for training the user on or about the content of the selected cell. In one embodiment where the supportive information is in the form of video clips, the user can select from a screen object/device different-language audio overlays or segments, so that, for example, the same video clip/content is provided for an English-speaking user who selects English as the language in which to hear the content or instructions whereas a Spanish-speaking user can watch the same video clip/content but select Spanish as the preferred language in which to hear the audio content or instructions overlaying or accompanying the video content.

Figures 1, 7:
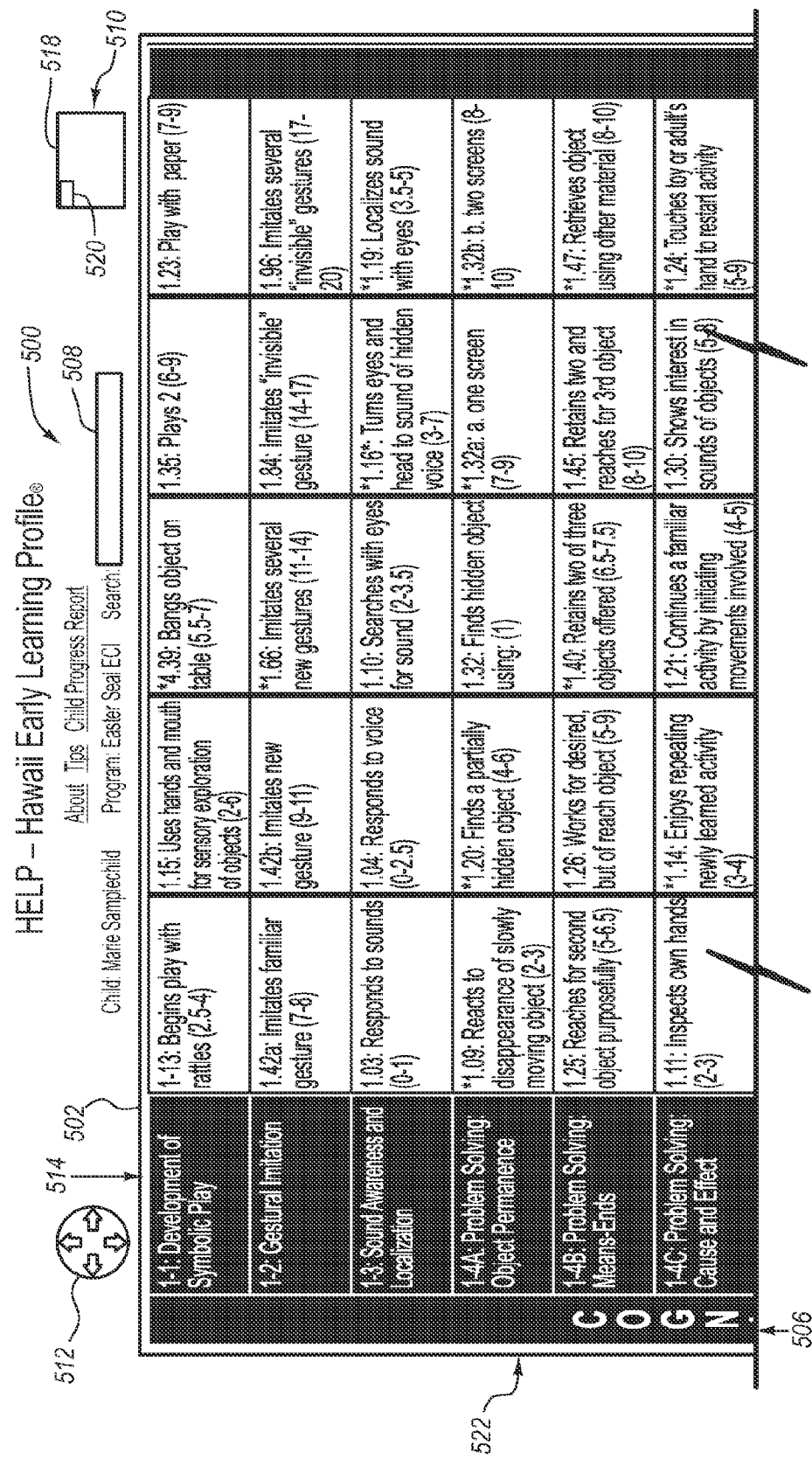

In another example, as disclosed in FIGS. 7-1 and 7-2, each of the cells in the row 522 has been selected by the user selecting the header column cell 1-6A. The selection of the cells in the row 522 causes the cells to expand downward, also known as "accordion expansion," and causes other cells positioned in rows beneath the row 522 of the selected header column cell 1-6A to shift downward in response to the downward expansion of the cells in row 522. The accordion expansion of the cells positioned in row 522 enables a second dimension 524 of content to be displayed in each of the expanded cells. The downward shifting of the cells beneath the row 522 enables the cells in the row 522 to expand and the second dimension 524 of content to be displayed without covering the content of the cells beneath the row 522. It is noted that the selection of a cell can be accomplished in a variety ways including, but not limited to, a mouse click, a mouse hover, a finger touch on a touch screen, the use of control keys, voice commands, or some combination thereof.

In at least some example embodiments, the user can set preferences to define the behavior of the accordion expansion of the cells within the viewport 502. For example, whether or not moving a pointing device out of a cell contracts that cell or keeps the cell expanded, or double clicking/touching a cell causes another layer or overlay of content (perhaps semi-opaque in appearance) to be positioned on or near the current cell. Further, it should be noted that the accordion expansion of cells may be applied to many levels of structured content to form nested and cascading accordion expansion and contraction.

Figures 1, 8:
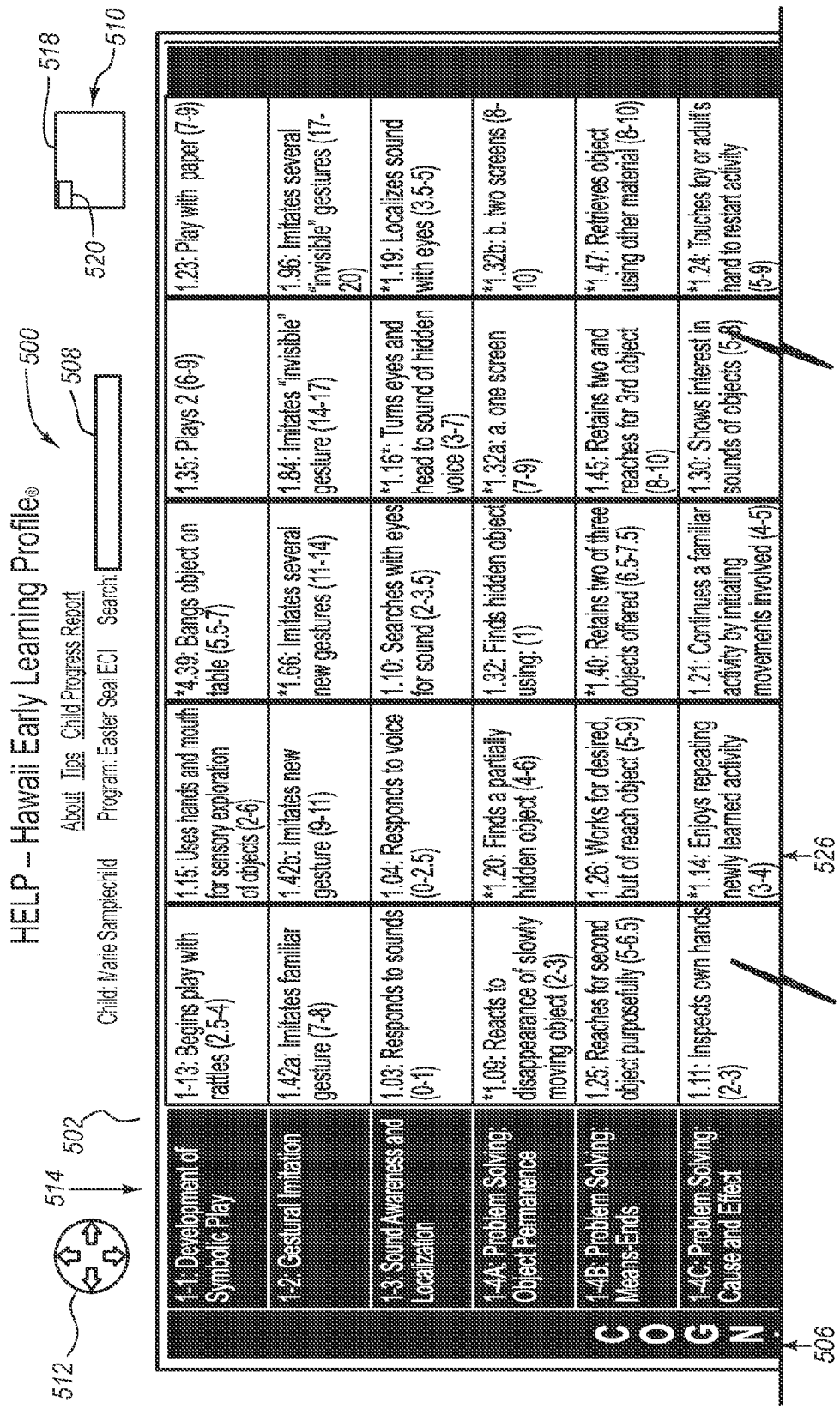

In another example, as disclosed in FIGS. 8-1 and 8-2, the cell 4.29 in the column 526 has been selected by the user. The selection of the cell 4.29 causes the accordion expansion of the cell 4.29. The downward expansion of the cell 4.29 enables a second dimension 528 of content to be displayed in the expanded cell 4.29. The downward shifting of the cells beneath the expanded cell 4.29 in the column 526 enables the cell 4.29 to expand and the second dimension 528 of content to be displayed without covering the content of the cells beneath the expanded cell 4.29 in the column 526.

In another example, as disclosed in FIGS. 9A-1 to 9B-2, the cell 1.31 in the column 530 has been selected by the user. The selection of the cell 1.31 causes the accordion expansion of the cell 1.31, thus enabling a second dimension 532 of content to be displayed in the expanded cell 1.31. In addition, as disclosed in FIGS. 9A-1 and 9A-2, the selecting of the first dimension 534 of content in the cell 1.31, by clicking on the text, hovering over the text, or touching a touch display over the text of the first dimension 534 for example, causes another dimension of content to display in a modal menu 536. Similarly, as disclosed in FIG. 9B-1 and 9B-2, the selecting of the second dimension 532 of content in the cell 1.31 has caused another dimension of content to display in another pop-up menu 538.

Figures 1, 10:
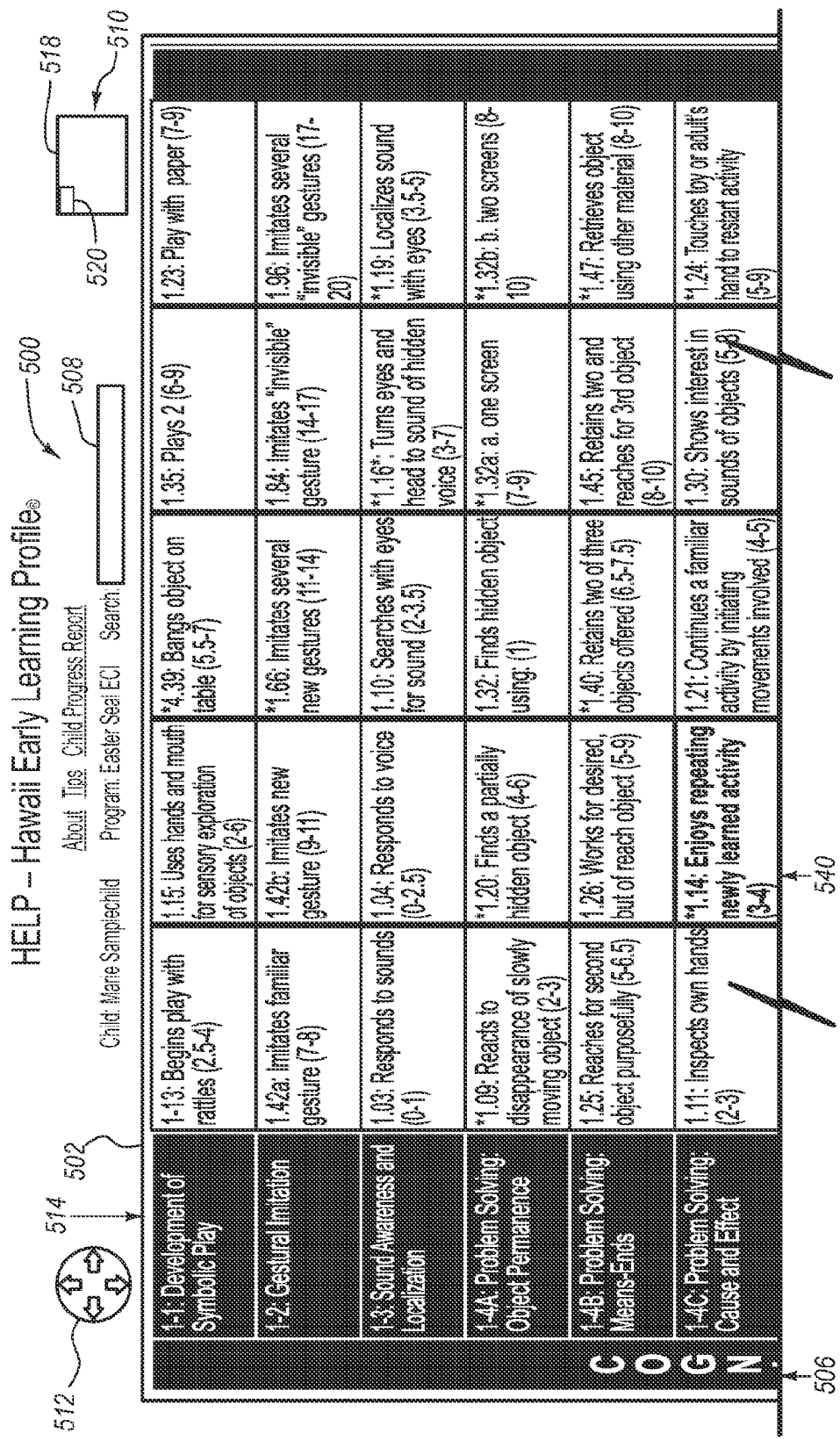

In another example, as disclosed in FIGS. 10-1 and 10-2, the cell 1.14 in the column 540 has been selected by the user. The selection of the cell 1.14 causes the accordion expansion of the cell 1.14, thus enabling a second dimension 542 of content to be displayed in the expanded cell 1.14.

Figures 1, 11:
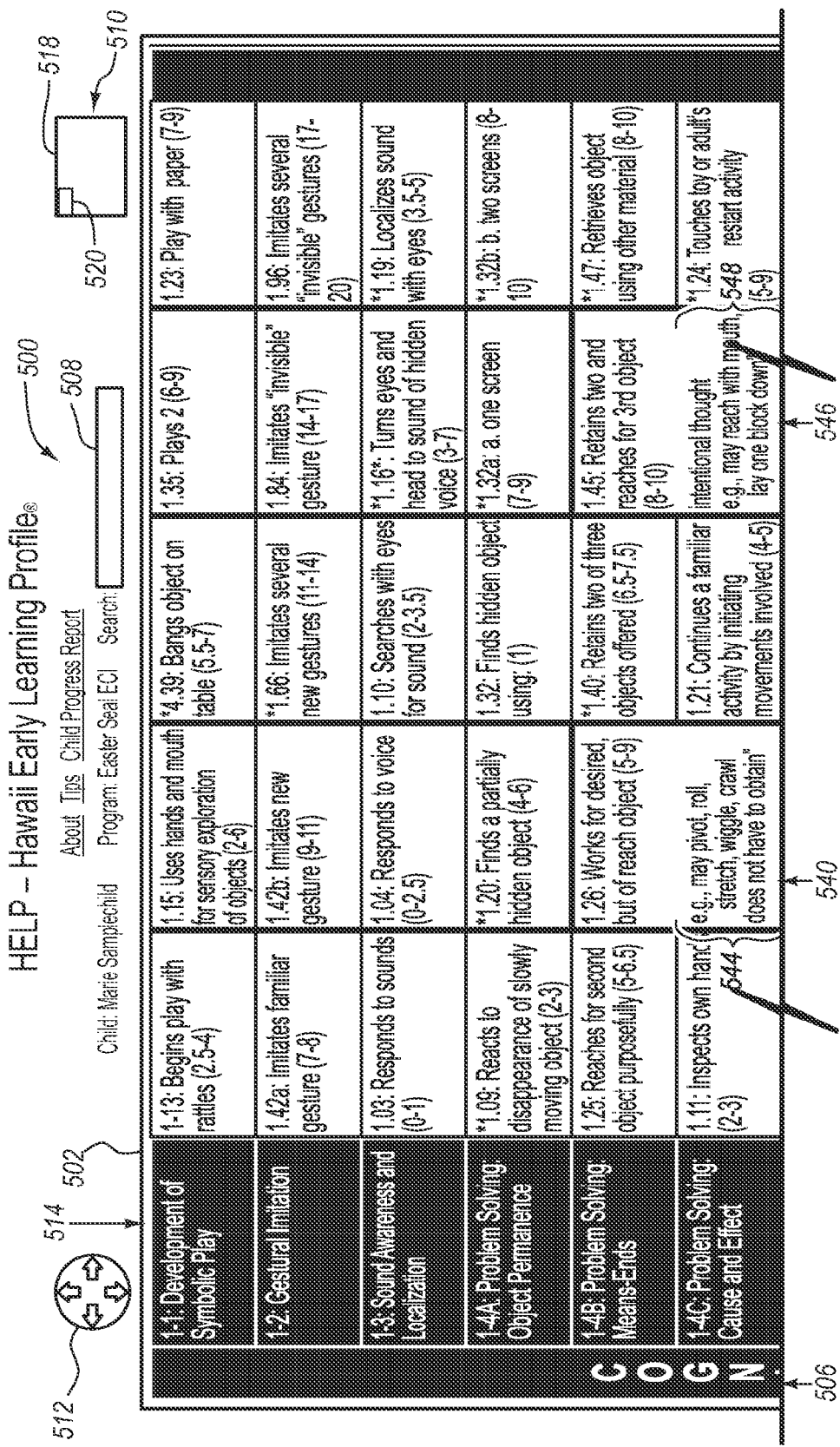

In another example, as disclosed in FIGS. 11-1 and 11-2, the cell 1.26 in the column 540 has been selected by the user. The selection of the cell 1.26 causes the accordion expansion of the cell 1.26, thus enabling a second dimension 544 of content to be displayed in the expanded cell 1.26. In addition, as disclosed in FIGS. 11-1 and 11-2, the cell 1.45 is linked to the cell 1.26 such that the selection of the cell 1.26 also cause the accordion expansion of the cell 1.45 in the column 546, thus enabling a second dimension 548 of content to be displayed in the expanded cell 1.45. Further, the grid 504 is configured to highlight, upon selection of the linked cell 1.26, all cells linked to the selected cell 1.26, which is this case is only the cell 1.45. The highlighting of linked cells may be triggered by a special form of selection, for example, by clicking one cell while pressing the control key.

The cell 1.26 and 1.45 may be linked in various ways. For example, the cell 1.45 may be linked to the cell 1.26 automatically and dynamically based on a pattern of usage of the cells of the grid 504 by a user. Alternatively, cells within the grid 504 may be linked by a user or by a system administrator.

Further, cells may be dynamically or heuristically linked, wherein action in one cell connects or navigates to cells with related content. For example, "See Also" content can be based on dynamically or heuristically established relationships based on language/lexical, membership, and/or concept matching. Such dynamically-related content might stem from an immediate, pre-defined relationship, or be based on heuristic determination based on the user's movement and action with other cells in a grid, thus allowing new or other relations between cells to be established. For example, tracking a user's repeated action on or behavior with a series of cells can be used to determine levels of interest and type of interaction from which subsequent heuristically-determined relations can be established, and then applied as new sets of rules or relationships, all of which are repeatedly challenged and altered using heuristic means.

In addition, as disclosed in FIGS. 11-1 and 11-2, the selecting of the second first dimension 544 of content in the cell 1.26, by highlighting the text or hovering over the text for example, causes a third dimension of content to display in a drop down 550. Thus selection of the cell 1.26 enables the display of multiple additional dimension of structured content, as well as the highlighting or cells linked to the cell 1.26.

FIGS. 12-1 and 12-2 disclose search capabilities within the example user interface 500. In particular, a user can enter text into the search box 508 in order to search the structured content of the grid 504 based on any of a variety of criteria including, but not limited to, content within any of the dimensions of the cells, cell ID numbers, and/or a thesaurus or corpus related to the content. Search results can appear as a list of hits, or in a dynamic object 552 using auto-completion techniques. As the user selects a result from the search, if the selected cell is not currently displayed in the viewport 502, the user interface 500 will automatically reposition the viewport over the selected cell, and the viewtracker 510 will show the user the relative position of the navigated-to-cell within the grid 504. In one embodiment, the search result might select and highlight multiple cells, thus automatically causing the according expansion of the multiple cells.

4. Second Example User Interface for Navigating Structured Content

With reference now to FIGS. 13-1 to 18-2, a second example user interface 600 is disclosed. As with the user interface 500, the user interface 600 is configured to navigate structured content. As disclosed in FIGS. 13-1 to 18-2, the example structured content of the user interface 600 is the Continuum to Christ, with each cell containing one or more steps relating to progress within the Christian faith. Since faith is such a personal issue requiring easily-customized content for the user to truly feel the content applies to him/her, the user interface 600 starts with default content, but then allows the user to create and manage content that is balanced, uniquely and highly personal, and therefore relevant to the user. It is understood, however, that the user interface 600 could instead be used to navigate other structured content.

Figures 1, 13:
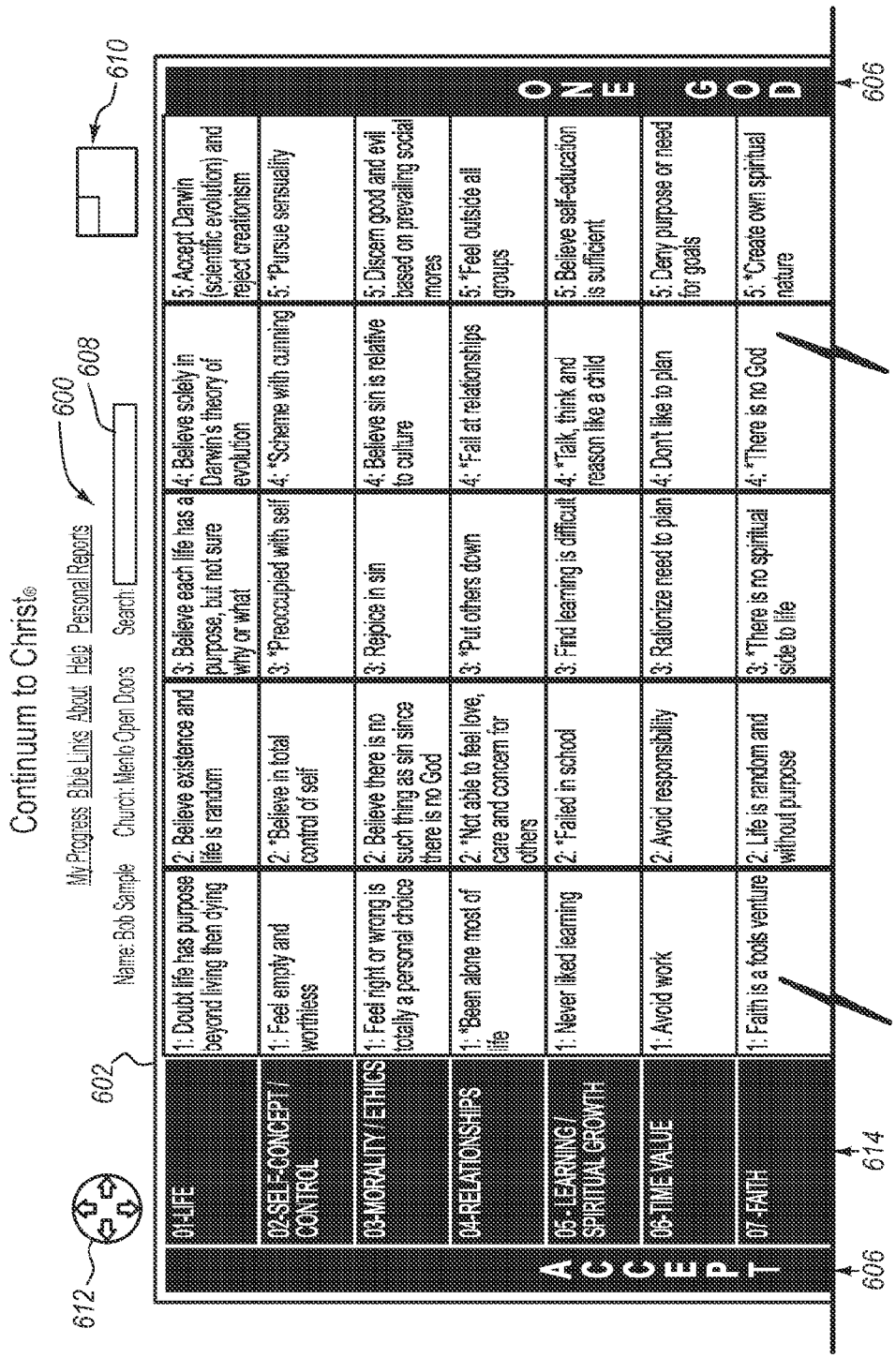
Figures 2, 13:
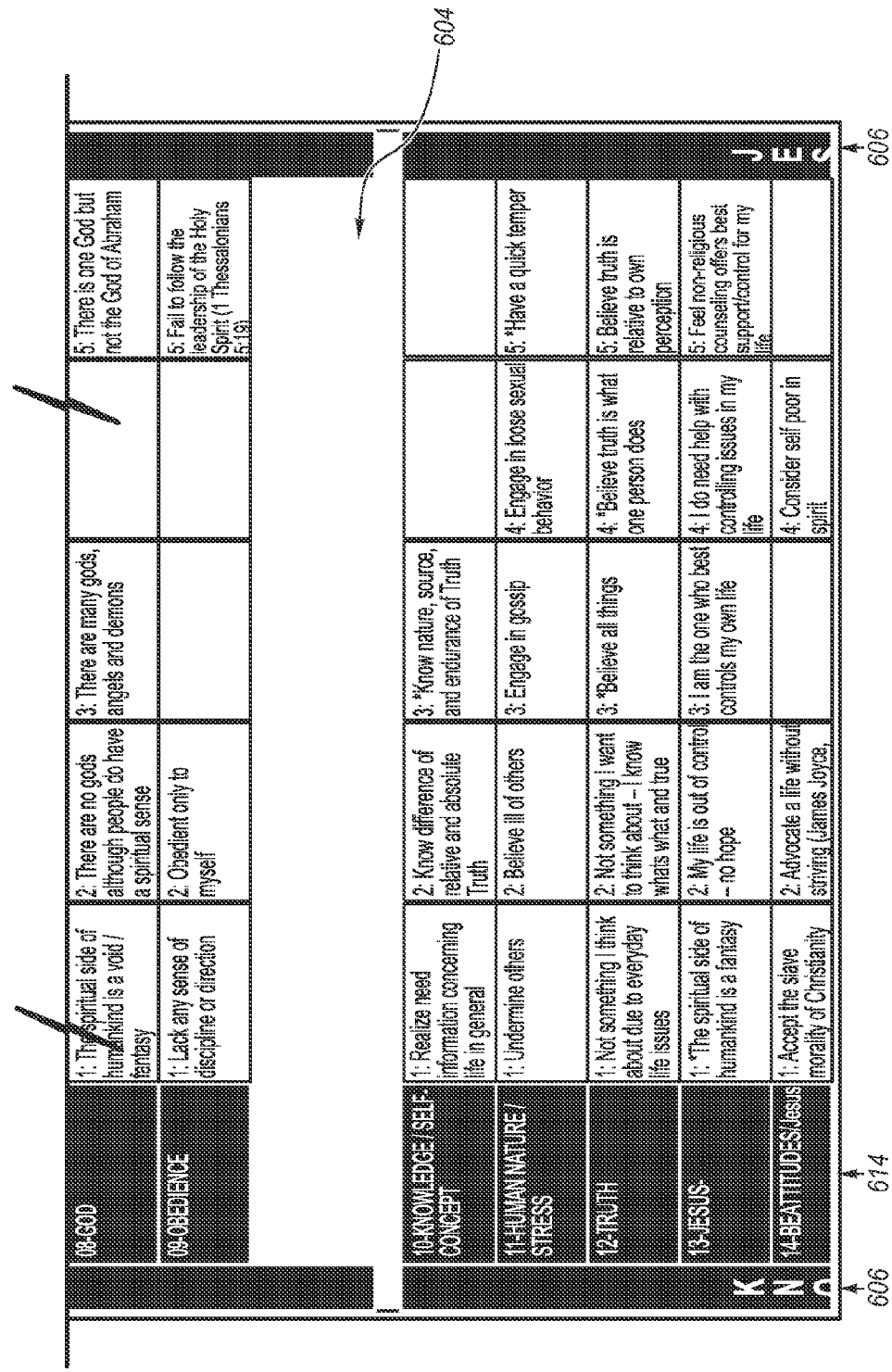

As disclosed in FIGS. 13-1 and 13-2, the user interface 600 generally includes a viewport 602, a grid 604 of multi-dimensional cells, left and right domain columns 606, a search box 608, a viewtracker 610, and navigation arrows 612. The cells of the grid 604 are generally organized into horizontal rows and vertical columns. The grid 604 also includes a header column 614 made up of header column cells each positioned in a separate row of the grid 604. Each of the multi-dimensional cells of the grid 604 is configured to display only a first dimension of prepopulated structured content before selection, as disclosed in FIGS. 13-1 and 13-2, and display one or more additional dimensions of prepopulated and/or user-modified structured content upon selection.

Figures 1, 14:
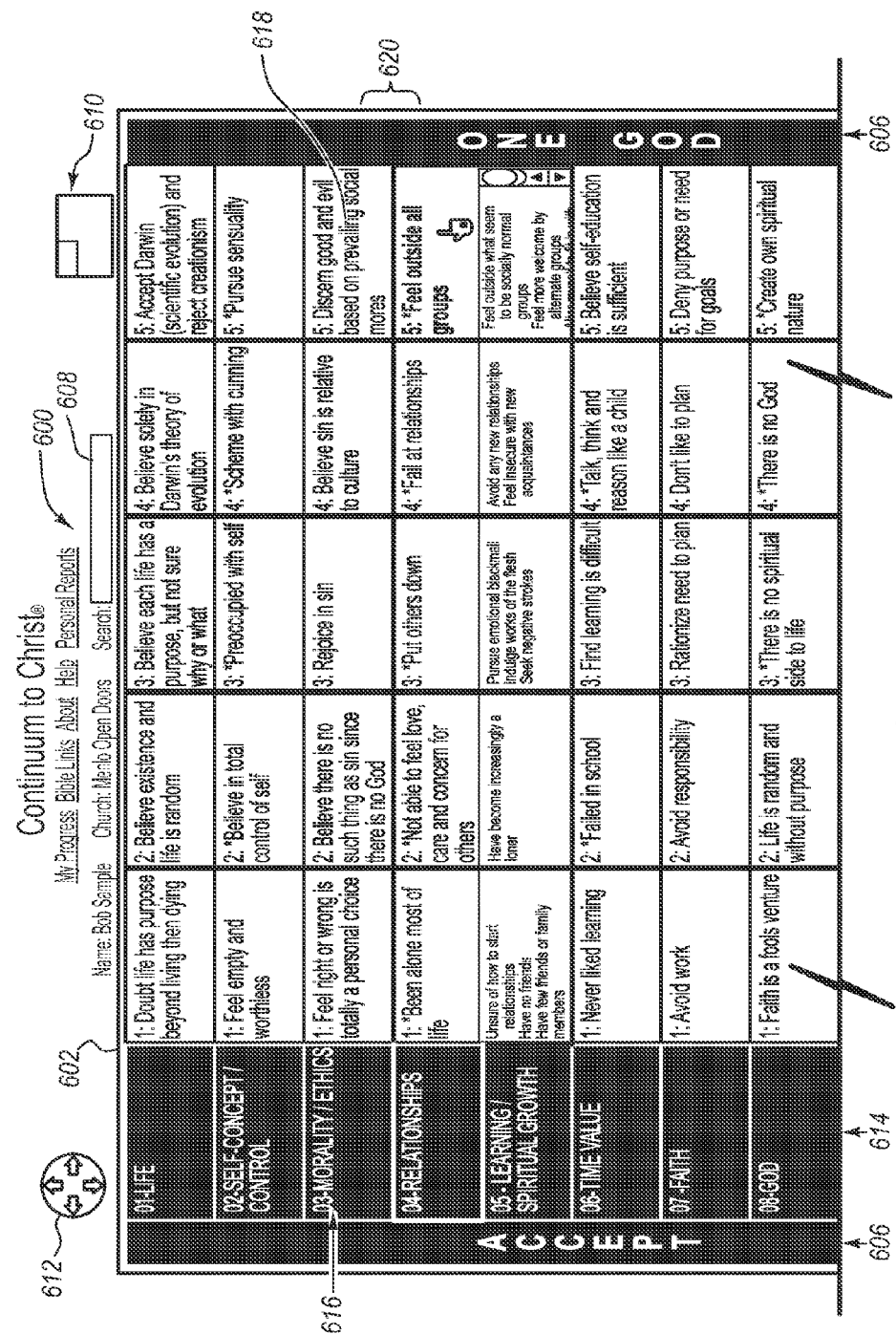
Figures 2, 14:
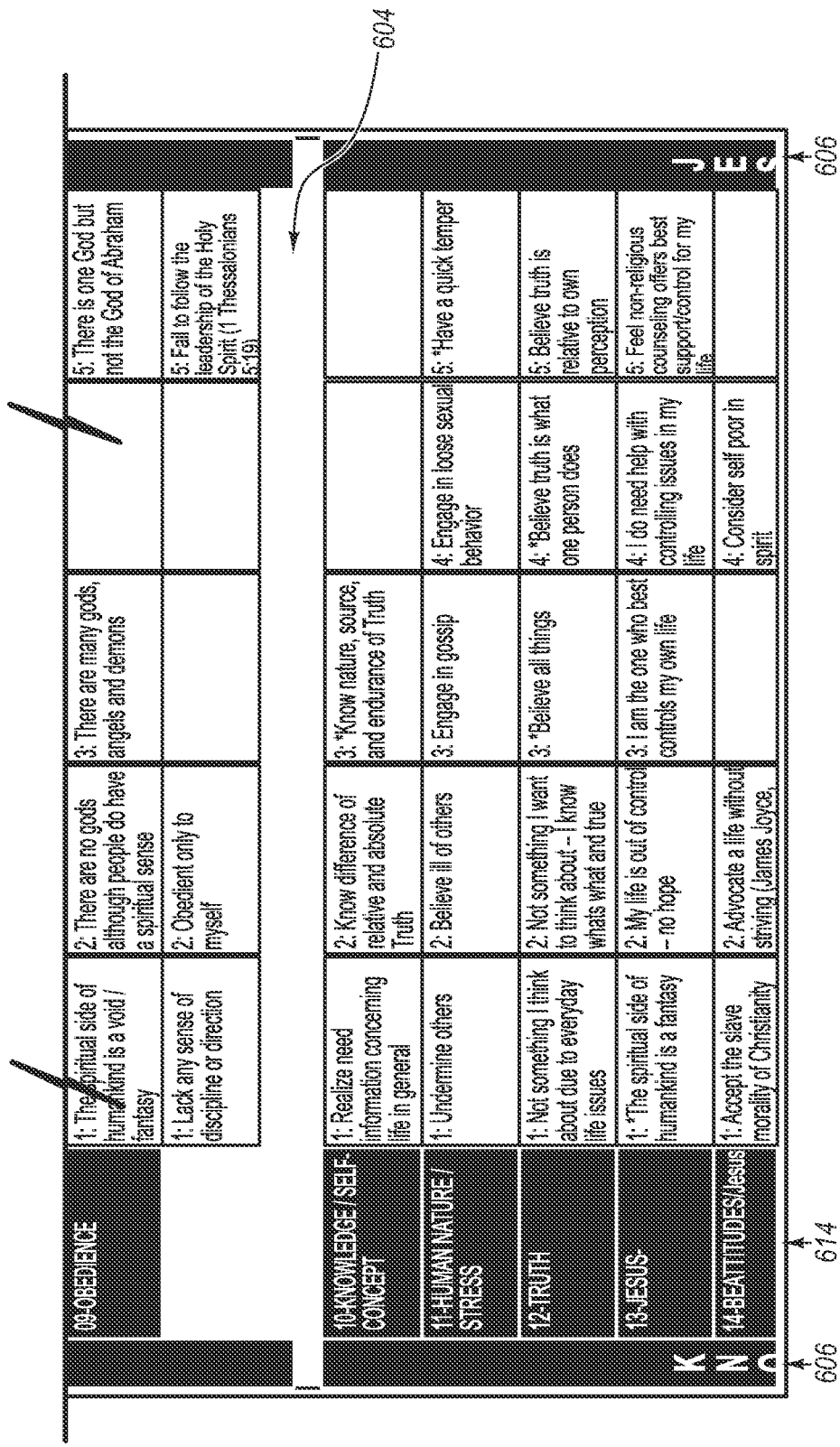

For example, as disclosed in FIGS. 14-1 and 14-2, each of the cells in the row 616 has been automatically selected by the user selecting the cell 04-5 with a mouse pointer 618. The selection of the cells in the row 616 causes accordion expansion of the cells. The accordion expansion of the cells positioned in row 616 enables a second dimension 618 of content to be displayed in each of the expanded cells. The downward shifting of the cells beneath the row 616 enables the cells in the row 616 to expand and the second dimension 620 of content to be displayed without covering the content of the cells beneath the row 620.

Figures 1, 15A:
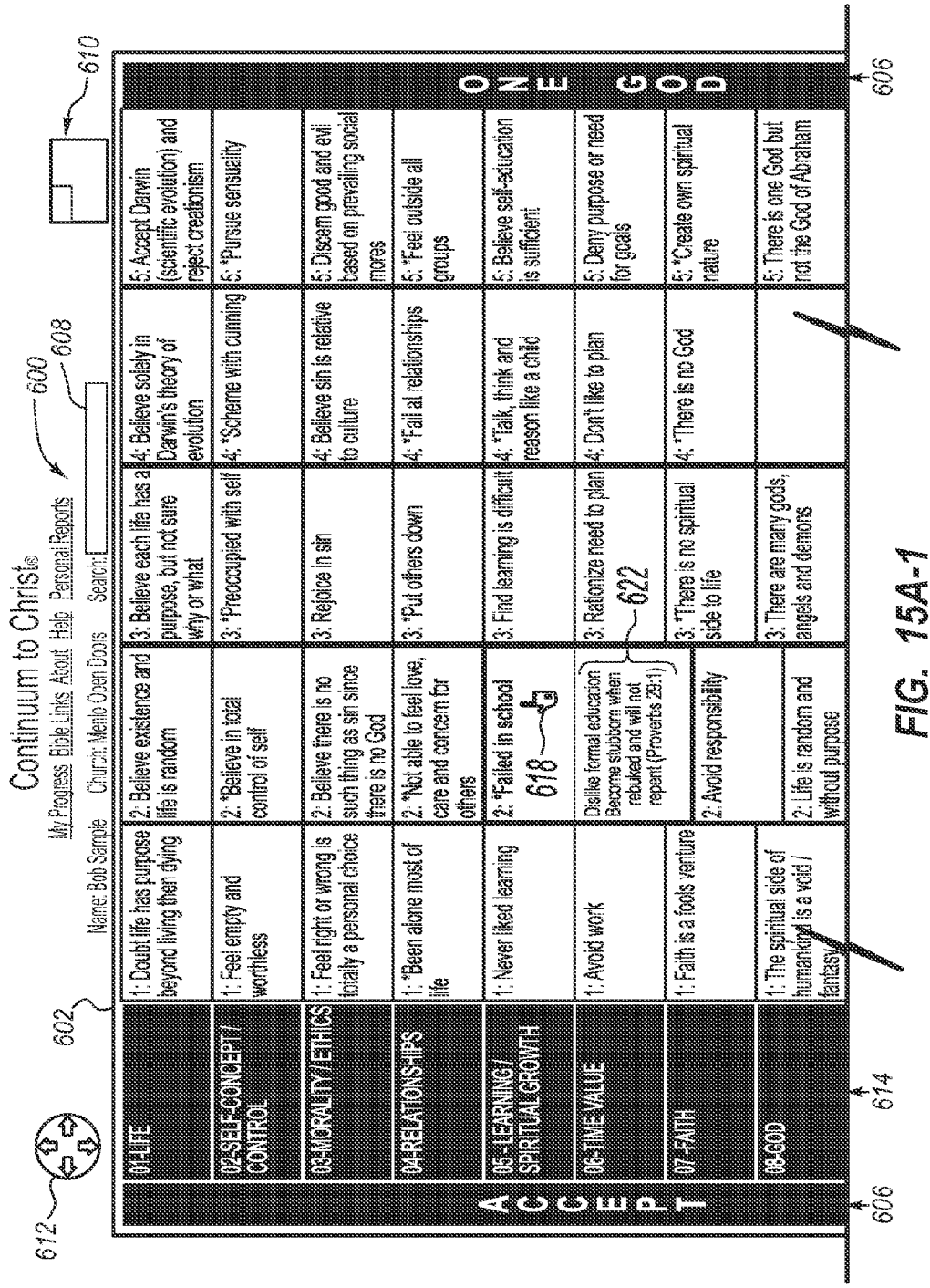
Figures 2, 15A:
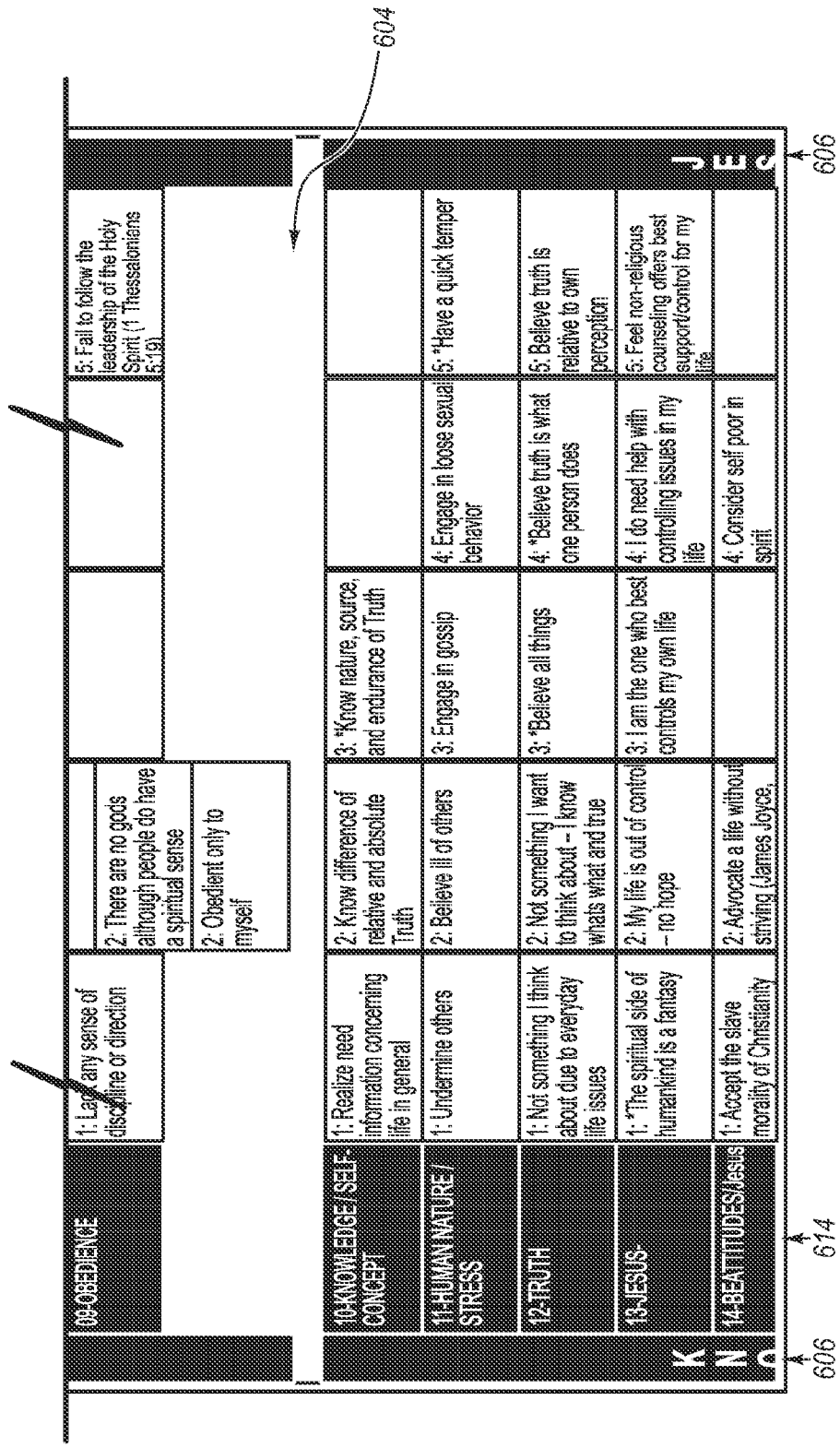
Figures 1, 15B:
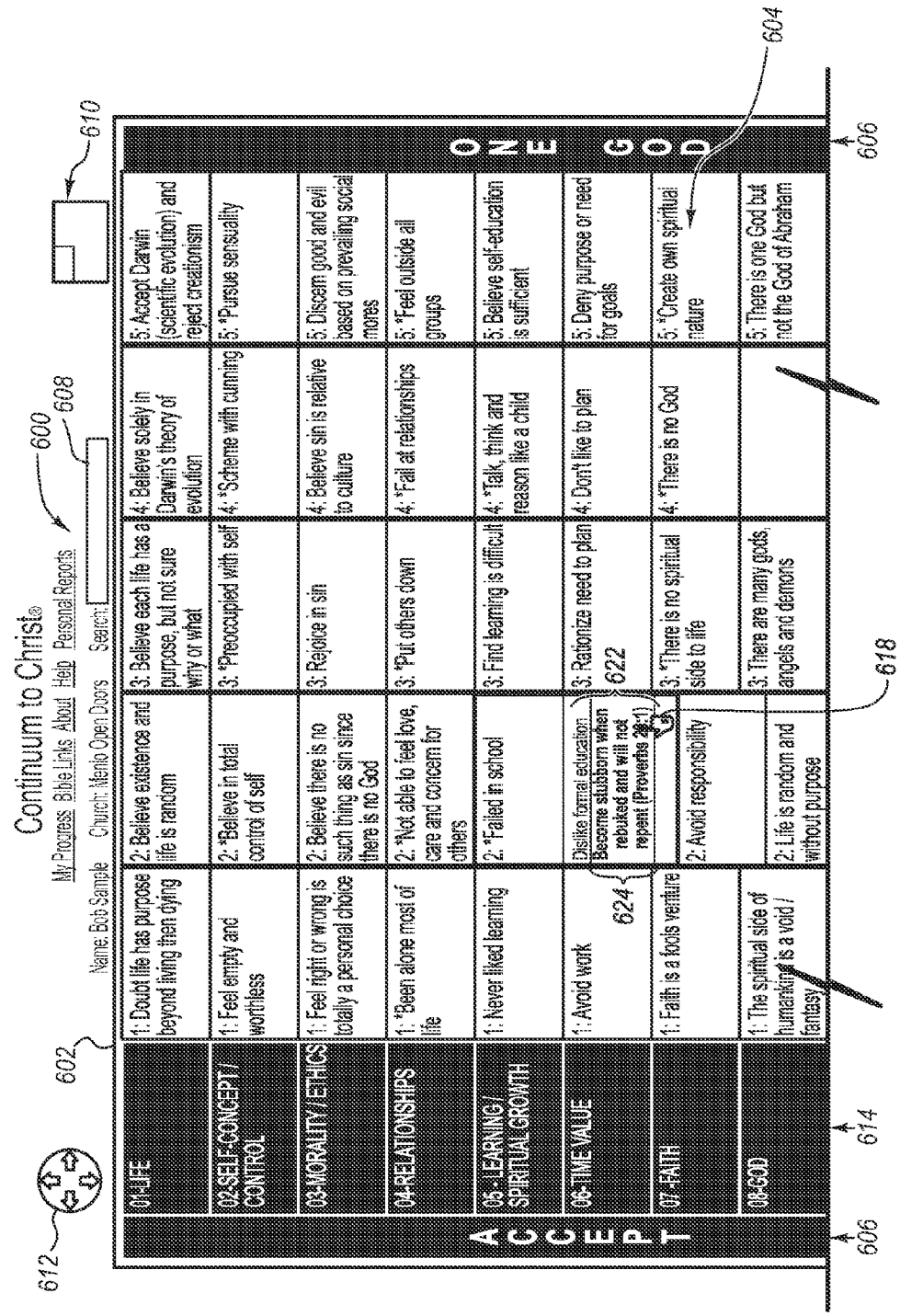
Figures 2, 15B:
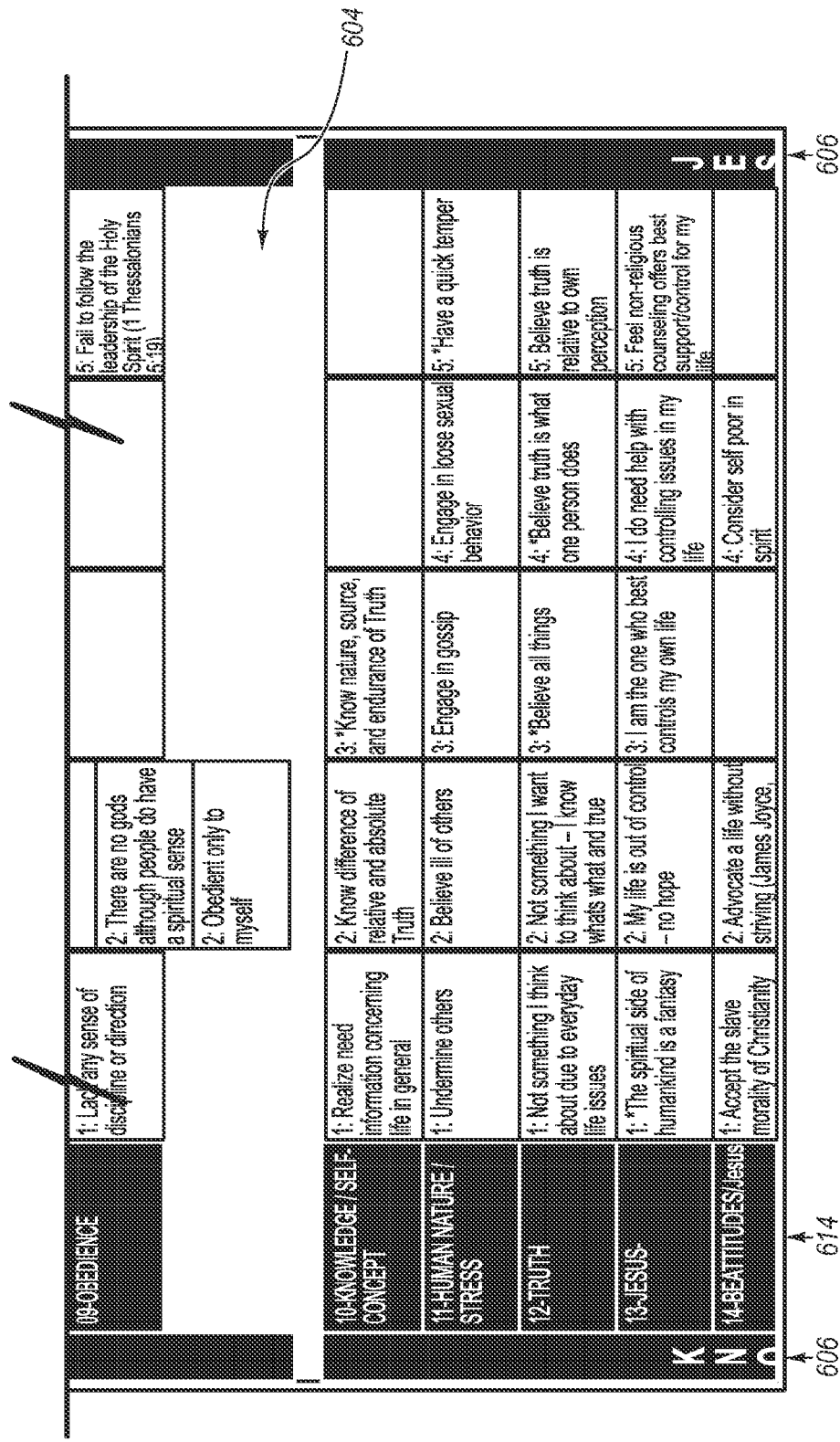

In another example, as disclosed in FIGS. 15A-1 and 15A-2, the cell 05-2 has been selected by the user using the mouse pointer 618. The selection of the cell 05-2 causes the accordion expansion of the cell 05-2. The downward expansion of the cell 05-2 enables a second dimension 622 of content to be displayed in the expanded cell 05-2. Next, as disclosed in FIGS. 15B-1 and 15B-2, a portion 624 of the second dimension 622 of content of the expanded cell 05-2 has been selected by the user using the mouse pointer 618, which causes the text of the portion 624 to become highlighted.

Figures 1, 16A:
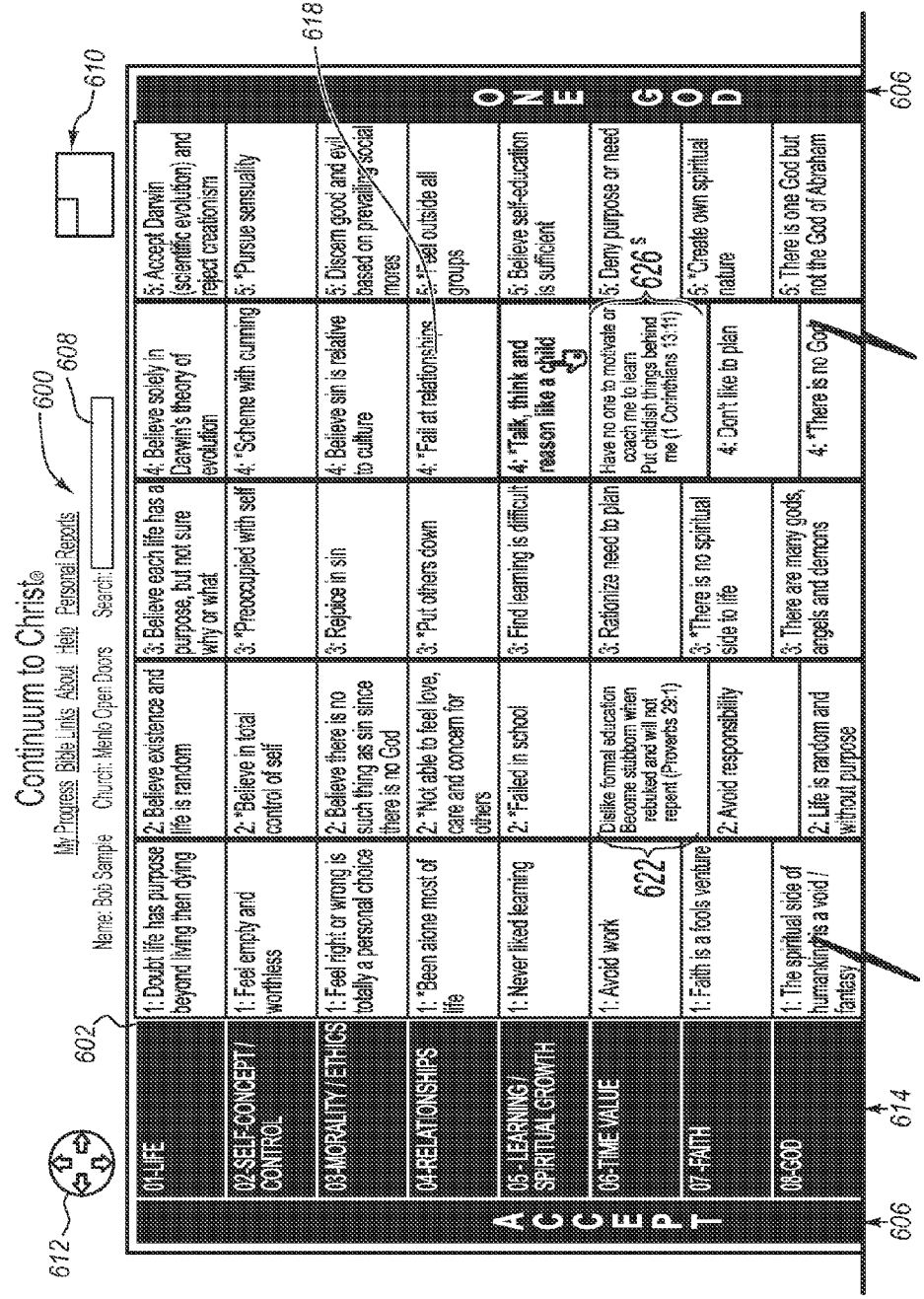
Figures 2, 16A:
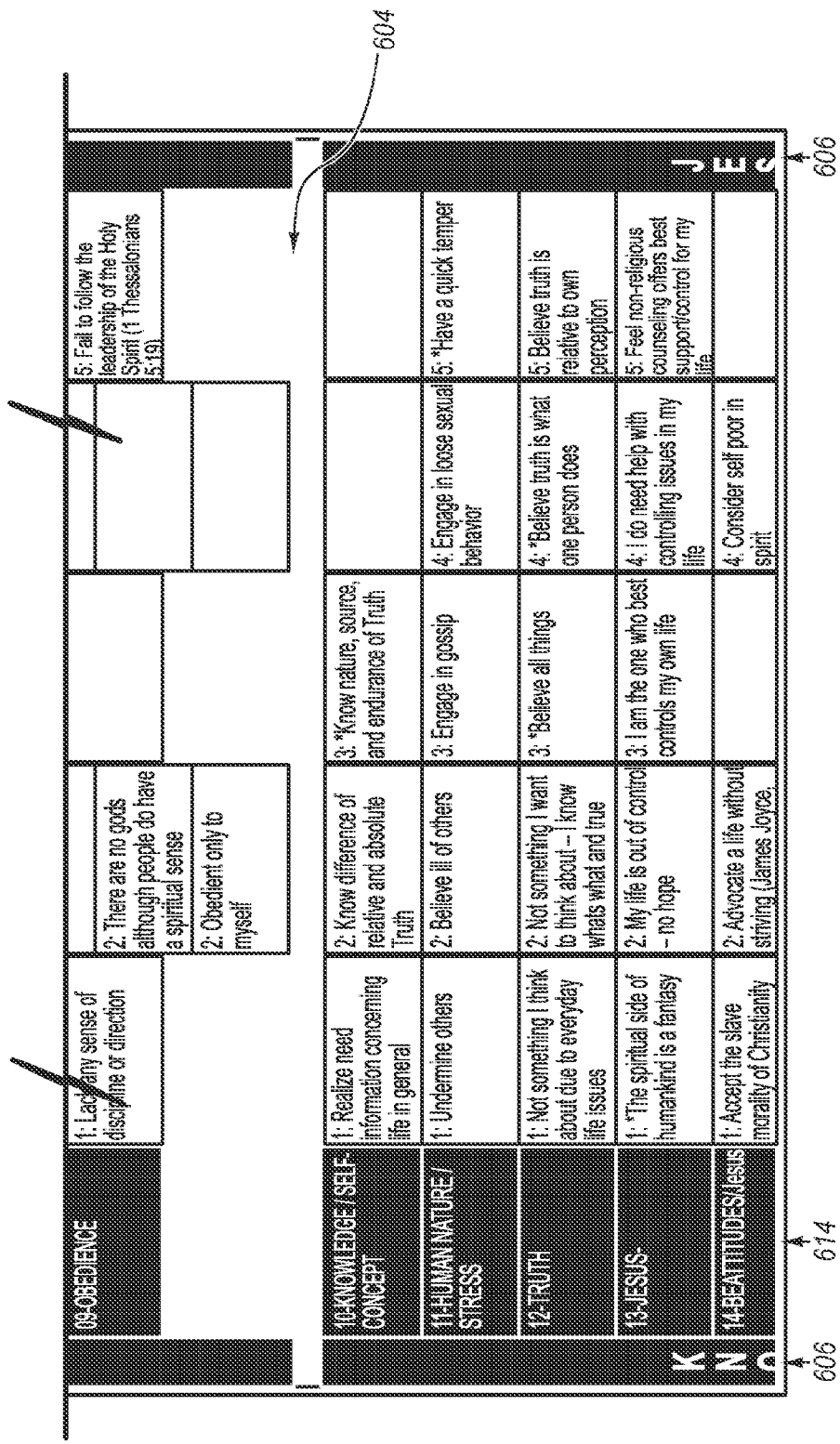
Figures 1, 16B:
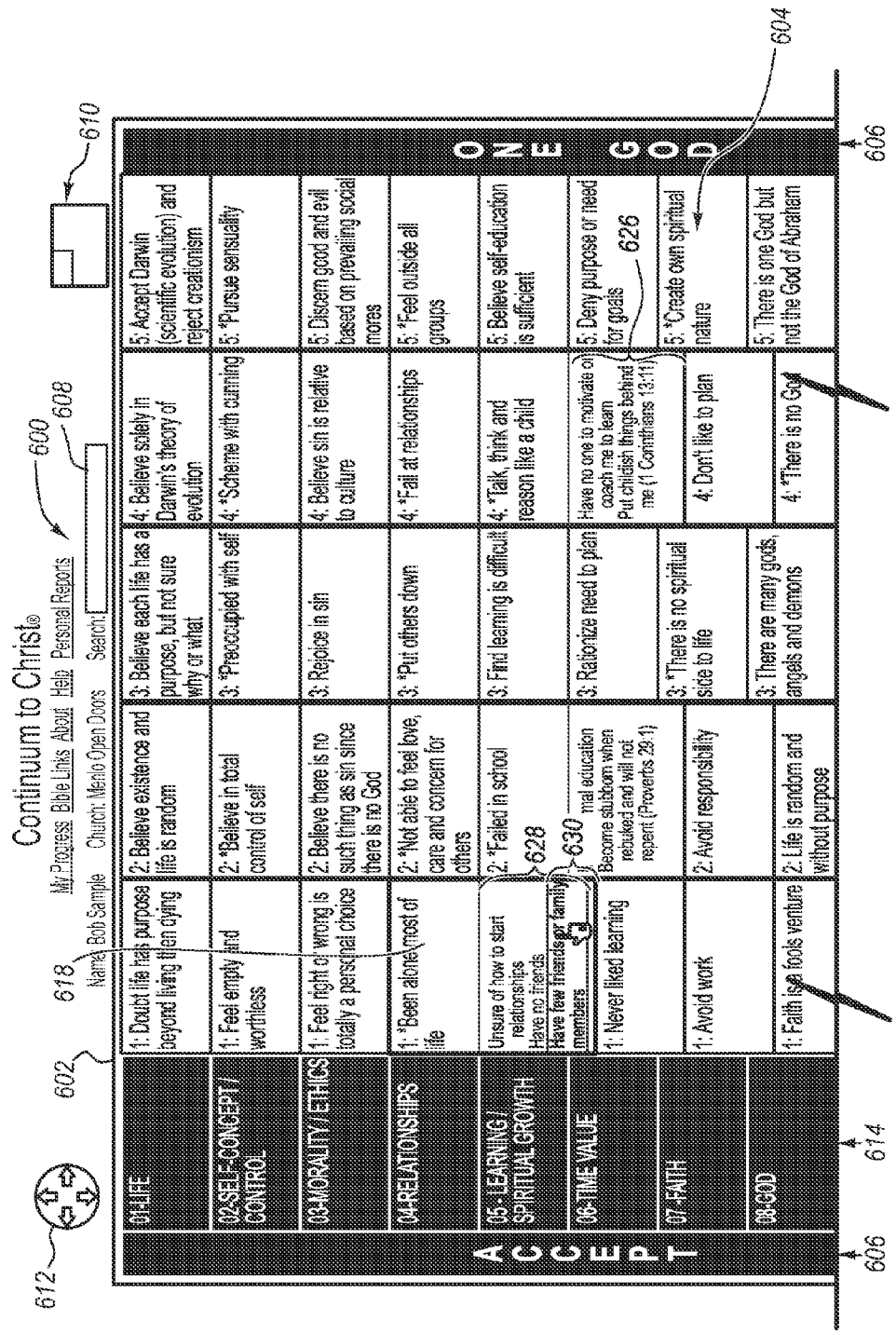
Figures 2, 16B:
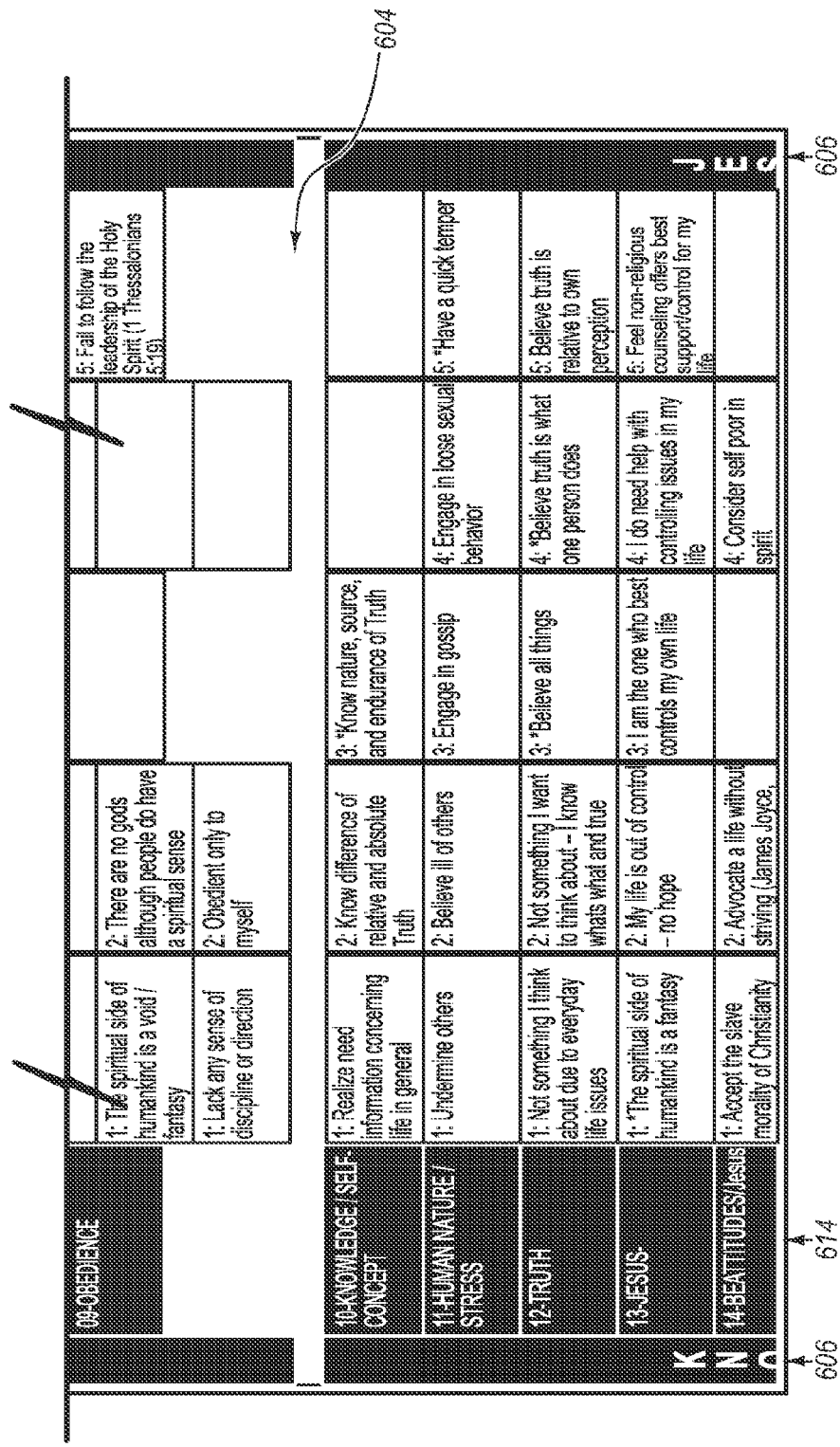

In another example, as disclosed in FIGS. 16A-1 and 16A-2, the cells 05-2 and 05-4 have been selected by the user by floating the mouse pointer 618 over the cells, which causes the accordion expansion of the cells 05-2 and 05-4. The downward expansion of the cell 05-2 and 05-04 enables second dimensions 622 and 626 of content to be displayed in the expanded cells 05-2 and 05-4, respectively. Thus, a user can accordion expand a first cell then a second cell and simultaneously view the second dimensions of content in the expanded cells. Further, as disclosed in FIGS. 16B-1 and 16B-2, the cell 04-1 has been selected by the user by floating the mouse pointer over the cell. The selection of the cell 04-1 causes the accordion expansion of the cell 04-1 and enables a second dimension 628 of content to be displayed in the expanded cell 04-1. Next, a portion 630 of the second dimension 628 of content of the expanded cell 04-1 has been selected by the user using the mouse pointer 618, which causes the text of the portion 630 to become highlighted.

Figures 1, 17A:
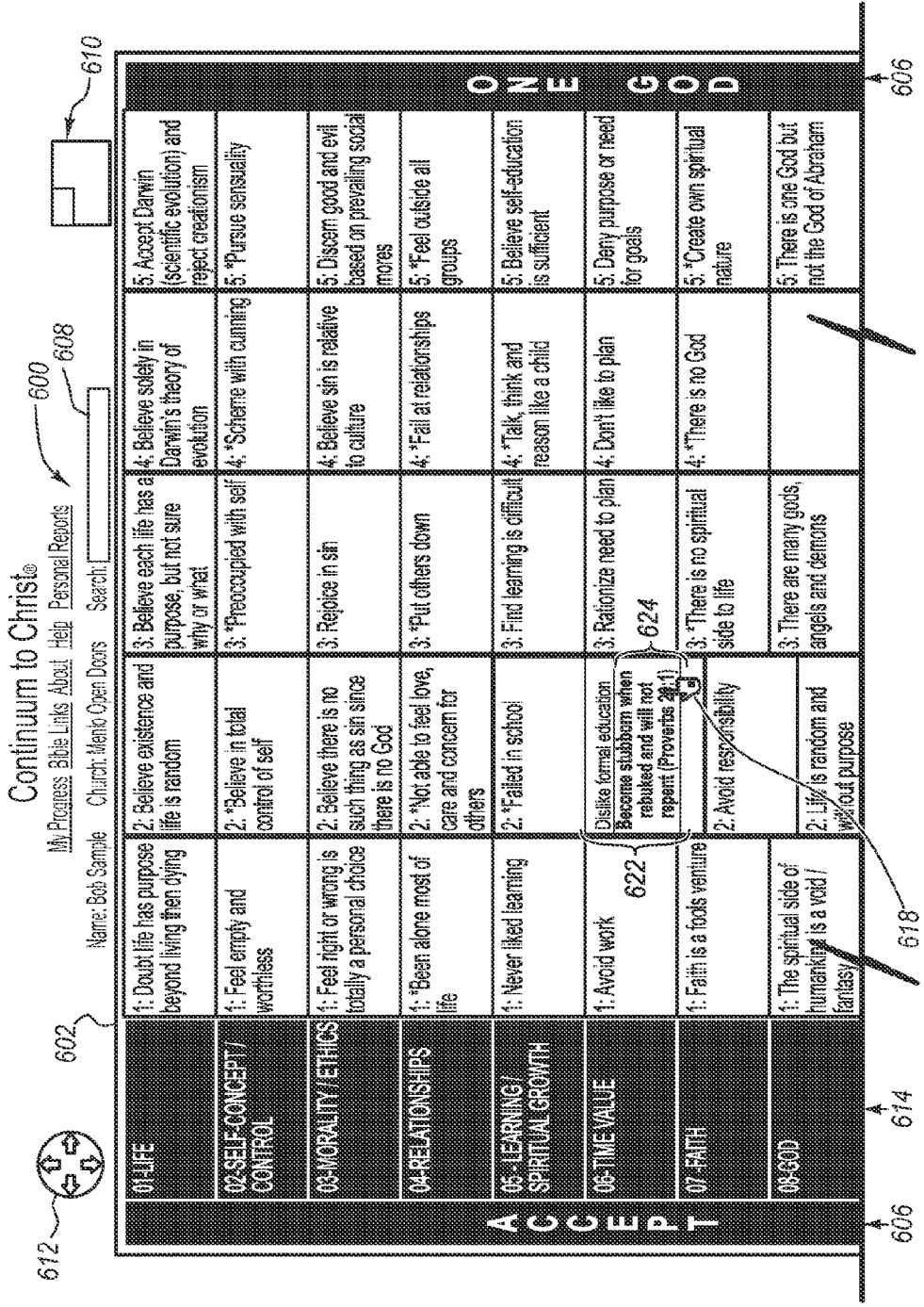

In yet another example, as disclosed in FIGS. 17A-1 and 17A-2, the cell 05-2 has been selected by the user using the mouse pointer 618, causing the accordion expansion of the cell 05-2 and enabling a second dimension 622 of content to be displayed in the expanded cell 05-2. Also, the portion 624 of the second dimension 622 of content of the expanded cell 05-2 has been selected by the user clicking the mouse pointer 618. As disclosed in FIGS. 17B-1 and 17B-2, the selection of the portion 624 of the second dimension 622 of content also causes another dimension of content to display in a pop-up menu 632.

Figures 2, 17B:
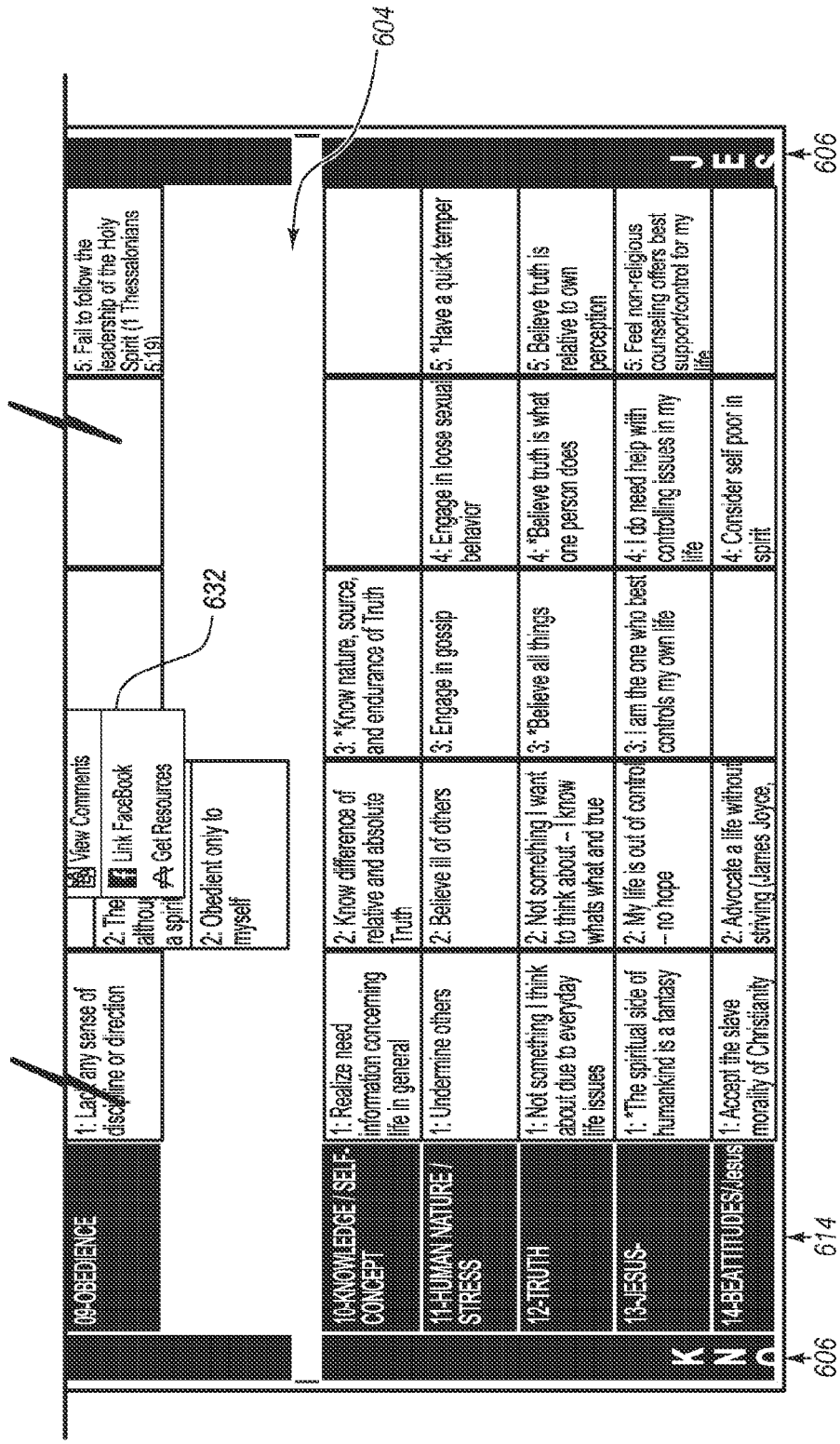
Figures 2, 17C:
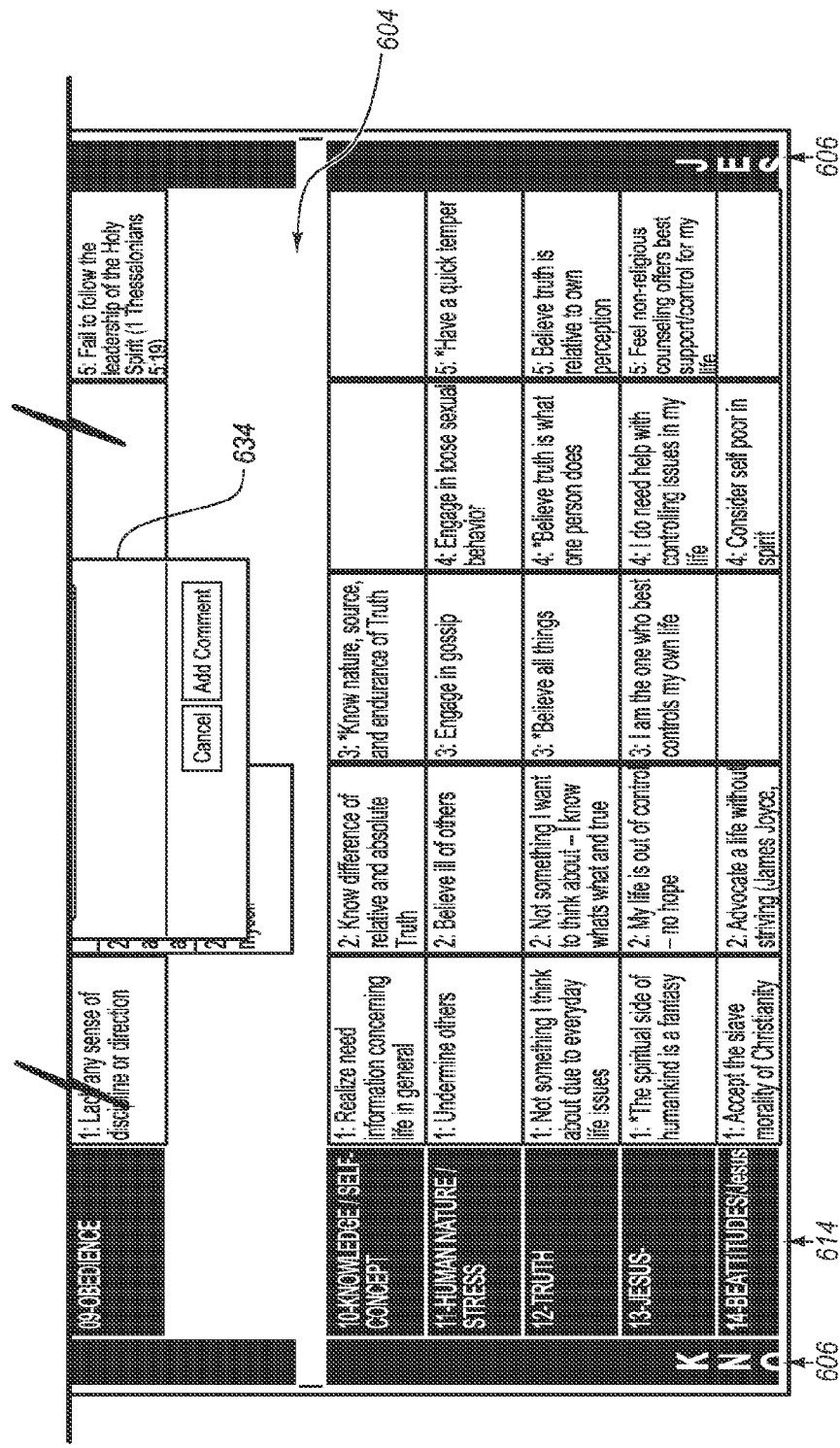
Figures 1, 17D:
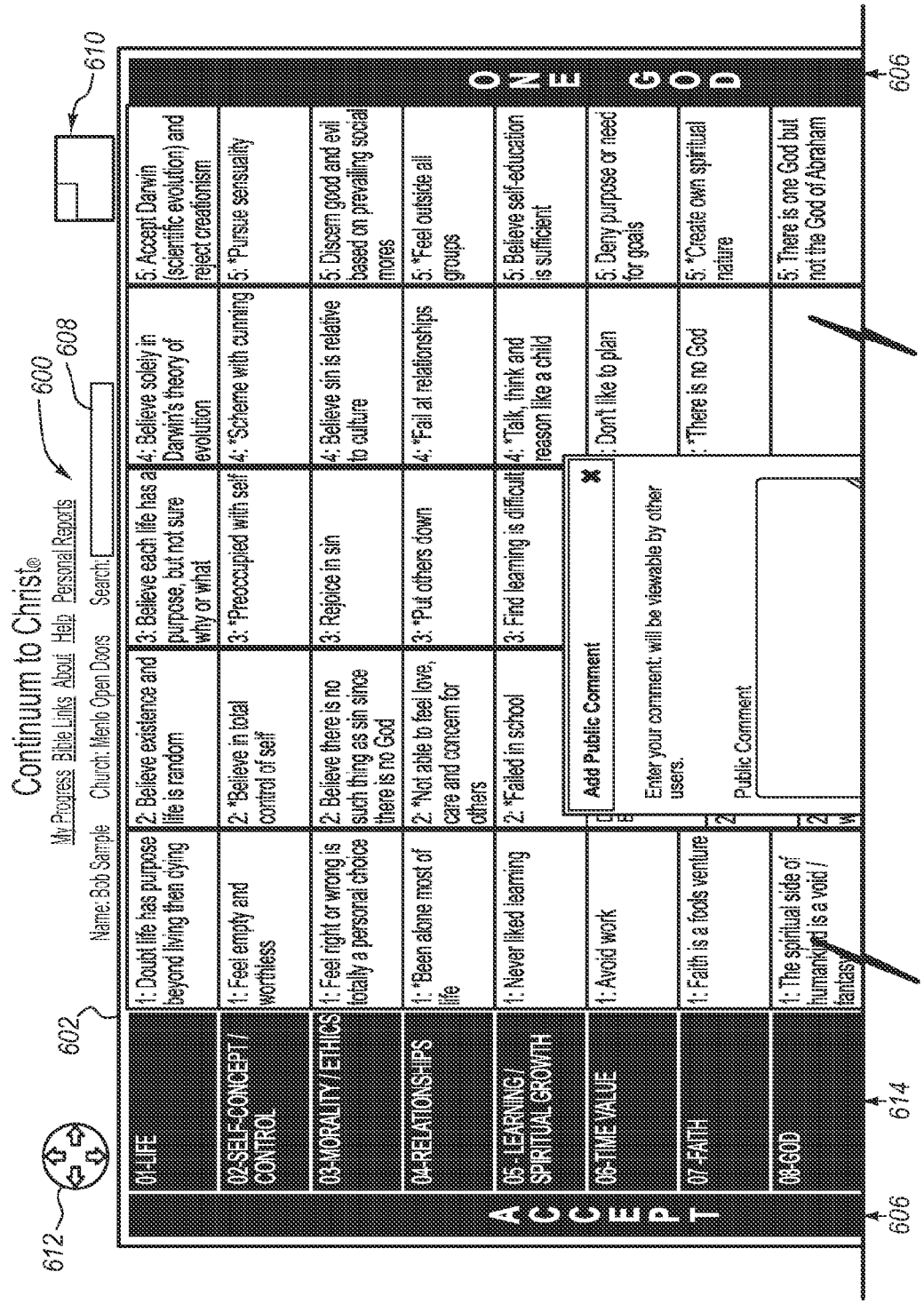
Figures 2, 17D:
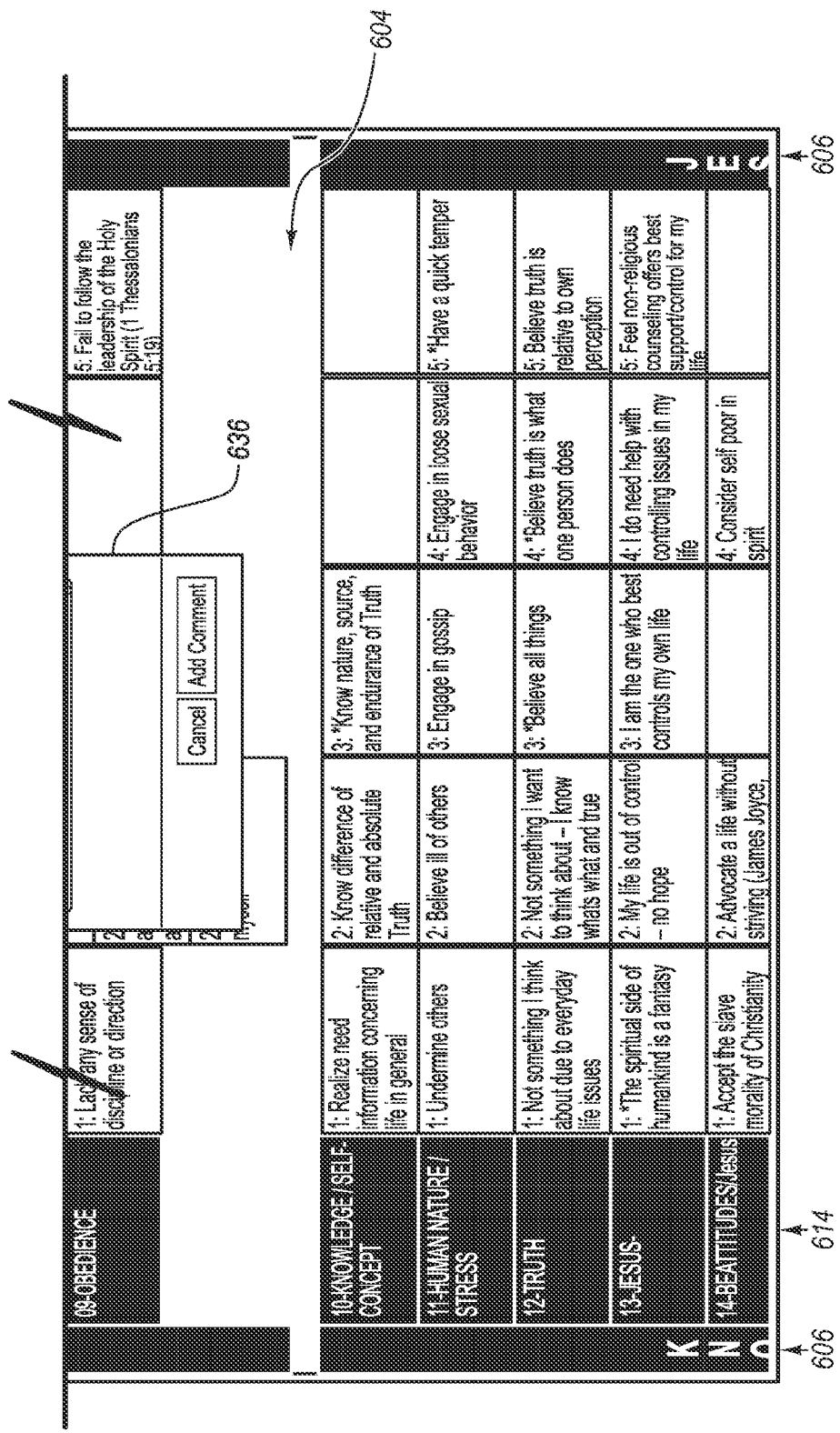
Figures 1, 17E:
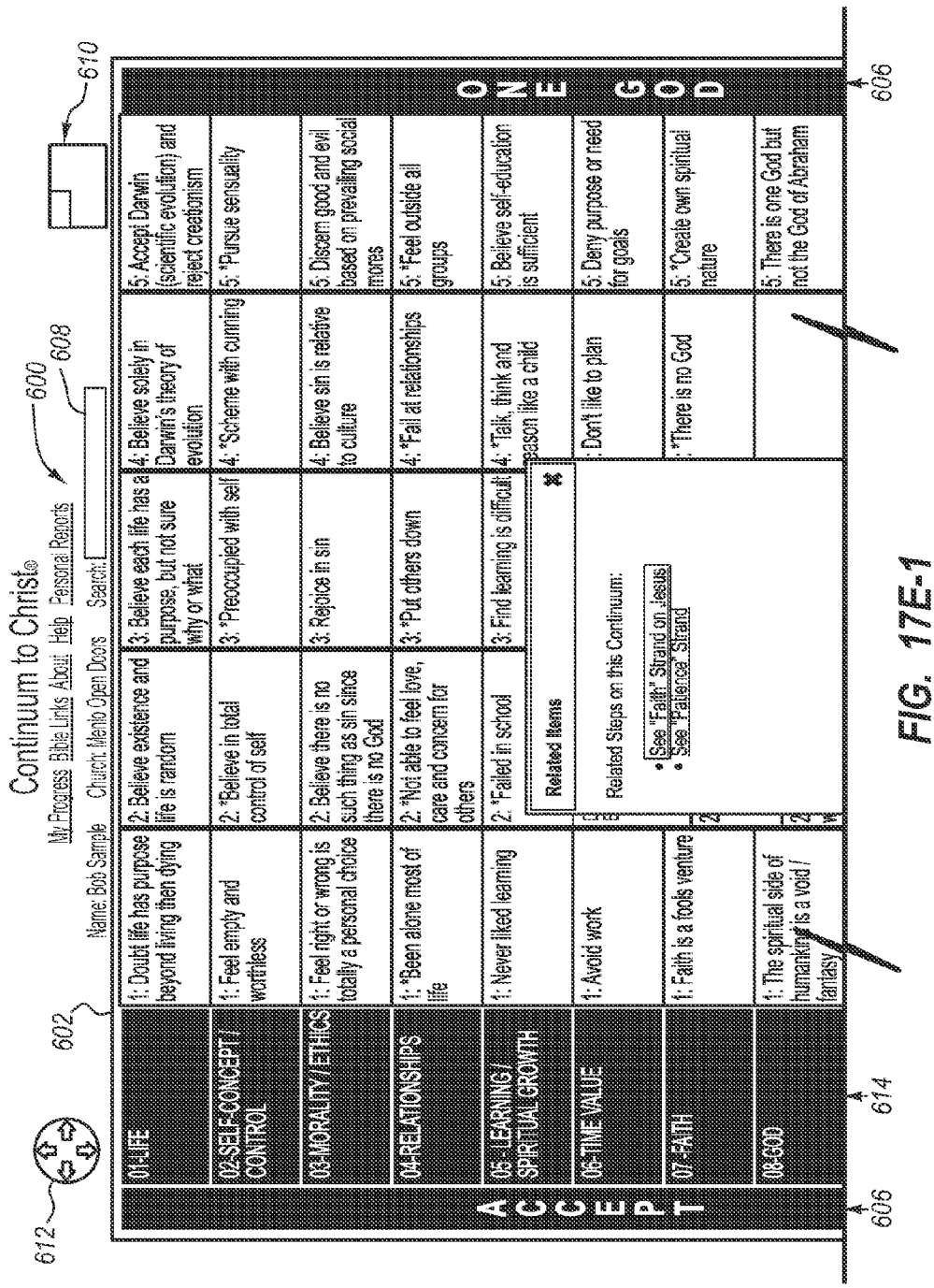
Figures 2, 17E:
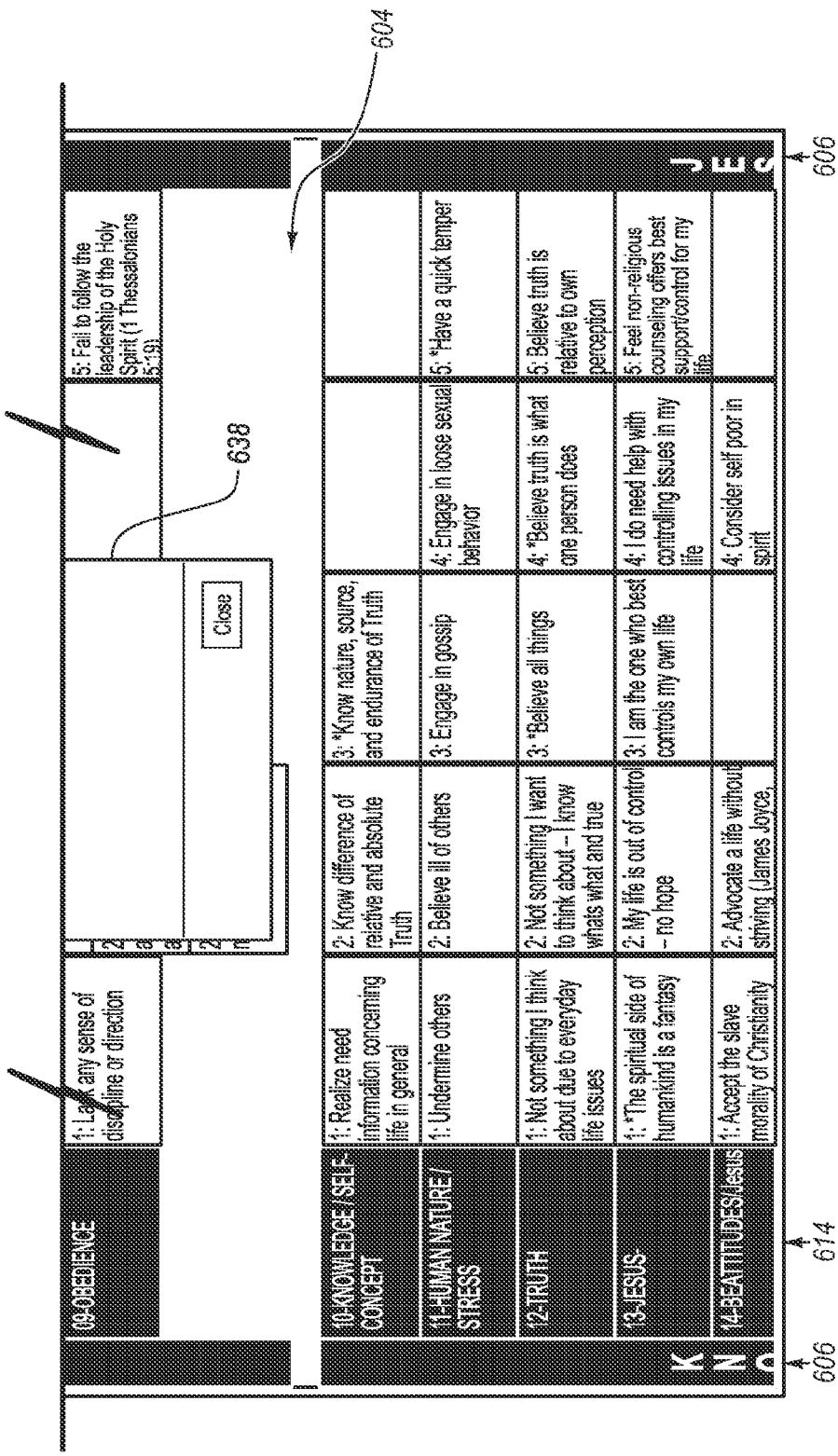
Figures 1, 17F:
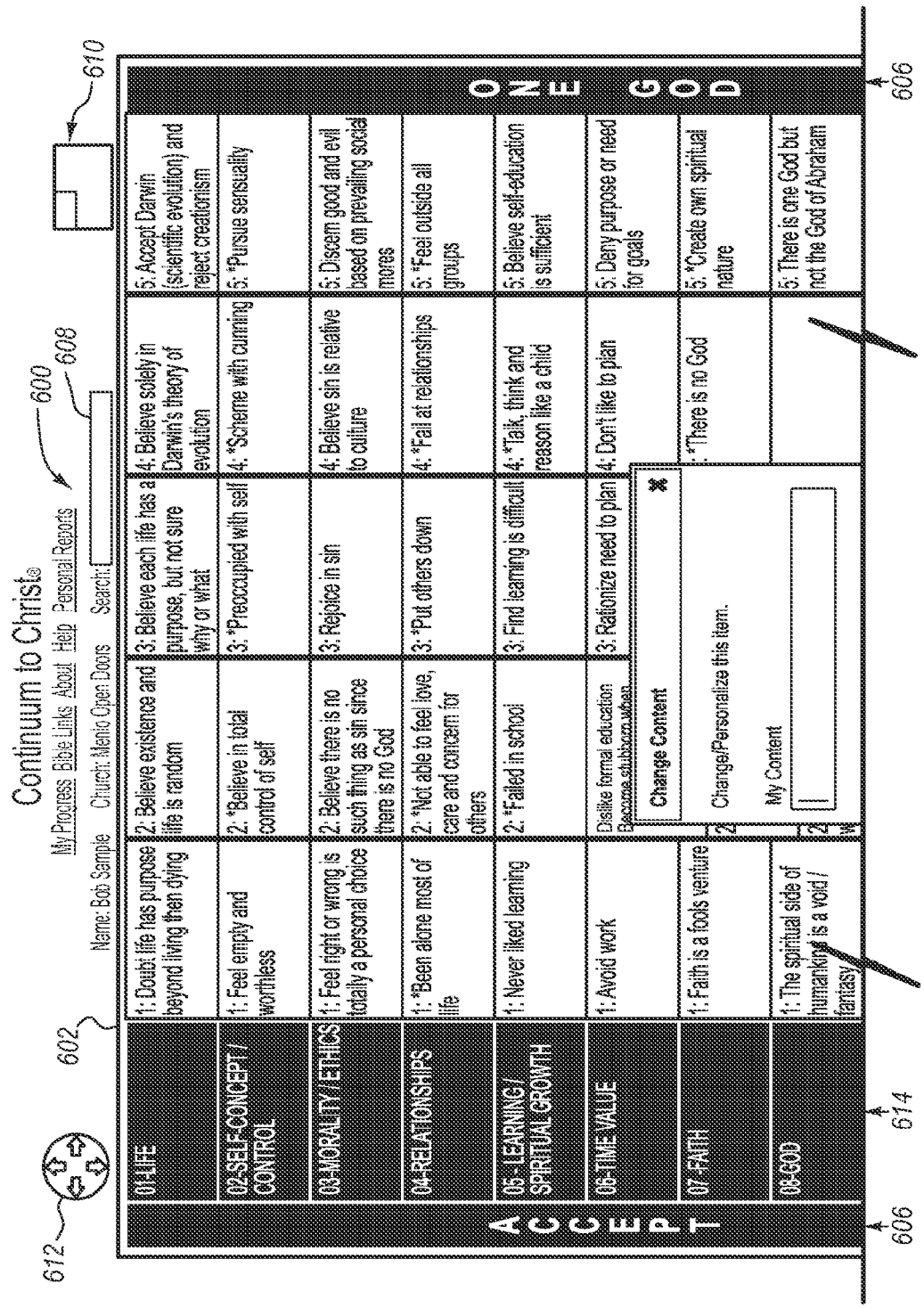
Figures 2, 17F:
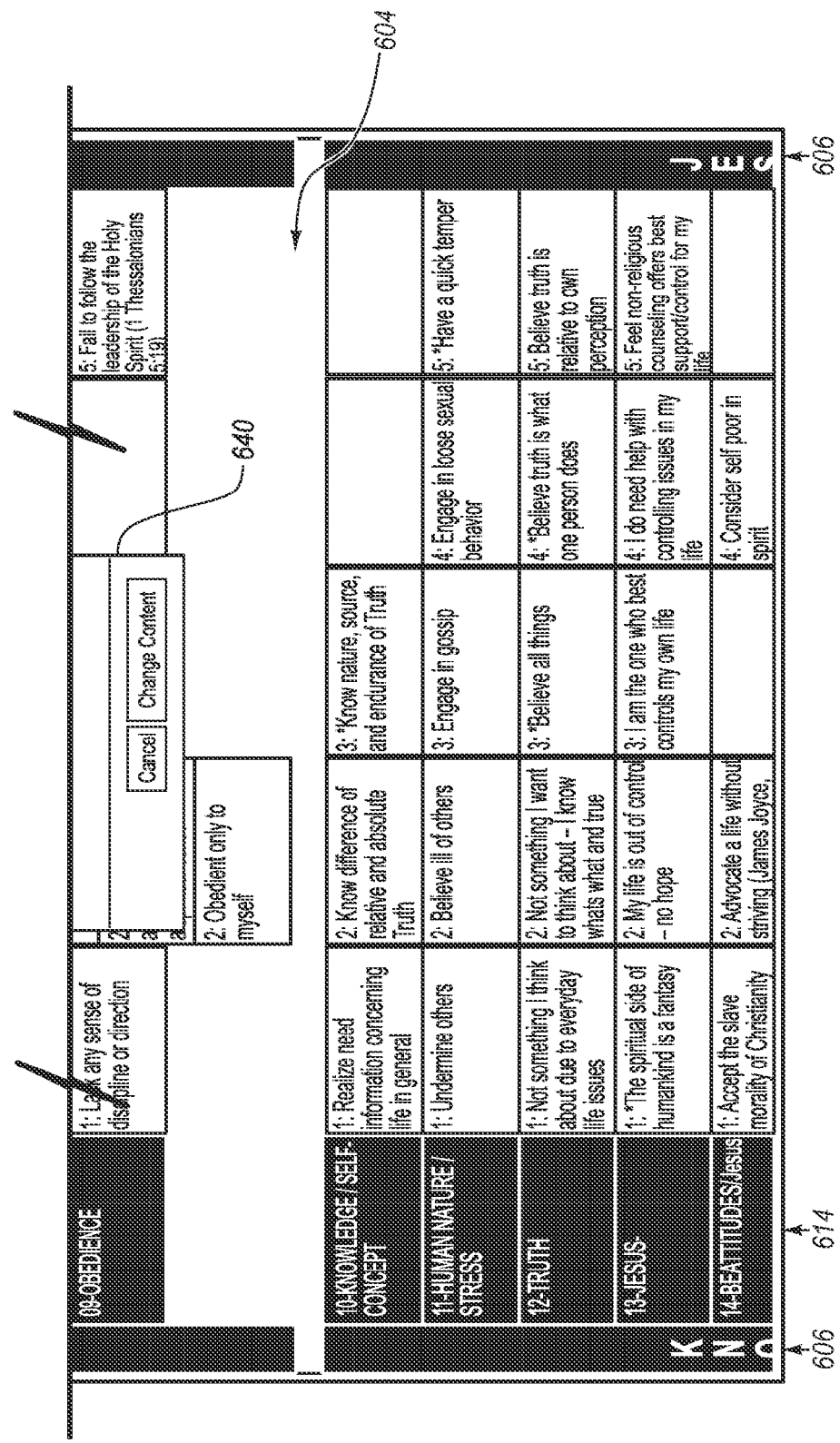

If the user selects the "Add Private Note" option on the pop-up menu 634 disclosed in FIGS. 17B-1 and 17B-2, another dimension of content is displayed in FIGS. 17C-1 and 17C-2 in yet another modal window 634. The modal window 634 allows the user to privately annotate or comment on the step described in the second dimension 622. Alternatively, if the user selects the "Add Public Comment" option on the pop-up menu 632 disclosed in FIGS. 17B-1 and 17B-2, another dimension of content is displayed in FIGS. 17D-1 and 17D-2 in yet another modal window 636. The modal window 636 allows the user to annotate or comment on the step described in the second dimension 622 for public viewing. Similarly, if the user selects the "See Related Details" option on the pop-up menu 632 disclosed in FIGS. 17B-1 and 17B-2, another dimension of content is displayed in FIGS. 17E-1 and 17E-2 in yet another modal window 638. The modal window 638 allows the user to select cells that are linked to the currently selected cell 05-2, as discussed above, thus potentially enabling the user find related structured content that can help teach, instruct, inform, or provide background on the structured content of the selected cell. Moreover, if the user selects the "Personalize Detail" option on the pop-up menu 632 disclosed in FIGS. 17B-1 and 17B-2, another dimension of content is displayed in FIGS. 17F-1 and 17F-2 in yet another modal window 640. The modal window 640 allows the user to edit or customize the content of the selected cell 05-2, thus potentially improving content relevance by making it more personal, for example. In one example embodiment, the user can hold down a Control key (or equivalent function on their device) and toggle between viewing the original default content and the user's own changed content in the viewport 602. In another embodiment, the user can send a public or anonymous request to other users who may have changed similar content.

Figures 1, 18:
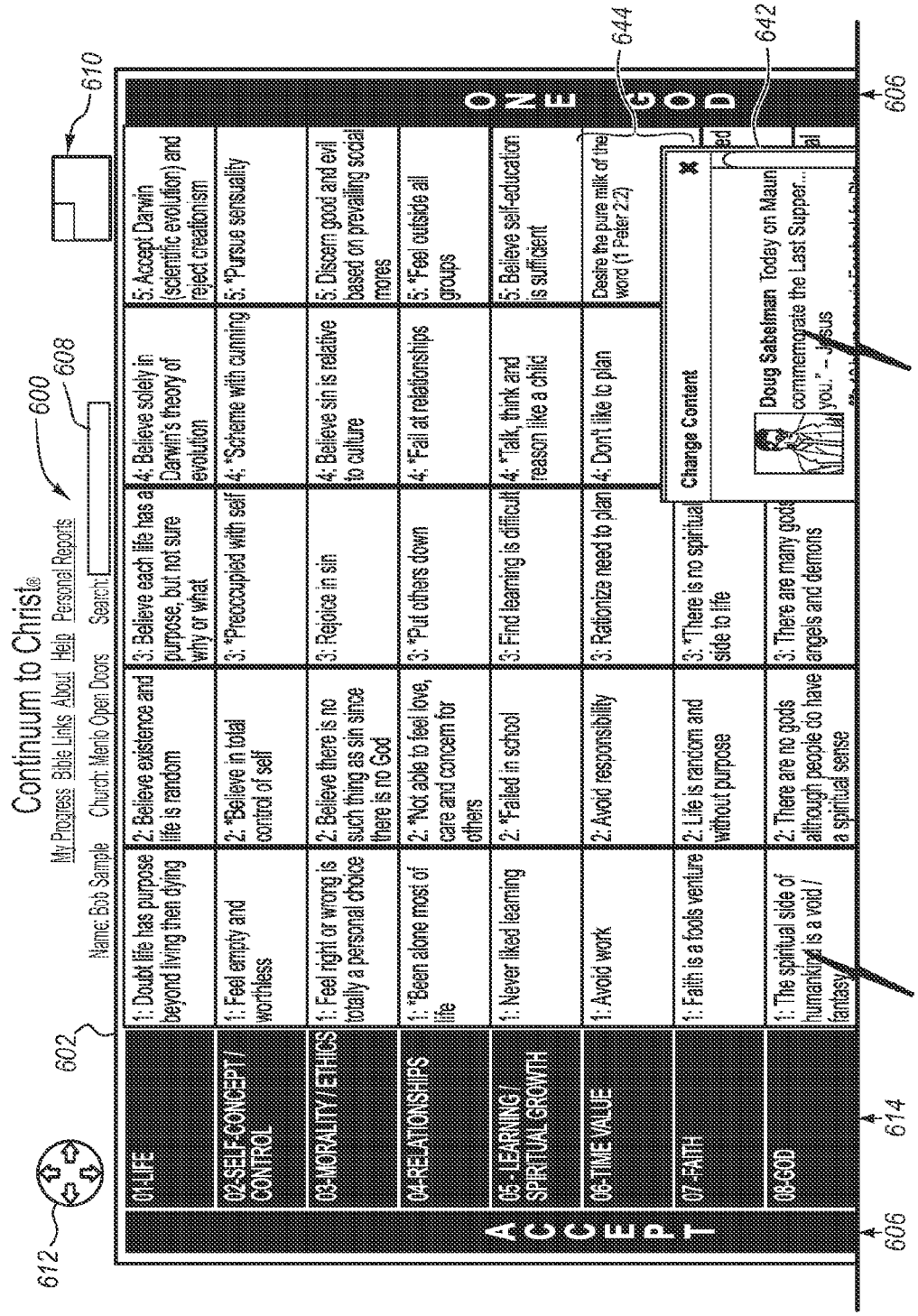
Figures 2, 18:
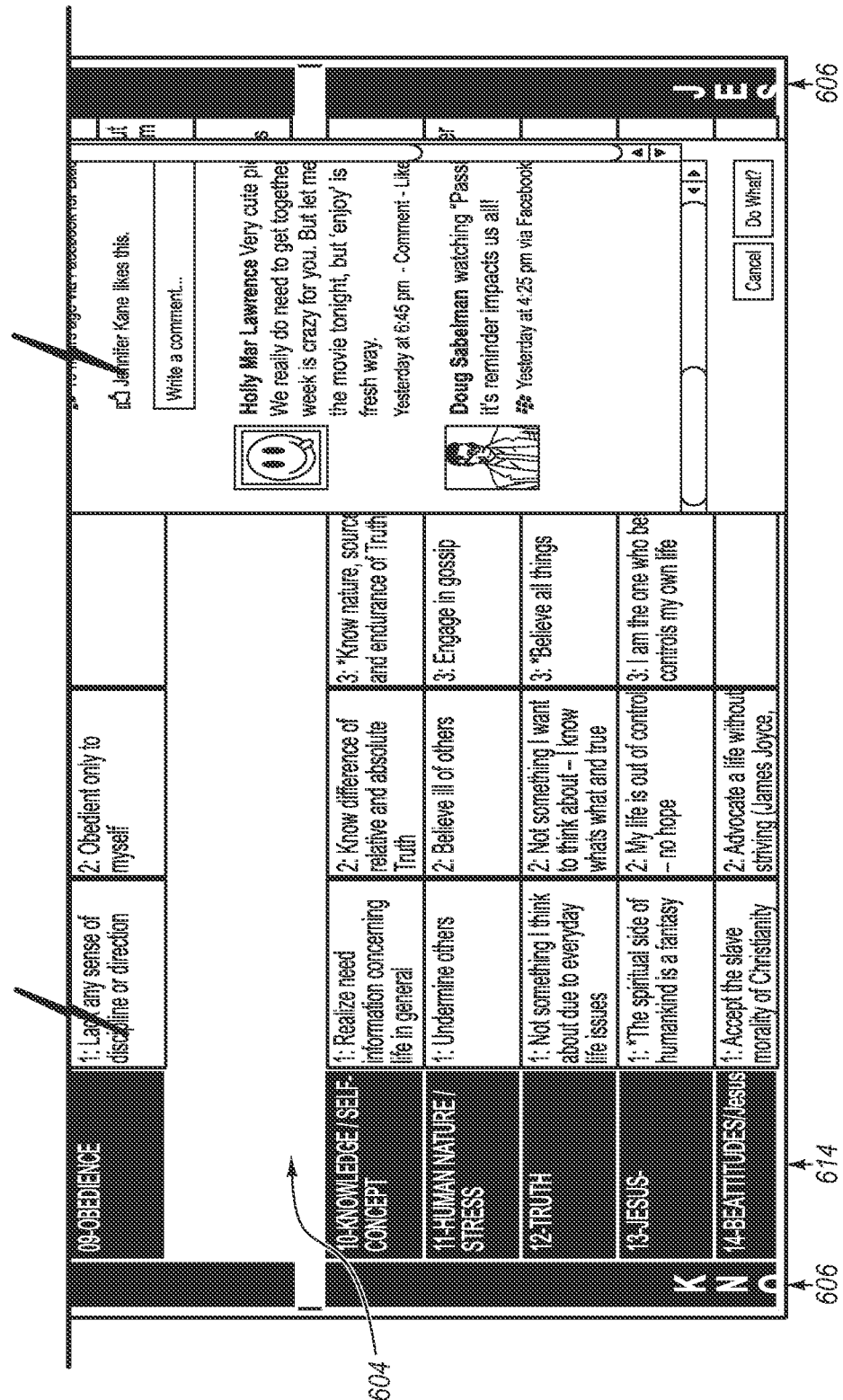

With reference now to FIGS. 18-1 and 18-2, a modal social-networking window 642 of the cell 05-5 within the user interface 600 is disclosed. As disclosed in FIGS. 18-1 and 18-2, the cell 05-5 has been selected by the user, causing the accordion expansion of the cell 05-5 and enabling a second dimension 644 of content to be displayed in the expanded cell 05-5. Next, the selection of the second dimension 644 of content causes another dimension of content to display in the social-networking window 642. The social-networking window 642 allows the user to network with other users who, for example, are interacting with a similar user interface to the user interface 600.

For example, the user interface 600 may be part of a social-networking system of user interfaces for navigating structured content and for content-driven and context-specific social networking. The system may be made up of multiple user interfaces, each associated with a user. The social-networking system may further automatically monitor the interaction of each user with the associated user interface and recommend users to each other based on the monitoring of user interaction with the user interfaces.

For example, the social-networking system may recommend users to each other based on users having chosen to interact with user interfaces that include identical or similar structured content. For example, where multiple users have chosen to interact with user interfaces with structured content that is identical or similar to the structured content of the user interface 600, the system may recommend the users to each other. Thus, the structured content engenders social interaction.

In another example, the social-networking system may recommend users to each other based on the similarity of patterns of usage of the cells of the grids of the users. For example, where users "Doug Sabelman" and "Holly Mar Lawrence" have selected and/or modified the cell 05-5 of user interfaces identical to the user interface 600, the system may automatically recommend that "Doug Sabelman" and "Holly Mar Lawrence" chat with each other using the social-networking window 642.

In yet another example, the social-networking system may recommend users to each other based on the similarity of statuses of the cells of the grids of the users. For example, as a user learns from or works across the progression of structured content in a grid, at any time he can enter or update the "Status" on a particular dimension of a cell, which may reflect how applicable the dimension is to the user or the user's sense of accomplishment or mastery of the dimension. A status may also be represented in a variety of ways, such as progress on a skill, a purchasing status of cattle, or a ranking of lawyers (see FIGS. 19 and 20). A status can be self-assessed, assessed by others, or automatically assessed by the user interface. For example, where two users have entered identical or similar statuses in one or more cells of their respective user interfaces 600, the system may automatically recommend the users to one another and/or give a percentage of cells with similar statuses so that the users can decide whether they are similar enough to warrant contacting one another using the social-networking window 642. Additional details regarding cell statuses will be disclosed below.

The social-networking window 642 thus enables users to link their comments about any dimension of the structured content of the grid 604 and use of the default structured content (or their personal changes thereto) of the grid 604 to link to and interact with members of a social network. In another embodiment, a user can create his own network (e.g., business, social) based on his use of the structured content in the grid 604 by using any appropriate social-networking method.

It should be noted that while one contemplated embodiment involves the notion of users linking from the grid 604 into an existing network-based social-networking system (such as Facebook®), other embodiments might be directed to the notion that the grids of structured content can themselves serve as the basis for establishing a new genre of social networks where the structured and viewport-accessible content serves as a starting point or default anchor to which users can, for example, attach or make comments, expand content, add photos, video, or other such social or business networking elements.

Further, while user-specific data may remain private and personal, if the user is using the user interface 600 as a member of a group (in a class, as an employee, as a church member, etc.), the system may allow for a group administrator to aggregate anonymous user status and "time in cell" data, as well as monitor the progress of multiple users, such as where a teacher creates an account that gives the teacher access to the user interfaces of each of his/her students and can thus monitor and assess the progress of each student. These features, based on granular content, make content easily hidden or visible, and thus usable. Most social scales are too "gross" in terms of applicable detail, thus losing users due to lack of personal association. From the aggregate report the administrator can determine if the group as a whole is making progress and how much progress and whether the content in the grid 604 is relevant, for example. This may permit a better self-directed and paced learning experience which provides for honest self-assessment as a private tool. This also enables multiple user interfaces to function together as part of an integrated system.

Further, the social-networking of the example user interfaces disclosed herein can enable real-time designation, determination, and tracking of status across and/or within cells to denote states or criteria, for example, skill mastery, progress, measurements, statistical distributions, purchase status, item or product selection, ranking, condition, further review needed, and/or GPS location. For example, as part of the preferences defined by the content author or the user or the system administrator, definable sets of status points or criteria (such as progress indicators, status representations, acceptance levels, performance levels, pricing levels or action thereon, accomplishment criteria, or other textual or symbolic representations or criteria) can be assigned to or associated with various types or levels of progress within or across the structured content displayed within grid cells for tracking of status/progress. Additionally, color or other representative nomenclature can be assigned or defined for each criterion or status point to provide a visual display of each cell's status.

5. Third Example User Interface for Navigating Structured Content

Figure 19:
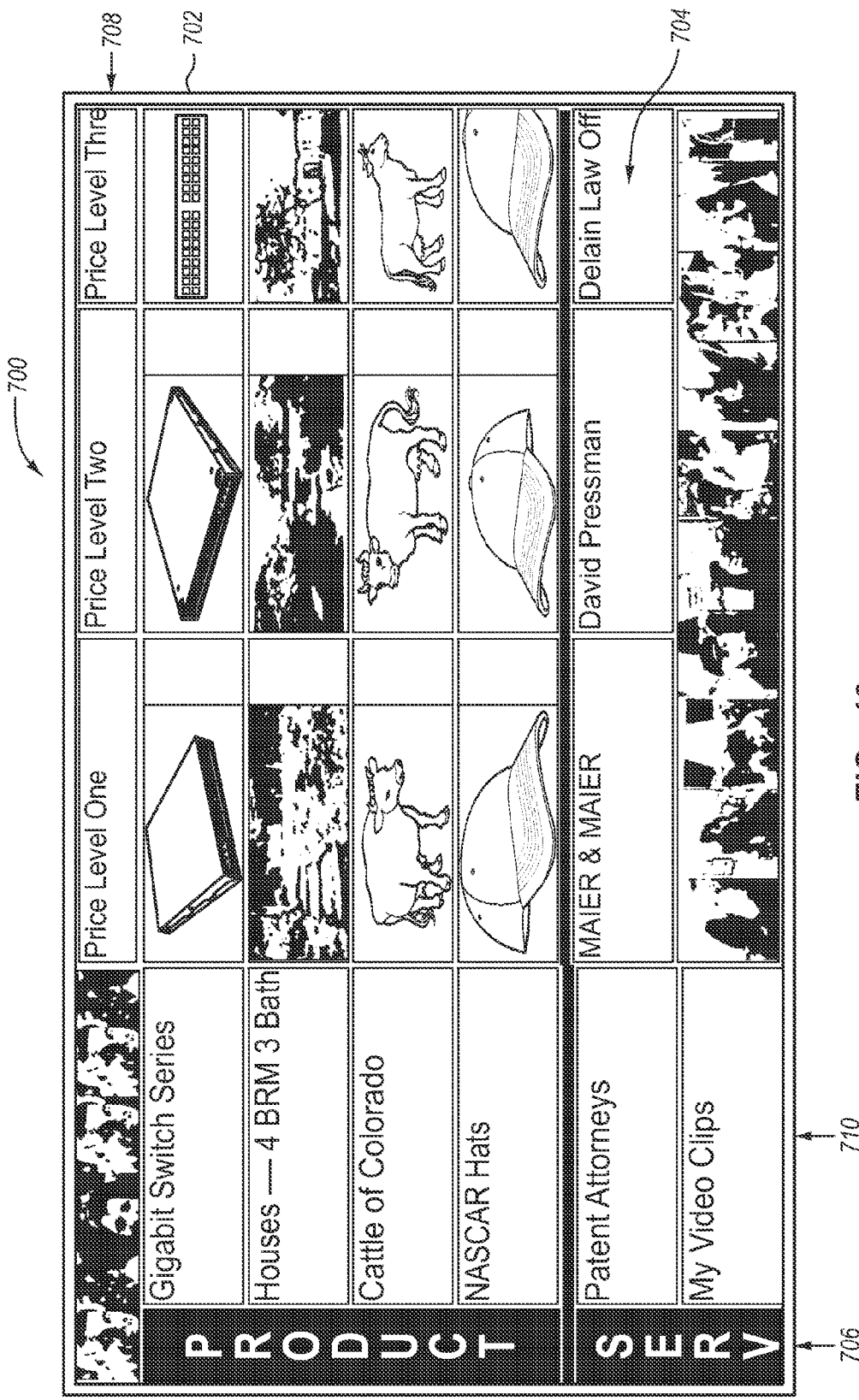
FIG. 19 discloses a third example user interface for navigating structured content.
Figure 20:
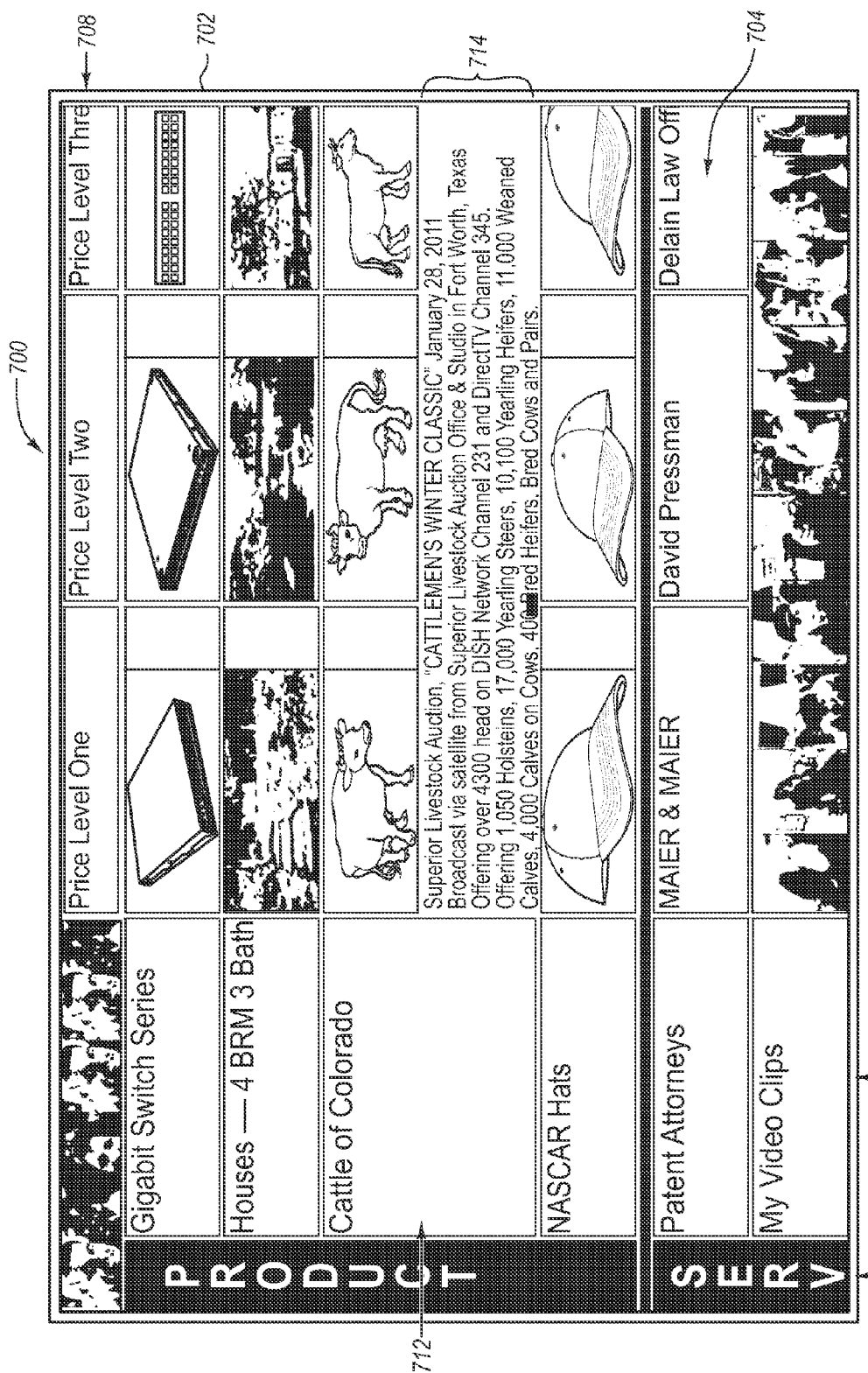
FIG. 20 discloses expansion of a row within the user interface of FIG. 19.
Figure 22:
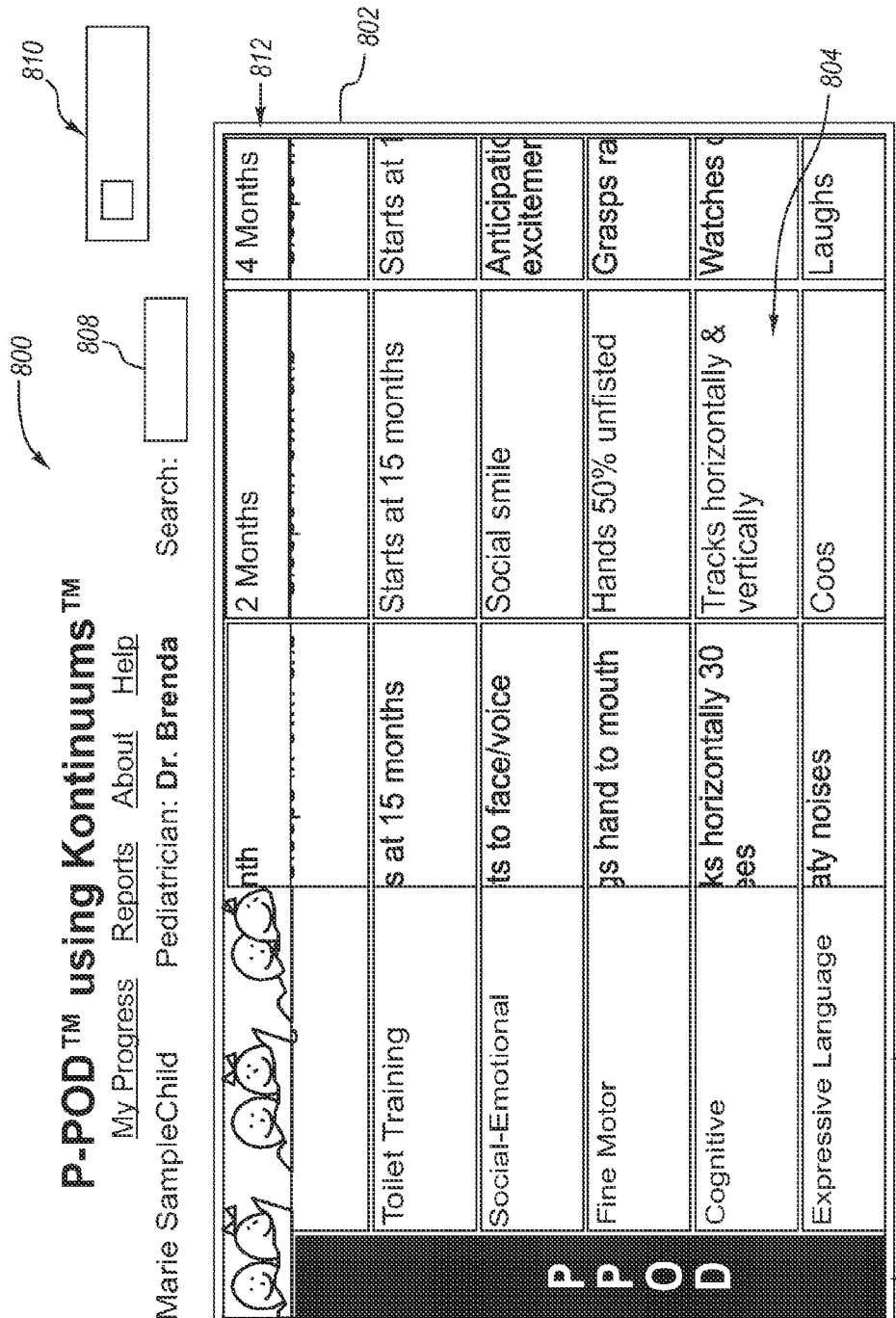
FIG. 22 discloses diagonal scrolling with synchronous headers within the user interface of FIG. 21.

With reference now to FIGS. 19 and 20, a third example user interface 700 is disclosed. As with the user interfaces 500 and 600, the user interface 700 is configured to navigate structured content. As disclosed in FIG. 19, the structured content of the user interface 700 includes various types of structured content data types including images, video clips, and text, or any combination thereof. In one embodiment of the user interface 700, the user can tap/click, drag or scroll across multiple image, audio, or video content displayed with the cells of the grid 704 to select and re-sequence, for example, video clips, audio patterns or a mashing thereof, or for creating pictures sentences, used by those with autism or communication disabilities. It is understood, however, that the user interface 700 could instead be used to navigate other structured content.

As disclosed in FIG. 19, the user interface 700 generally includes a viewport 702, a grid 704 of multi-dimensional cells and a domain column 706. The cells of the grid 704 are generally organized into horizontal rows and vertical columns. The grid 704 also includes a header row 708 and a header column 710. The header row 708 is made up of header row cells each positioned in a separate column of the grid 704. The header column 710 is made up of header column cells each positioned in a separate row of the grid 704.

Each of the header column and header row cells may be multi-dimensional cells configured to store structured content. For example, a header cell can contain any manner of information such as an index, coordinate, or metric, such as types, categories, dates, time, money, or ranking. For example, a grid based on time metrics in the header cells might represent a timeline. Further, each header row cell and header column cell may be further configured to display, upon selection, one or more additional dimensions of structured content applicable to all cells positioned in the same column or same row, respectively, as the selected header cell.

For example, as disclosed in FIG. 20, the header column cell in the row 712 has been selected by the user. Upon selection, the selected header column cell has displayed a second dimension 714 of structured content applicable to all cells positioned in the row 712. This display of the second dimension 714 of structured content is accomplished by the each header column cell of the row 714 being further configured to expand vertically. The vertical expansion of the selected header column cell of row 714 also causes other cells positioned in row 714 to expand vertically downward and other cells positioned in rows beneath row 714 to shift vertically downward. It is understood, however, that this second dimension 714 of structured content that is applicable to all cells positioned in the row 714 may instead be displayed in a separate interface object, such as a modal window for example. It is further understood that any of the cells in the header row 708 may be similarly configured to expand horizontally along with the other cells in the same column, in order to display, upon selection, one or more additional dimensions of structured content applicable to all cells positioned in the same column.

6. Fourth Example User Interface for Navigating Structured Content

With reference now to FIGS. 21 to 25-2, a fourth example user interface 800 is disclosed. As with the user interfaces 500, 600, and 700, the user interface 800 is configured to navigate structured content. As disclosed in FIG. 21, the structured content of the user interface 800 is the P-POD™, with each cell containing one or more steps relating to child development. It is understood, however, that the user interface 800 could instead be used to navigate other structured content.

As disclosed in FIG. 21, the user interface 800 generally includes the viewport 802, a grid 804 of multi-dimensional cells and a domain column 806 of cells that span multiple rows, the search box 808, the viewtracker 810. The cells of the grid 804 are generally organized into horizontal rows and vertical columns. The grid 804 also includes a header row 812 and a header column 814. The header row 812 is made up of header row cells each positioned in a separate column of the grid 804. The header column 814 is made up of header column cells each positioned in a separate row of the grid 804.

The multi-dimensional cells of the grid 804 are configured to scroll simultaneously within the viewport 802 both horizontally and vertically, also known as scrolling diagonally. During diagonal scrolling, the cells in the header row 812 and the cells in the header column 814 of the grid 804 are configured to scroll in a synchronous manner so as to remain visible in the viewport 802 and remain aligned with the rows and columns of multi-dimensional cells, as disclosed in the scrolling between FIGS. 21 and 22. Further, FIG. 22 discloses that the portion of the grid 804 displayed within the viewport 802 is configured to float within the viewport 802 during diagonal scrolling without automatically snapping to align one or more cell boundaries with one or more edges of the viewport 802 after the diagonal scrolling.

Figure 23:
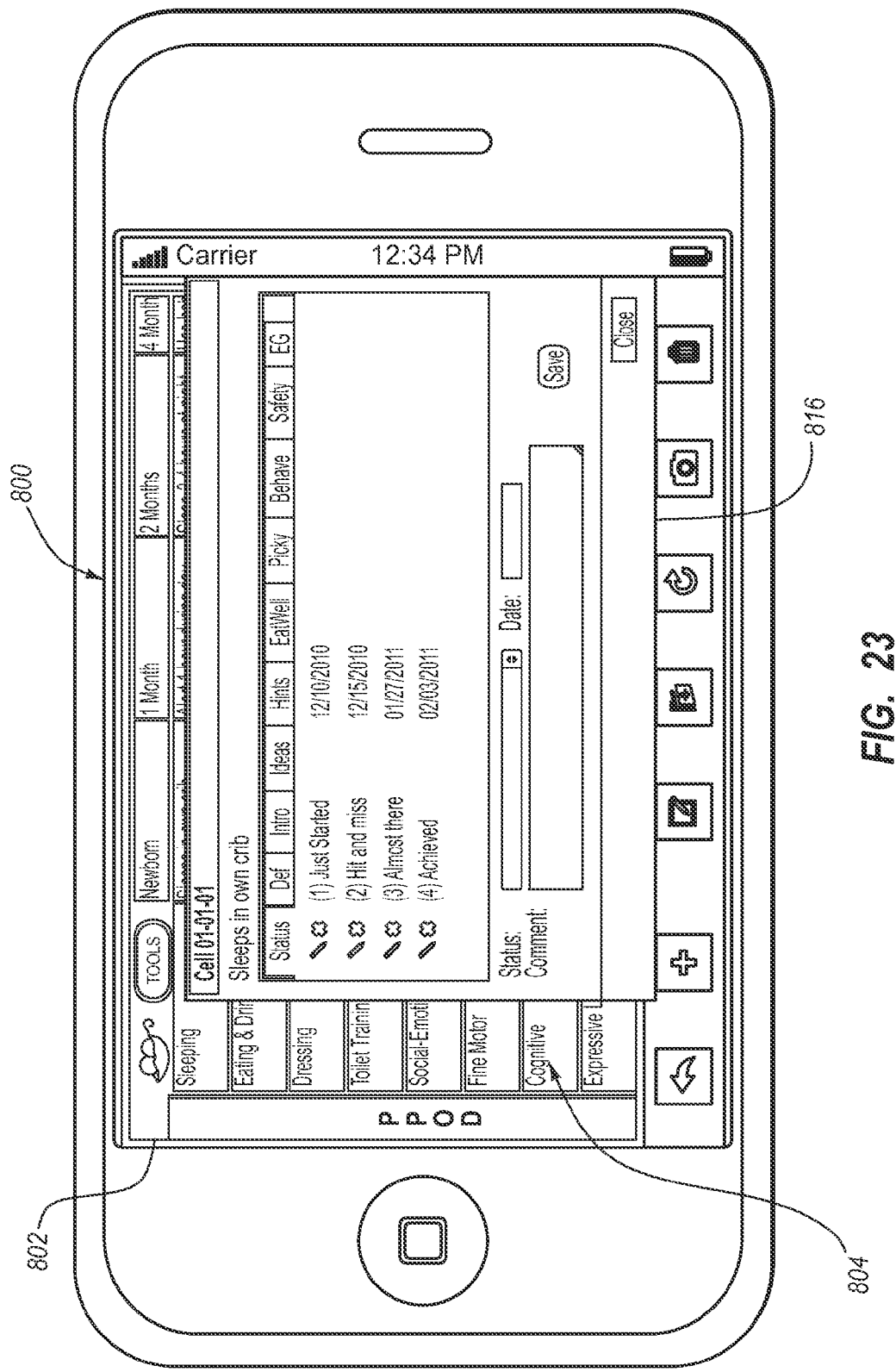
FIG. 23 discloses disclose a pop-up window of a cell within the user interface of FIG. 21 employed in a handheld device environment.

FIG. 23 discloses the user interface 800 employed in a handheld environment. It is understood, however, that the handheld environment of FIG. 23 is but one example environment in which the user interface 800 can be employed, and the user interface 800 may instead or also be employed in any of the other environments disclosed herein. FIG. 23 also discloses a pop-up modal window 816. The window 816 includes additional dimensions of structured content that are displayed in response to the selection of the cell 818 (see FIG. 21) by the user. The window 816 include a first "Status" tab which is configured to allow the user to select a status that corresponds to one of the dimensions of structured content of the cell 818. It is understood, however, that the status of the cell 818 could instead be automatically updated by the user interface 800.

As disclosed in FIG. 23, the status may be selected from a list of multiple statuses applicable to the dimension of structured content of the cell 818. For example, some of the statuses listed in FIG. 23 are "(1) Just Started," "(2) Hit and miss," "(3) Almost there," and "(4) Achieved." As disclosed in FIG. 23, the list of statuses may be ordered to indicate a progression from a less advanced assessment, such as level (1), to a more advanced assessment, such as level (4), of mastery of the dimension of structured content of the cell 818. Assessment in this context can be the end result of testing or observation. The window 816 also allows the user to enter a status date and add additional comments regarding the status. Using the Status tab of the window 816, a user can therefore track the status corresponding to the structured content of the cell 818 (see FIG. 21).

Figure 27A:
Figure 27C:
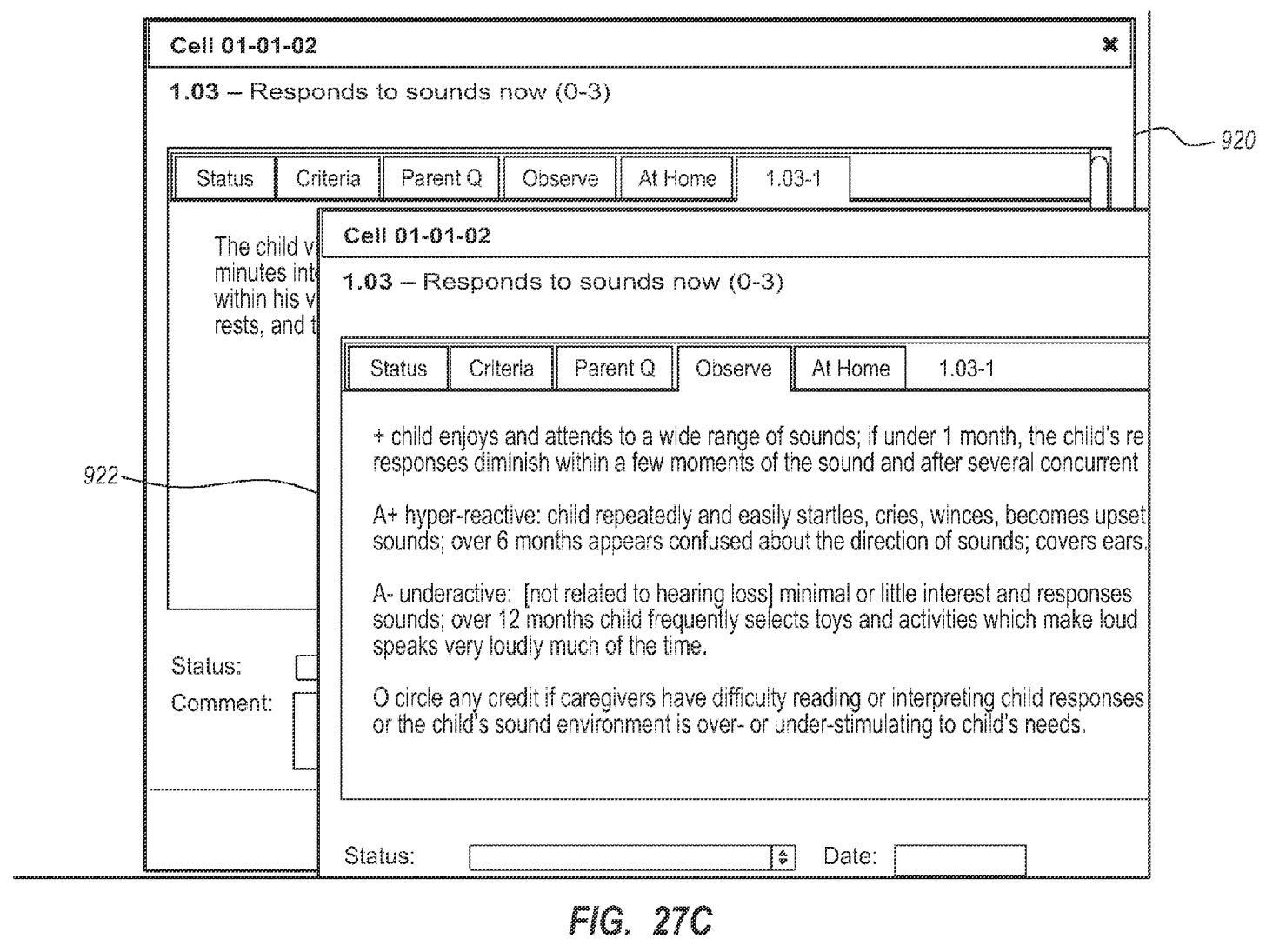
Figures 1, 29:
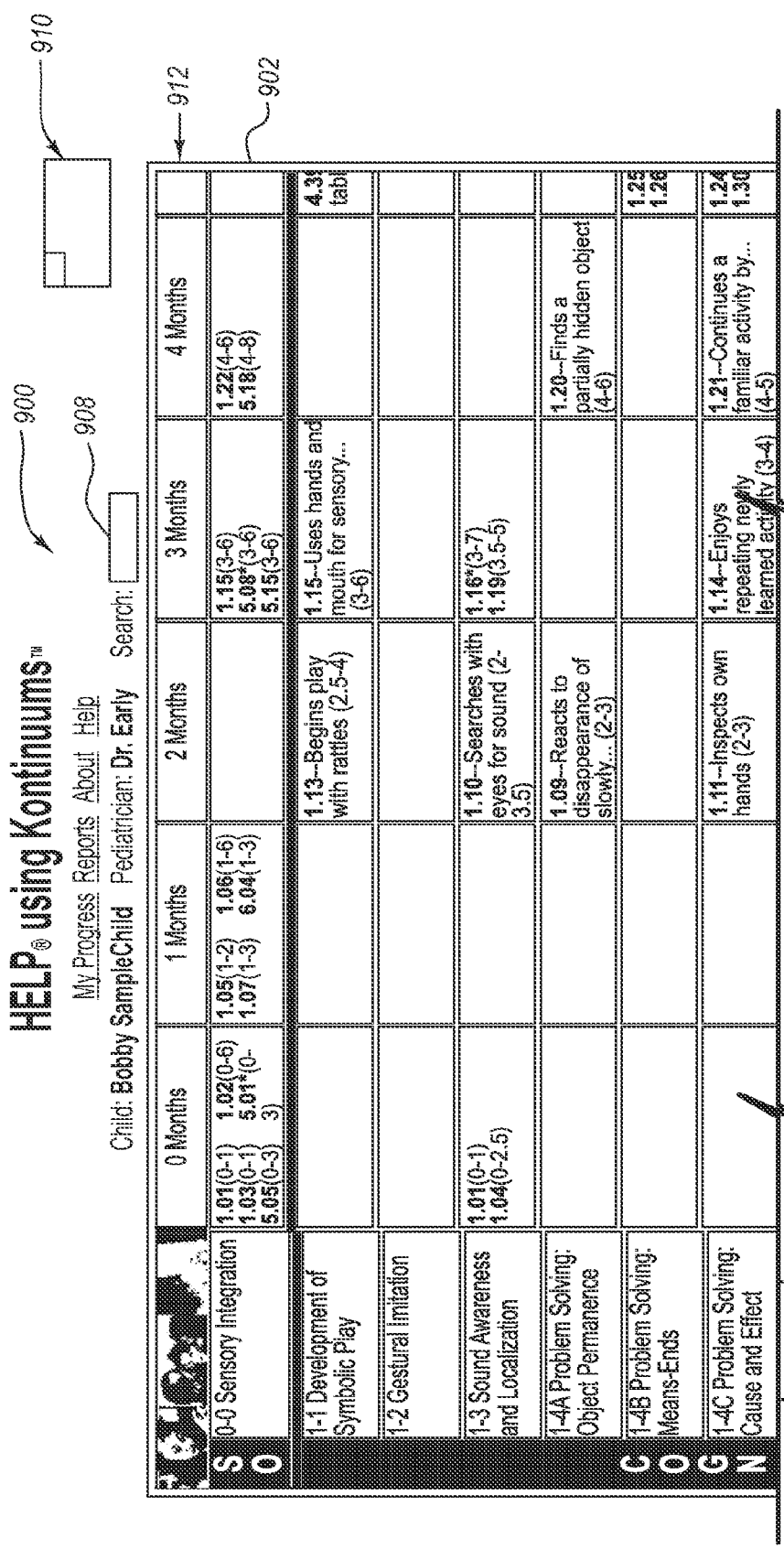
Figures 2, 29:
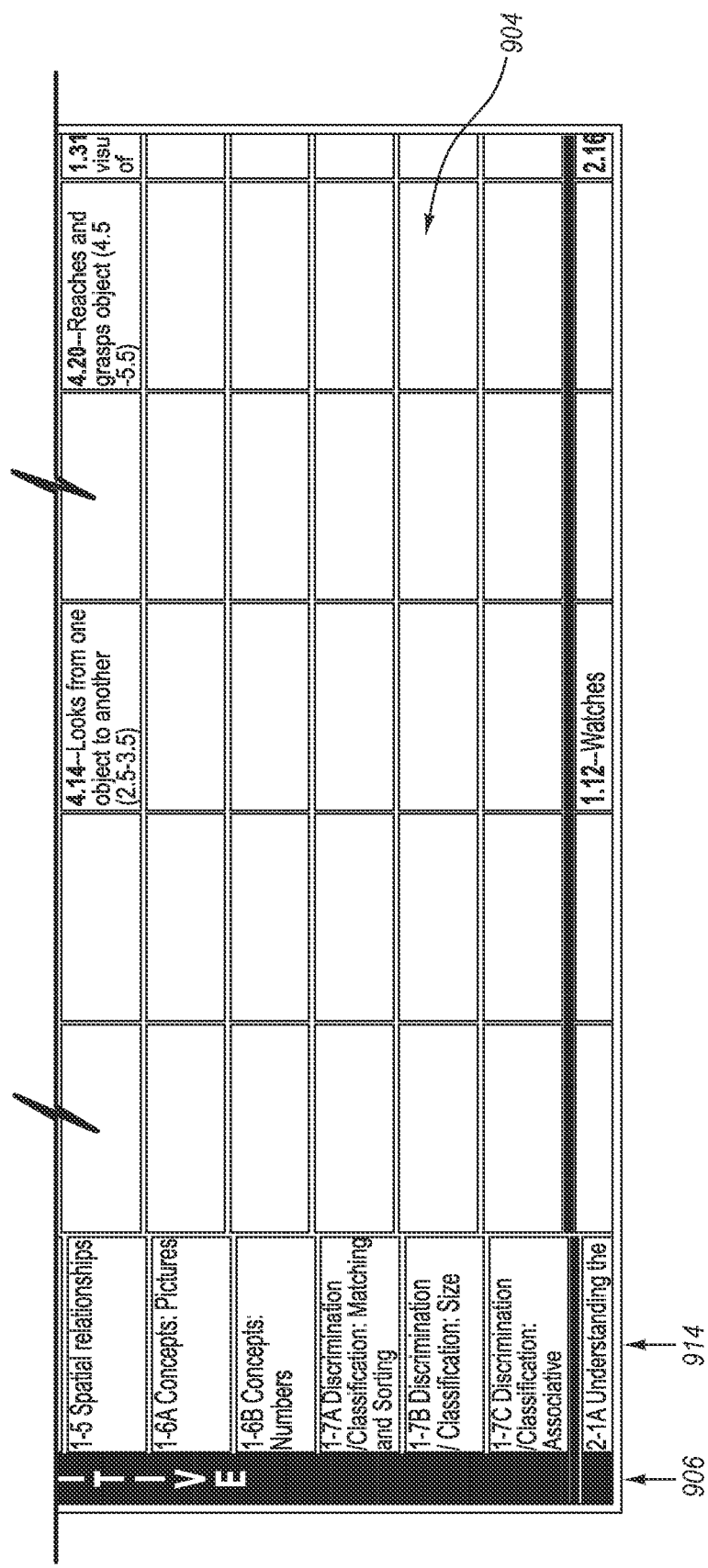

With reference now to FIG. 27B, a window 920 is disclosed in which additional statuses can be selected for a particular cell of a grid. For example, as disclosed in FIG. 27B, the status for a cell may be selected from a list of multiple statuses applicable to the dimension of structured content of the cell. For example, some of the statuses listed in FIG. 27B are "+ usually displays typical response," "A+ displays predominantly over-reactive responses," "A+− displays combination of response," "A− predominantly display under-reactive responses," "N/A inappropriate to observe due to disability or delay," "O environment and/or interaction do not support." As disclosed in FIG. 27B, the list of statuses may be ordered to indicate a progression from a less advanced assessment, such as level "A+," to a more advanced assessment, such as level "+," of mastery of the dimension of structured content of the cell. Assessment in this context can be the end result of testing or observation. The window 920 also allows the user to enter a status date and add additional comments regarding the status. In addition to the example button icons (pencil: edit, X: delete) shown on FIG. 27B next to each entry on the Status tab, there can be other types of interface options or buttons. For example, there can be buttons that allow a user to save/associate data such as photos, audio recordings, and/or video with a cell and/or with a particular status of that cell. Thus, for example, with content dealing with child development, if a parent desires to show his/her child's response or development as of a particular date, buttons can be provided to allow the parent to save/associate audio, video, images for each Status and/or for each cell on the particular date. Using the Status tab of the window 920, a user can therefore track the status corresponding to the structured content of a cell.

Figure 24:
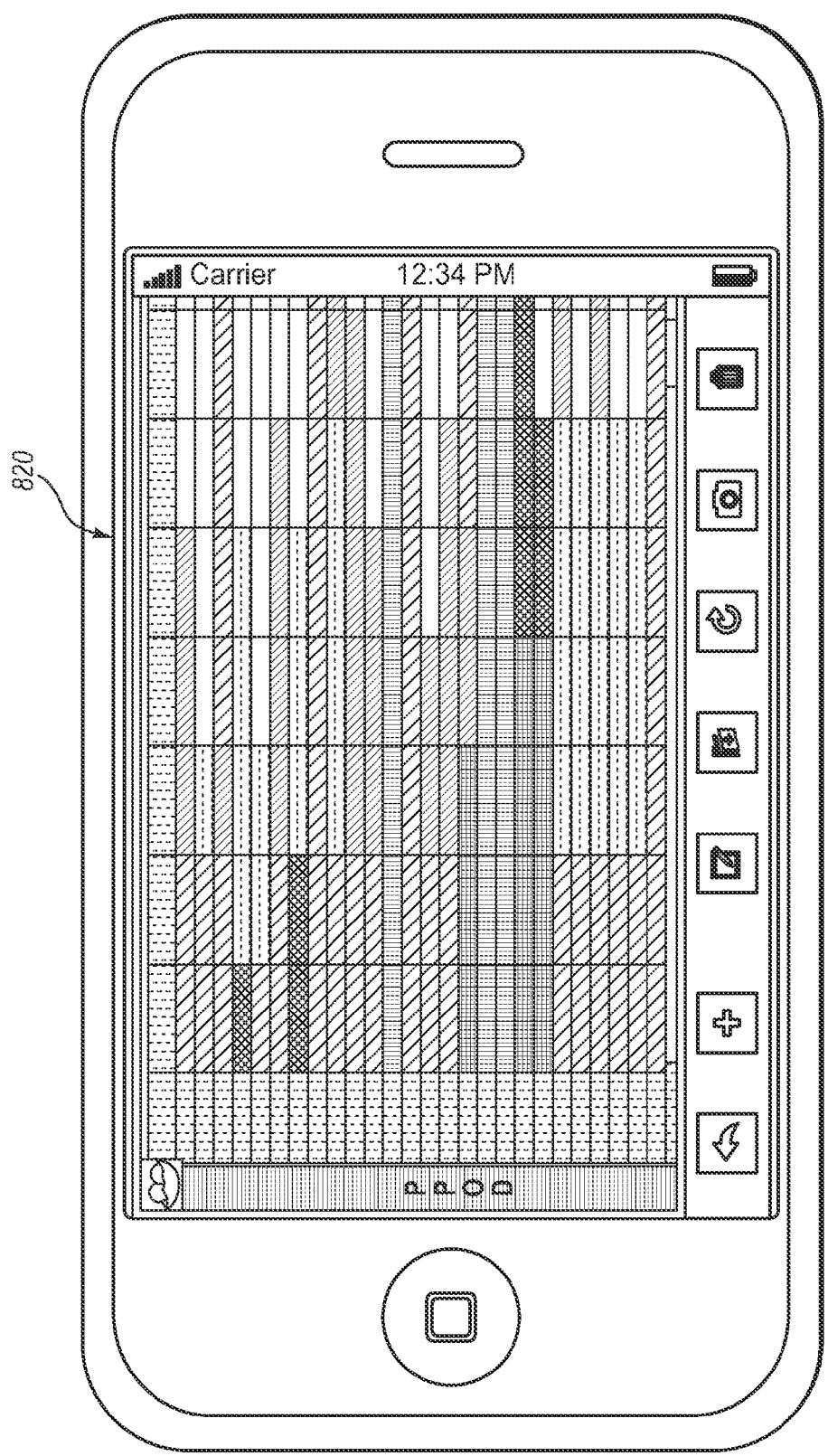
FIG. 24 discloses a summative display of the grid of the user interface of FIG. 21 employed in a handheld device environment.

With reference now to FIG. 24, a summative representation 820 of the grid 804 of the user interface 800 is disclosed as employed in a handheld environment. It is understood, however, that the handheld environment of FIG. 24 is but one example environment in which the summative representation 820 can be employed, and the summative representation 820 may instead or also be employed in any of the other environments disclosed herein. Even with the limited display size in the handheld environment of FIG. 24, the summative representation 820 of the grid 804 enables a user to quickly and at a glance determine the statuses of the cells of at least a portion of the grid 804 (see FIG. 21). As disclosed in FIG. 24, using color, representative or symbolic nomenclature, or some other visual indicator, the status of each cell in the summative representation 820 is simultaneously displayed. Thus, the status of each cell, as entered in the window 816 of FIG. 23 for example, can be simultaneously displayed in the summative representation 820 to give the user an overall impression of the progress through the steps in the cells of the grid 804 (see FIG. 21).

The summative representation 820 can be used to provide a teacher or instructor or supervisor an overview of overall performance or progress across users or learners, or a buyer rating of the products they are considering. In another embodiment, such a summative representation can be used to show progress or learning across groups of learners, for example, all 3rd grade classes at a school, or all students in schools in a county, or performance of personnel in a corporate department. In another embodiment, such a summative representation can be used as a form of "historical standard" or goal, representing a target based on performance or progress history of other users or groups of users.

It is further noted that the user interface 800 may further include a "data dump" feature which enables a user to, for example, retrieve and/or capture from the system server/database all data for a child such as a their progress and photos and parents' comments. This "data dump" ability of the user interface 800, or other user interfaces disclosed herein, can be used in a variety of scenarios including, but not limited to, a Baby Book, a report card, test portfolios, or an analysis of job performance. This "data dump" feature is different from the summative representation 820 in that it is not a visual display of merely "status/progress" but rather a formatted retrieval of all account or user or learner data into a meaningful historical-type report.

Figures 1, 25:
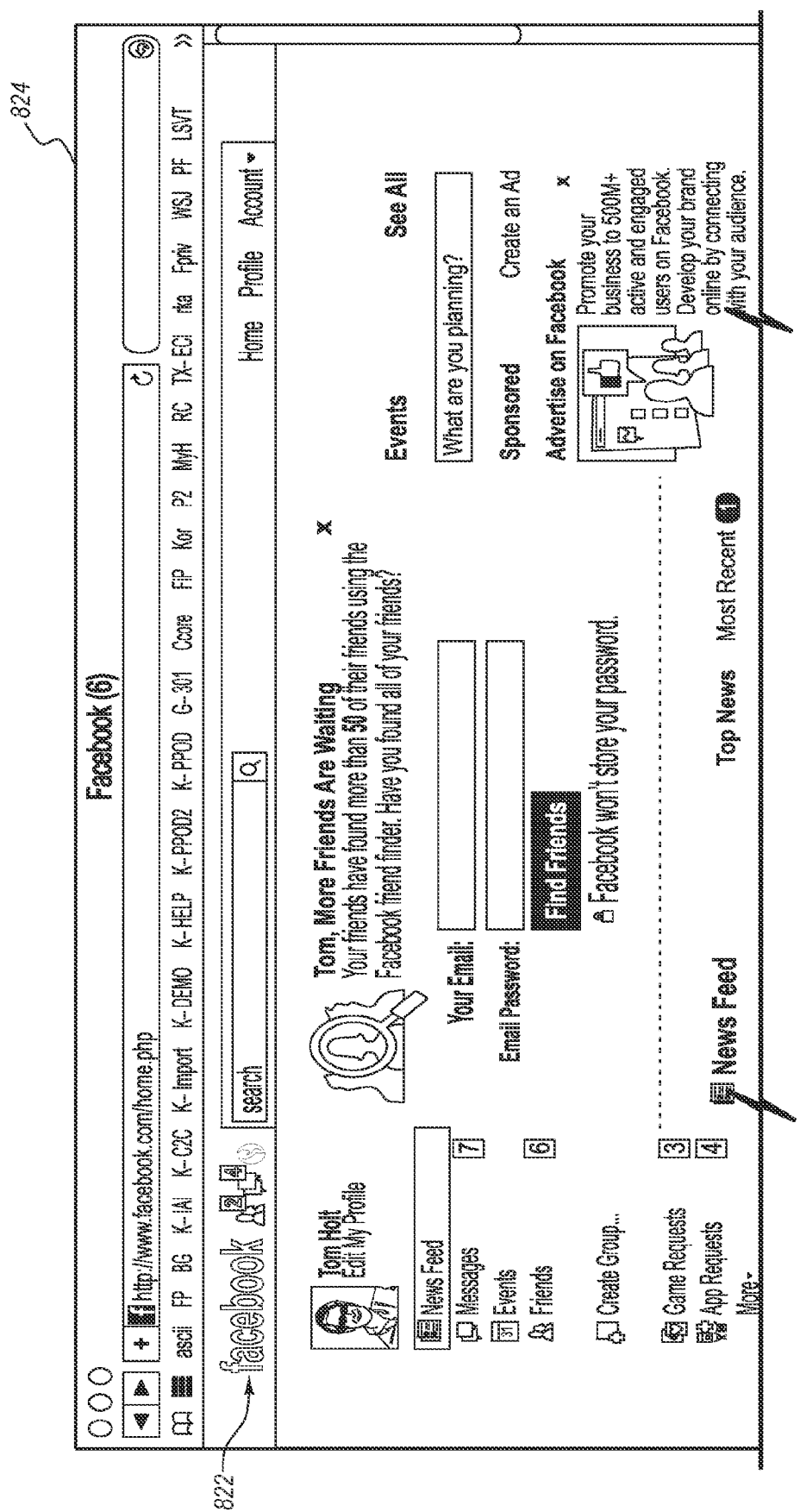

FIGS. 25-1 and 25-2 disclose the user interface 800 employed in the context of a network-based social network 822. As disclosed in FIGS. 25-1 and 25-2, the user interface 800 can be part of a social-networking system, as discussed above in connection with FIGS. 18-1 and 18-2, where each user interface 800 is further integrated into an existing network-based social network 822, which in this example is the internet-based social network Facebook®. The network-based social network 822 can include a plurality of webpages or other screens 824 (only one of which is shown in FIGS. 25-1 and 25-2), or other networked interfaces, each associated with one of the users of the social-networking system. Further, the user interface 800 associated with each user is configured to be embedded in the webpage or other screen 824, or other networked interface, associated with the user to enable to user to navigate the structured content of the social-networking system in the context of the webpage or other screen 824 of the network-based social network 822, or other networked interface. The example user interface 800 can thus be employed to create and use structured content to spawn social interest and interaction, enabling users to edit or attach content, share comments and interests, and thus create a network (e.g. with social, business, or theme orientation) based on the structure of specific steps or topics or domains of knowledge in the user interface 800.

In other example embodiments, the status or progress that a learner/user is making within or across the cells of a grid can be shared with fellow workers (for example, educators or therapists). In another example embodiment, family members, work colleagues, trainers, and/or supervisors can also monitor the learner's progress or performance. The social networking provided by the social-networking system disclosed herein can be based on two or more users sharing both the aspects and relevance of the specific, structured content provided by the system, and by the sharing of other types of information such as dates, comments, images, videos, or any other information based on the user's status relative to a cell's content, be that status alone denoting learning progress, or purchase status or history, or voting or ranking services, or any other input by those within the social networking system regarding the content of a cell, sets of cells, or an entire grid.

7. Fifth Example User Interface for Navigating Structured Content

With reference now to FIGS. 26 to 30-2, a fifth example user interface 900 is disclosed. As with the user interfaces 500, 600, 700, and 800, the user interface 900 is configured to navigate structured content. As disclosed in FIG. 26, the structured content of the user interface 900 is the Hawaii Early Learning Profile®, with each cell containing one or more steps relating to child development. It is understood, however, that the user interface 900 could instead be used to navigate other structured content.

As disclosed in FIGS. 26 and 29-1 to 29-2, the user interface 900 generally includes a viewport 902, a grid 904 of multi-dimensional cells and a domain column 906 of cells that span multiple rows, a search box 908, and a viewtracker 910. The cells of the grid 904 are generally organized into horizontal rows and vertical columns. The grid 904 also includes a header row 912 and a header column 914.

Each of the multi-dimensional cells is configured to display only a first dimension of structured content before selection and display one or more additional dimensions of structured content upon selection. The grid 904 of FIGS. 26 and 29-1 to 29-2 also features abbreviations or representations of multiple cells within single cells. For example, when more than one value occupies or applies to a cell (at the intersection of a grid 904 row and column), selecting that one cell will open or cause to display a new screen object that presents the multiple cells in a fashion similar to the display of the cells in the viewport 902, thus allowing multiple instances of content within or referenced by one cell.

Figure 26:
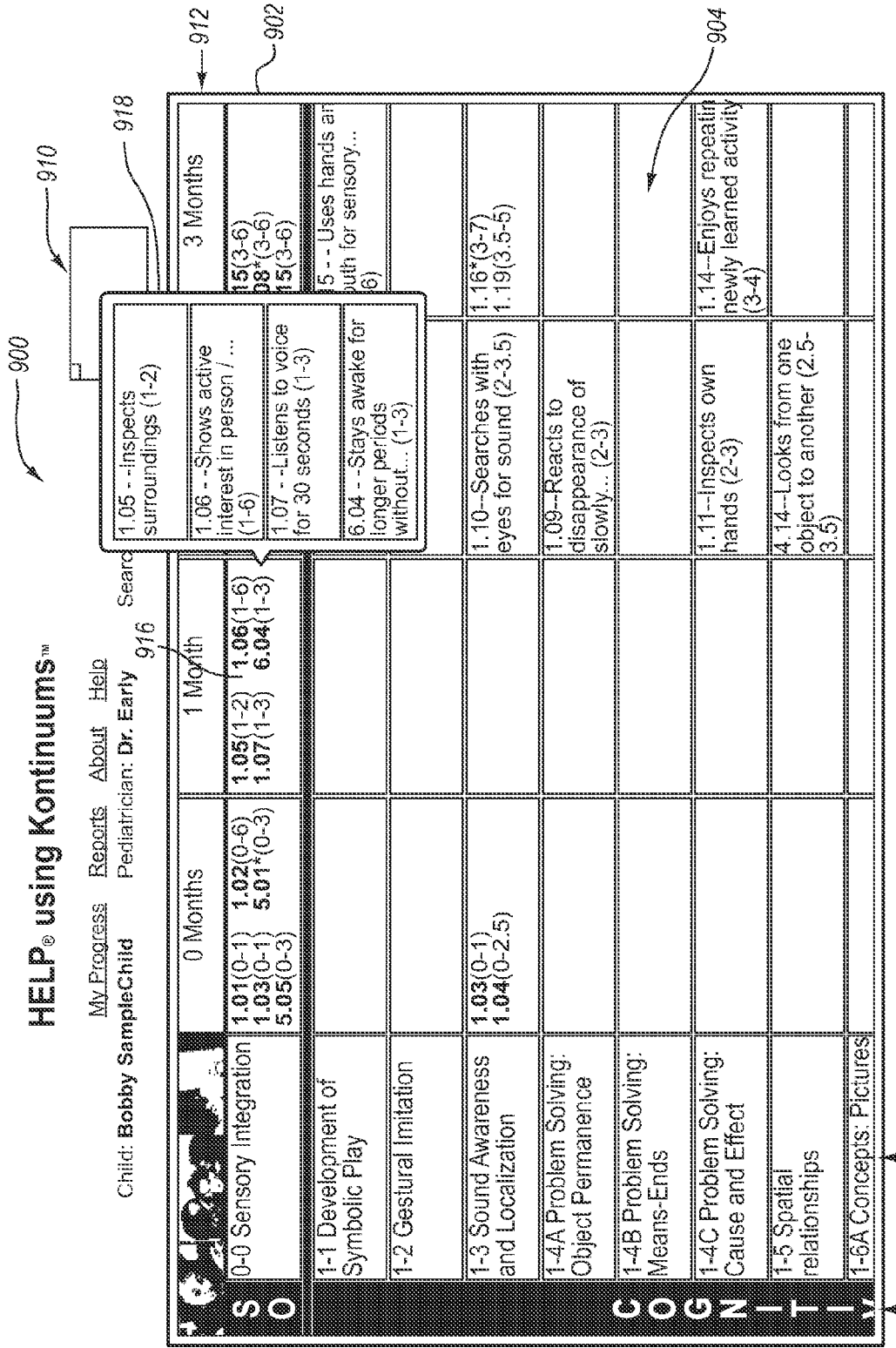
FIG. 26 discloses a fifth example user interface for navigating structured content and a pop-up window of a cell within the fifth example user interface.

For example, as disclosed in FIG. 26, selecting the cell 916 causes additional cells of the grid 904 to be displayed in an interface object such as a pop-up window 918. Alternatively, selecting one of the cells of the grid 904 can cause additional dimensions of structured content to be displayed in an interface object 920, as disclosed in FIGS. 27A-27C. The interface object 920 disclosed in FIGS. 27A-27C includes several tabs that allow the user to view additional dimensions of structured content, as disclosed in FIG. 27A, select and update a current status corresponding to the structured content, as disclosed in FIG. 27B, or launch additional interface objects, such as the additional interface object 922 of FIG. 27C. As disclosed in FIG. 27C, the tabs of the interface object 920 enable the user to drill down to additional dimensions of structured content. The interface object 922 represents a deeper dimension, represented by the label 1.03-1, of the content in the cell 916, represented by the label 1.03. It is understood that the tabs of the interface object 920 are example interface objects only, and any number of other interface objects can be employed to allow the user to drill down to additional dimensions of structured content. FIG. 28 discloses yet another modal window 924 displayed in response to the selection of another cell in the grid 904. It is understood that expansion of a cell or multiple cells may also be configured to load an entirely new, but cell-related, grid into the viewport 902, such as the summative representation 820 disclosed in FIG. 24.

The user interface 900 is also configured to hide empty cells in certain situations. For example, FIGS. 29-1 and 29-2 disclose a first portion of the grid 904 of the example user interface 900, and FIGS. 30-1 and 30-2 disclose another portion of the grid 904 of the example user interface 900. Both portions of the grid 904 disclosed in FIGS. 29-1 and 29-2 and 30-1 and 30-2 include empty cells. Each cell in the header row 912 is configured, upon selection, to hide all rows in the grid 904 corresponding to empty cells positioned in the same column as the selected header row cell. Similarly, each cell in the header column 914 is configured, upon selection, to hide all columns in the grid 904 corresponding to empty cells positioned in the same row as the selected header column cell.

For example, as disclosed in FIG. 31, selection of the header row cell 926 causes all rows in the grid 904 corresponding to empty cells positioned in the column 928 to be hidden, thus enabling the user to only view rows in the column 928 that have structured content. The other header row cells and header column cells in the grid 904 are similarly configured. For example, if the user next selects the header row cell 930, the rows corresponding to empty cells positioned in the column 932 will be hidden (not shown), thus enabling the user to only view rows in the column 932 that have structured content.

8. Example Administrative Displays

FIGS. 32-35 are example administrative displays 1000-1006 of the example user interface 900. The example administrative displays 1000-1006 may be employed, for example, to enable a system administrator or a user to specify preferences for the user interface 900 such as cell font size, cell style, cell color, cell size, cell background color, border size, cell border size, blank cell display, viewport size, viewport border size, or some combination thereof or preferences for the system, such as for managing different "client" users. Other administrative preferences may include how cells move and stop and align within the grid 904 and viewport 902 (see FIG. 26) in response to the user's click-drag, touch-drag, or other navigation action.

For example, a preference may be set to specify whether the cells within a viewport 902 "snap" to stop their movement at the exact boundaries of the viewport 902 and/or the header column and header row such that complete cells are shown throughout the viewport 902 in a manner that matches the edges of the cells exactly to the edges and boundaries of the viewport 902 of header column and header row, with the viewport 902 being sized mathematically such that an exact multiple of cells fill the horizontal and vertical space within the viewport 902. Alternatively, the cells within the viewport 902 may be configured to "float" and stop their movement without regard to the exact boundaries of the viewport 902 and/or the header column or header row such that incomplete or partial cells are shown at the edges/boundaries of the viewport 902.

It should also be noted that, for example, the rate of the drag can accelerate or otherwise control both the speed and "distance" within the grid 904 that the cells move. For example, with a touch device, a fast finger drag can cause the cells within the viewport 902 to rapidly move in the direction of the drag, for example, the lower right corner.

Further, although not disclosed in FIGS. 32-35, any one of the administrative displays 1000-1006 may include a "what you see is what you get" (WYSIWYG) simulator that enables a system administrator or a user to see the effects of changes to preferences prior to actual implementation of the changes in the user interface 900. This viewport simulator can be employed as an alternative, or in conjunction with, a control or preferences method, enabling the user to upload or enters samples of structured content into the system. The viewport simulator is then displayed in a manner allowing the user to interact directly with the viewport simulator such as, for example, directly dragging cell borders or boundaries or clicking or touching a cell to bring up color palettes, font faces or size, all in the manner of a WYSIWYG direct editor of the viewport 902. In this way, the user is able to immediately see the impact on the viewport 902 when it is sized for different devices (e.g., computer screens, slate devices, smart phones) or when different font sizes do or do not allow cell text or content to fit or when coloration schemes do or do not look good, for example.

It is further noted that the administrative displays 1000-1006 may be used in connection with, augmented by, or replaced by a series of editable files such as CSS or variables embedded within HMTL or JavaScript for specifying settings such as viewport parameters, cell content, and cell properties including properties such as font size, style, color; cell size, background color, border size and color; viewport size, border size; and other parameters associated with the display, such as how to display blank cells.

9. Conclusion

The example user interfaces disclosed herein thus open up and make manageable and accessible areas of structured content currently not viewed as uniformly teachable from a learning or instructional basis, or easily self-directed or self-assessed. Such areas are typically outside of traditional textbook domains, such as learning how and if one is growing in his/her religious faith, how one is doing as a new parent, or how well one is mastering the art of selling real estate. There are many content areas that have defied being arranged into a progression of learnable steps coupled with personal assessment and with social interaction/sharing, primarily due to the sheer size and complexity of the steps and the lack of any tool or process to easily navigate and use such content. The example user interfaces disclosed herein provide these missing tools and greatly increase and improve the potential for accessing, studying, and applying granular and detailed structured content by facilitating navigation to such content and by making the content more easily hidden and then visible, and thus usable. The example user interfaces disclosed herein enable a user to access structured content that progresses from less to more advanced or complex steps, and some within a fixed screen display size or viewport.

Embodiments of the invention can include user interfaces implemented on computing devices having various computer hardware and software. Embodiments within the scope of the present invention can also include computer-readable media for carrying or having computer-executable instructions or data structures stored thereon. Computer-executable instructions comprise, for example, instructions and data which cause a computer to perform a certain function or group of functions.

Computer-readable media, on the other hand, can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means or modules in the form of computer-executable instructions or data structures and which can be accessed by a computer.

Further, the software disclosed herein can be employed as Document Object Model (DOM) methods to dynamically determine display screen positions within a grid in order to make easy and enhance the user's ability to scroll or navigate to other cells within the displayed portion of the grid. In addition, the software described herein may be implemented in any number of software languages such as C++, Java, or JQuery scripts.

In one embodiment, using a DOM, for example, and based on a directional vector received from the user's selection/pointing device (for example using a mouse click on the navigation palette or a finger touch/scroll to denote up, down, right, left) and based on the current object (for example the domain, header cell, or cell), the software determines the current object and then calculates the next object in the grid hierarchy to display in the 0,0 position of the array/grid, does a JQuery call, and then positions that object at 0,0.

While a variety of features have been disclosed in connection with the user interfaces disclosed herein, it is contemplated that the various features of all of the user interfaces disclosed herein could be combined into a single user interface and/or that the features can be combined or separated in a variety of ways not specifically illustrated by the example user interfaces disclosed herein. It is further understood that one or more user interfaces disclosed herein, and their various features, can function together as an integrated system for navigating and interacting with structured content.

The example embodiments disclosed herein may be embodied in other specific forms. The example embodiments disclosed herein are to be considered in all respects only as illustrative and not restrictive.

What is claimed is:

1. A non-transitory computer-readable medium storing an application configured to cause a computing device to generate a user interface on a display device associated with the computing device, the user interface comprising:

a grid comprising rows and columns;

a header row of cells each positioned in a separate column of the grid;

a header column of cells each positioned in a separate row of the grid;
a plurality of multi-dimensional cells each having a unique position in the grid; and
a viewport configured to:
display only a portion of the grid;
allow a user to select any of the multi-dimensional cells displayed in the viewport without changing the position of the displayed multi-dimensional cells in the viewport and regardless of the position in the viewport of the displayed multi-dimensional cells;
simultaneously scroll, upon reception of an indication that the portion of the grid displayed within the viewport should simultaneously scroll both horizontally and vertically, the multi-dimensional cells of the grid within the viewport both horizontally and vertically and the header row cells and header column cells of the grid in a synchronous manner so as to remain visible in the viewport and remain aligned with the rows and columns of the multi-dimensional cells; and
reposition the multi-dimensional cells of the grid displayed within the viewport during simultaneous horizontal and vertical scrolling such that the multi-dimensional cells of the grid displayed within the viewport are capable of coming to a resting position in which:
no visible multi-dimensional cell boundary within the grid is aligned with any visible vertical boundary of the header column; and
no visible multi-dimensional cell boundary within the grid is aligned with any visible horizontal boundary of the header row.

2. The non-transitory computer-readable medium as recited in claim 1, wherein the indication that the portion of grid displayed within the viewport should simultaneously scroll both horizontally and vertically is received upon a user dragging the grid both horizontally and vertically.

3. The non-transitory computer-readable medium as recited in claim 2, wherein the user dragging the grid both horizontally and vertically is accomplished using a mouse and a mouse pointer that is displayed on the display device.

4. The non-transitory computer-readable medium as recited in claim 2, wherein the display device is a touch display device and the user dragging the grid both horizontally and vertically is accomplished using a finger touching the touch display device.

5. The non-transitory computer-readable medium as recited in claim 1, wherein the multi-dimensional cells of the grid displayed within the viewport are configured to automatically snap to align one or more multi-dimensional cell boundaries with one or more edges of the viewport after simultaneous horizontal and vertical scrolling.

6. The non-transitory computer-readable medium as recited in claim 1, wherein the multi-dimensional cells of the grid displayed within the viewport are configured to float within the viewport during simultaneous horizontal and vertical scrolling without automatically snapping to align any multi-dimensional cell boundaries with any edge of the viewport after the simultaneous horizontal and vertical scrolling.

7. The non-transitory computer-readable medium as recited in claim 1, wherein the user interface further comprises a viewtracker comprising:
a grid representation of the grid; and
a viewport representation of the viewport that is positioned within the grid representation and overlays the grid representation and visually conveys both the proportion of the grid currently displayed in the viewport as well as the position within the grid of the portion of the grid displayed in the viewport.

8. The non-transitory computer-readable medium as recited in claim 7, wherein the viewport representation, the grid representation, or some combination thereof visually conveys a content density of at least some of the multi-dimensional cells of the grid, the content density of each of the multi-dimensional cells comprising the amount of content in the multi-dimensional cell, the number of dimensions of content in the multi-dimensional cell, or some combination thereof.

9. The non-transitory computer-readable medium as recited in claim 7, wherein:
the viewport representation is configured to automatically reposition within the grid representation when the user repositions the portion of the grid displayed in the viewport; and
the portion of the grid displayed in the viewport is configured to automatically reposition when the user repositions the viewport representation within the grid representation.

10. The non-transitory computer-readable medium as recited in claim 1, wherein the viewport initially automatically scrolls to a starting portion of the grid based on one or more inherent characteristics that are entered by a user of the user interface, the inherent characteristics being of a user of the user interface, a target of the user interface, or of the content of the multi-dimensional cells of the grid.

11. The non-transitory computer-readable medium as recited in claim 1, wherein the user interface further comprises an administrative display configured to enable a system administrator to specify user interface preferences for cell font size, cell style, cell color, cell size, cell background color, border size, cell border size, blank cell display, viewport size, viewport border size, or some combination thereof.

12. The non-transitory computer-readable medium as recited in claim 11, wherein the administrative display includes a WYSIWYG simulator that enables the system administrator to see the effects of changes to preferences prior to actual implementation of the changes in the user interface.

13. The non-transitory computer-readable medium as recited in claim 1, wherein:
the multi-dimensional cells of the grid contain structured content; and
the structured content is organized in the header row by an inherent characteristic of the content of the multi-dimensional cells in each column corresponding to the header row.

14. The non-transitory computer-readable medium as recited in claim 1, wherein the viewport is further configured to float the header row cells of the grid within the viewport during simultaneous horizontal and vertical scrolling such that the header row cells displayed within the viewport are capable of coming to a resting position in which a vertical edge of the viewport divides one of the header row cells.

15. The non-transitory computer-readable medium as recited in claim 1, wherein the viewport is further configured to float the header column cells of the grid within the viewport during simultaneous horizontal and vertical scrolling such that the header column cells displayed within the viewport are capable of coming to a resting position in which a horizontal edge of the viewport divides one of the header column cells.

16. The non-transitory computer-readable medium as recited in claim 1, wherein the viewport is configured to reposition the multi-dimensional cells of the grid displayed within the viewport during simultaneous horizontal and vertical scrolling while the viewport remains at a fixed display size.

17. A non-transitory computer-readable medium storing an application configured to cause a computing device to generate a user interface on a display device associated with the computing device, the user interface comprising:
    a grid comprising rows and columns;
    a header row of cells each positioned in a separate column of the grid;
    a header column of cells each positioned in a separate row of the grid;
    a plurality of multi-dimensional cells each having a unique position in the grid; and
    a viewport configured to:
        display only a portion of the grid;
        simultaneously scroll, upon reception of an indication that the portion of the grid displayed within the viewport should simultaneously scroll both horizontally and vertically, the multi-dimensional cells of the grid within the viewport both horizontally and vertically and scroll the header row cells and header column cells of the grid in a synchronous manner so as to remain visible in the viewport and remain aligned with the rows and columns of multi-dimensional cells; and
        float the multi-dimensional cells of the grid displayed within the viewport during simultaneous horizontal and vertical scrolling such that the multi-dimensional cells of the grid displayed within the viewport are capable of coming to a resting position in which:
            no visible multi-dimensional cell boundary within the grid is aligned with any visible edge of the viewport;
            no visible multi-dimensional cell boundary within the grid is aligned with any visible vertical boundary of the header column; and
            no visible multi-dimensional cell boundary within the grid is aligned with any visible horizontal boundary of the header row.

18. The non-transitory computer-readable medium as recited in claim 17, wherein the indication that the portion of grid displayed within the viewport should simultaneously scroll both horizontally and vertically is received upon a user dragging the grid both horizontally and vertically.

19. The non-transitory computer-readable medium as recited in claim 18, wherein the user dragging the grid both horizontally and vertically is accomplished using a mouse and a mouse pointer that is displayed on the display device.

20. The non-transitory computer-readable medium as recited in claim 18, wherein the display device is a touch display device and the user dragging the grid both horizontally and vertically is accomplished using a finger touching the touch display device.

21. The non-transitory computer-readable medium as recited in claim 17, wherein:
    the multi-dimensional cells of the grid contain structured content; and
    the structured content is organized in the header row by an inherent characteristic of the content of the multi-dimensional cells in each column corresponding to the header row.

22. The non-transitory computer-readable medium as recited in claim 17, wherein the user interface further comprises a viewtracker comprising:
    a grid representation of the grid; and
    a viewport representation of the viewport that is positioned within the grid representation and overlays the grid representation and visually conveys both the proportion of the grid currently displayed in the viewport as well as the position within the grid of the portion of the grid displayed in the viewport.

23. The non-transitory computer-readable medium as recited in claim 22, wherein the viewport representation, the grid representation, or some combination thereof visually conveys a content density of at least some of the multi-dimensional cells of the grid, the content density of each of the multi-dimensional cells comprising the amount of content in the multi-dimensional cell, the number of dimensions of content in the multi-dimensional cell, or some combination thereof.

24. The non-transitory computer-readable medium as recited in claim 22, wherein:
    the viewport representation is configured to automatically reposition within the grid representation when the user repositions the portion of the grid displayed in the viewport; and
    the portion of the grid displayed in the viewport is configured to automatically reposition when the user repositions the viewport representation within the grid representation.

25. The non-transitory computer-readable medium as recited in claim 17, wherein, upon initial display of the viewport and prior to any action by a user of the user interface, the viewport initially automatically scrolls to a starting portion of the grid based on one or more inherent characteristics that are previously entered by a user of the user interface, the inherent characteristics being of a user of the user interface, a target of the user interface, or of the content of the multi-dimensional cells of the grid.

26. The non-transitory computer-readable medium as recited in claim 17, wherein the viewport is further configured to allow a user to select any of the multi-dimensional cells displayed in the viewport without changing the position of the displayed multi-dimensional cells in the viewport and regardless of the position in the viewport of the displayed multi-dimensional cells.

27. The non-transitory computer-readable medium as recited in claim 17, wherein the viewport is further configured to display a screen object upon selection of one of the multi-dimensional cells, the screen object displaying a second dimension of content contained within the selected multi-dimensional cell, the screen object positioned within the viewport so as to overlap at least a portion of the grid that is visible in the viewport, the position of the screen object within the viewport depending on the position of the selected multi-dimensional cell such that the selection of different multi-dimensional cells having different positions in the viewport will result in the display of different screen objects having different positions in the viewport.

28. The non-transitory computer-readable medium as recited in claim 17, wherein the viewport is further configured to float the header row cells of the grid within the viewport during simultaneous horizontal and vertical scrolling such that the header row cells displayed within the viewport are capable of coming to a resting position in which a vertical edge of the viewport divides one of the header row cells.

29. The non-transitory computer-readable medium as recited in claim 17, wherein the viewport is further configured to float the header column cells of the grid within the viewport during simultaneous horizontal and vertical scrolling such that the header column cells displayed within the viewport are capable of coming to a resting position in which a horizontal edge of the viewport divides one of the header column cells.

30. A non-transitory computer-readable medium storing an application configured to cause a computing device to generate a user interface on a display device associated with the computing device, the user interface comprising:
    a grid comprising rows and columns;
    a header row of cells each positioned in a separate column of the grid;
    a header column of cells each positioned in a separate row of the grid;
    a plurality of multi-dimensional cells each having a unique position in the grid; and
    a viewport configured to:
        display only a portion of the grid;
        simultaneously scroll, upon reception of an indication that the portion of the grid displayed within the viewport should simultaneously scroll both horizontally and vertically, the multi-dimensional cells of the grid within the viewport both horizontally and vertically and scroll the header row cells and header column cells of the grid in a synchronous manner so as to remain visible in the viewport and remain aligned with the rows and columns of the multi-dimensional cells; and
        reposition the header row cells and the header column cells of the grid within the viewport during simultaneous horizontal and vertical scrolling such that the header row cells and the header column cells displayed within the viewport are capable of coming to a resting position in which:
            a vertical edge of the viewport divides one of the header row cells;
            a horizontal edge of the viewport divides one of the header column cells;
            a vertical boundary of the header column divides at least one of the multi-dimensional cells partially displayed in the viewport; and
            a horizontal boundary of the header row divides at least one of the multi-dimensional cells partially displayed in the viewport.

31. The non-transitory computer-readable medium as recited in claim 30, wherein the indication that the portion of grid displayed within the viewport should simultaneously scroll both horizontally and vertically is received upon a user dragging the grid both horizontally and vertically.

32. The non-transitory computer-readable medium as recited in claim 31, wherein the user dragging the grid both horizontally and vertically is accomplished using a mouse and a mouse pointer that is displayed on the display device.

33. The non-transitory computer-readable medium as recited in claim 31, wherein the display device is a touch display device and the user dragging the grid both horizontally and vertically is accomplished using a finger touching the touch display device.

34. The non-transitory computer-readable medium as recited in claim 30, wherein the multi-dimensional cells of the grid contain structured content and the structured content is organized in the header row by an inherent characteristic of the content of the multi-dimensional cells in each column corresponding to the header row.

35. The non-transitory computer-readable medium as recited in claim 30, wherein the user interface further comprises a viewtracker comprising:
    a grid representation of the grid; and
    a viewport representation of the viewport that is positioned within the grid representation and overlays the grid representation and visually conveys both the proportion of the grid currently displayed in the viewport as well as the position within the grid of the portion of the grid displayed in the viewport,
    wherein the viewport representation, the grid representation, or some combination thereof visually conveys a content density of at least some of the multi-dimensional cells of the grid, the content density of each of the multi-dimensional cells comprising the amount of content in the multi-dimensional cell, the number of dimensions of content in the multi-dimensional cell, or some combination thereof,
    wherein the viewport representation is configured to automatically reposition within the grid representation when the user repositions the portion of the grid displayed in the viewport, and
    wherein the portion of the grid displayed in the viewport is configured to automatically reposition when the user repositions the viewport representation within the grid representation.

36. The non-transitory computer-readable medium as recited in claim 30, wherein, upon initial display of the viewport and prior to any action by a user of the user interface, the viewport initially automatically scrolls to a starting portion of the grid based on one or more inherent characteristics that are previously entered by a user of the user interface, the inherent characteristics being of a user of the user interface, a target of the user interface, or of the content of the multi-dimensional cells of the grid.

37. The non-transitory computer-readable medium as recited in claim 30, wherein the viewport is further configured to allow a user to select any of the multi-dimensional cells displayed in the viewport without changing the position of the displayed multi-dimensional cells in the viewport and regardless of the position in the viewport of the displayed multi-dimensional cells.

38. The non-transitory computer-readable medium as recited in claim 30, wherein the viewport is configured to reposition the header row cells and the header column cells of the grid within the viewport during simultaneous horizontal and vertical scrolling while the viewport remains at a fixed display size.

\* \* \* \* \*